(12) United States Patent
Fukagawa et al.

(10) Patent No.: US 7,990,502 B2
(45) Date of Patent: Aug. 2, 2011

(54) LIQUID-CRYSTAL DISPLAY DEVICE

(75) Inventors: Nobutaka Fukagawa, Minami-ashigara (JP); Hajime Nakayama, Minami-ashigara (JP); Hirofumi Toyama, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 43 days.

(21) Appl. No.: 12/666,450

(22) PCT Filed: Jun. 24, 2008

(86) PCT No.: PCT/JP2008/061797
§ 371 (c)(1),
(2), (4) Date: Dec. 23, 2009

(87) PCT Pub. No.: WO2009/001952
PCT Pub. Date: Dec. 31, 2008

(65) Prior Publication Data
US 2011/0001908 A1    Jan. 6, 2011

(30) Foreign Application Priority Data
Jun. 25, 2007  (JP) .................... 2007-166481

(51) Int. Cl.
*G02F 1/1335* (2006.01)
(52) U.S. Cl. .................... 349/119; 349/102; 349/117
(58) Field of Classification Search ............... 349/96–98, 349/117–119
See application file for complete search history.

(56) References Cited

U.S. PATENT DOCUMENTS
| | | |
|---|---|---|
| 7,410,679 B2 * | 8/2008 | Matsufuji ............ 428/1.3 |
| 2005/0163943 A1 * | 7/2005 | Uchiyama et al. ....... 428/1.31 |
| 2009/0161045 A1 * | 6/2009 | Kawamoto et al. ....... 349/98 |

FOREIGN PATENT DOCUMENTS
| | | |
|---|---|---|
| JP | 2005-128520 A | 5/2005 |
| JP | 2006-071876 A | 3/2006 |
| JP | 2006-169303 A | 6/2006 |
| JP | 2007-086748 A | 4/2007 |
| WO | WO 2006/101249 A1 | 9/2006 |
| WO | WO 2007/064029 A1 | 6/2007 |

OTHER PUBLICATIONS
Notification Concerning Transmittal of International Preliminary Report on Patentability (Forms PCT/IB/326, PCT/IB/373 and PCT/ISA/237) issued in corresponding International Application No. PCT/JP2008/061797 dated Jan. 14, 2010.
International Search Report (PCT/ISA/210) for PCT/JP2008/061797 mailed Sep. 30, 2008.
Written Opinion (PCT/ISA/237) for PCT/JP2008/061797 mailed Sep. 30, 2008.

* cited by examiner

*Primary Examiner* — Dung T Nguyen
(74) *Attorney, Agent, or Firm* — Buchanan Ingersoll & Rooney PC

(57) ABSTRACT

A liquid-crystal display device comprising a liquid-crystal cell, a first polarizing element and a second polarizing element disposed on either side of the liquid-crystal cell respectively, a first retardation layer between the first polarizing element and the liquid-crystal cell, and a second retardation layer between the second polarizing element and the liquid-crystal cell, wherein a transmission axis of the first polarizing element is perpendicular to the slow axis of the first retardation layer; and a transmission axis of the second polarizing element is parallel to the slow axis of the second retardation layer; and the first retardation layer and the second retardation layer satisfy the formula (1) 0 nm<$\Delta Re_1(548)-\Delta Re_2(548)$ $\leq$50 nm.

15 Claims, 4 Drawing Sheets

Low ambient humidity (Invention)

High ambient humidity (Invention)

Low ambient humidity (Comparative Example)

High ambient humidity (Comparative Example)

Low ambient humidity (Invention)

High ambient humidity (Invention)

Low ambient humidity (Comparative Example)

High ambient humidity (Comparative Example)

LIQUID-CRYSTAL DISPLAY DEVICE

BACKGROUND OF THE INVENTION

1. Technical Field of the Invention

The present invention relates to a liquid-crystal display device, in particular to a VA-mode liquid-crystal display device.

2. Related Art

Liquid-crystal display devices have found wide application as power-saving and space-saving display devices. Heretofore, one great weak point of liquid-crystal display devices was that contrast and color of those display images might significantly change depending on viewing angle. However, in recent years, new-mode liquid-crystal display devices such as VA-mode and IPS-mode, of which display images show less viewing angle dependency than those of conventional liquid-crystal display devices, have been developed and put into use even for TVs that require high-quality display images.

Compared with IPS-mode liquid-crystal display devices, VA-mode liquid-crystal display devices have the advantage of high contrast, but have the problem that color and contrast of display images may largely change among different viewing angles. To overcome this problem, various optical compensation films have been proposed. Above all, a liquid-crystal display device with the first and the second retardation films, both having predetermined wavelength dispersion characteristics of retardation, is much improved to show little contrast change and little color change from different viewing angles, as disclosed in JPA No. 2007-86748. In addition, another advantage of the device is that the retardation film serves also as a protective film for the polarizing plate therein, and therefore the thickness of the device can be reduced.

However, with the increase in the demand for liquid-crystal display devices for large-sized TVs, the liquid-crystal display devices are now required to keep high display image quality over wide humidity range. Conventional liquid-crystal display devices have a problem that the contrast may greatly change depending on the humidity, and are desired to be improved in this point.

SUMMARY OF THE INVENTION

An object of the present invention is to provide a liquid-crystal display device, especially a VA-mode liquid-crystal display device having the advantage that its display image quality shows little variation under the different humidity conditions.

As a result of our assiduous studies, the present inventors have found that, in a liquid-crystal display device comprising two retardation layers that differ in the humidity dependence of their optical characteristics, when the slow axis of the retardation layer of which the humidity dependence of the optical characteristics thereof is larger is disposed in a predetermined manner relative to the transmission axis of the polarizing element, or relative to the slow axis of the retardation layer of which the humidity dependence of the optical characteristics thereof is smaller, then the change of the optical characteristics of the two retardation layers under the different humidity conditions can be canceled out; and on the basis of this finding, they have further studied and have made the present invention.

In one aspect, the present invention provides a liquid-crystal display device comprising:
a liquid-crystal cell,
a first polarizing element and a second polarizing element disposed on either side of the liquid-crystal cell respectively,
a first retardation layer between the first polarizing element and the liquid-crystal cell, and
a second retardation layer between the second polarizing element and the liquid-crystal cell, wherein:
a transmission axis of the first polarizing element is perpendicular to a slow axis of the first retardation layer; and
a transmission axis of the second polarizing element is parallel to a slow axis of the second retardation layer; and
the first retardation layer and the second retardation layer satisfy the following formula (1):

$$0 \text{ nm} < \Delta Re_1(548) - \Delta Re_2(548) \leq 50 \text{ nm} \tag{1}$$

wherein $\Delta Re_1(548)$ is a value obtained by subtracting in-plane retardation (Re) of the first retardation layer, measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.; and $\Delta Re_2(548)$ is a value obtained by subtracting Re of the second retardation layer, measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.

In another aspect, the present invention provides a liquid-crystal display device comprising:
a liquid-crystal cell,
a first polarizing element and a second polarizing element disposed on either side of the liquid-crystal cell respectively, and
a first retardation layer and a second retardation layer disposed at least between either of the first polarizing element or the second polarizing element and the liquid-crystal cell, wherein:
a transmission axis of the first polarizing element is perpendicular to the slow axis of the first retardation layer; and a slow axis of the first retardation layer is perpendicular to a slow axis of the second retardation layer; and
the first retardation layer and the second retardation layer satisfy the above formula (1):

The first retardation layer may be a polymer film stretched at least on the longitudinal direction (machine direction).

The second retardation layer may be a polymer film stretched in the transverse direction; and the polymer film may comprise a polymer and at least one compound represented by formula (A).

$$R^1\text{-L-X-L-}R^1 \tag{A}$$

wherein X represents an aromatic or aliphatic cyclic group; L represents a linking group being capable of forming a hydrogen bond to water, and the two L's are positioned symmetrically each other with the cyclic group X between; and $R^1$ represents an aromatic or aliphatic substituent.

As an embodiment of the invention, there is provided the liquid-crystal display device, wherein the first retardation layer and the second retardation layer satisfy the following formula (2):

$$0.5 \leq |\Delta Rth_1(548) + \Delta Rth_2(548)|/|\Delta Re_1(548) - \Delta Re_2(548)| \leq 10 \tag{2}$$

wherein $\Delta Rth_1(548)$ is a value obtained by subtracting the thickness-direction retardation (Rth) of the first retardation layer measured under the conditions that a wavelength is 548 nm, that a relative humidity is 80% and that a temperature is 25° C., from Rth thereof measured under the conditions that a wavelength is 548 nm, that a relative humidity is 10% and that a temperature is 25° C.; and $\Delta Rth_2(548)$ is a value obtained by subtracting Rth of the second retardation layer, measured under the conditions that a wavelength is 548 nm, that a relative humidity is 80% and that a temperature is 25°

C., from Rth thereof measured under the conditions that a wavelength is 548 nm, that a relative humidity is 10% and that a temperature is 25° C.

As an embodiment of the invention, there is provided the liquid-crystal display device, wherein the first retardation layer and the second retardation layer satisfy the following formula (3):

$$Re_1(548) < Re_2(548) \quad (3).$$

wherein $Re_1(\lambda)$ and $Re_2(\lambda)$ are Re of the first retardation layer and Re of the second retardation layer, respectively, at a wavelength of $\lambda$ nm measured in an environment at 25° C. and a relative humidity of 60%.

As an embodiment of the invention, there is provided the liquid-crystal display device, wherein the first retardation layer satisfies the following formulas (4) and (5):

$$5 \text{ nm} \leq Re_1(548) \leq 300 \text{ nm} \quad (4)$$

$$50 \text{ nm} \leq Rth_1(548) \leq 400 \text{ nm} \quad (5)$$

wherein $Re_1(\lambda)$ and $Rth_1(\lambda)$ are Re and Rth, respectively, of the first retardation layer at a wavelength of $\lambda$ nm measured in an environment at 25° C. and a relative humidity of 60%.

As an embodiment of the invention, there is provided the liquid-crystal display device, wherein the second retardation layer satisfies the following formulas (6) and (7):

$$40 \text{ nm} \leq Re_2(548) \leq 300 \text{ nm} \quad (6)$$

$$60 \text{ nm} \leq Rth_2(548) \leq 400 \text{ nm} \quad (7)$$

wherein $Re_2(\lambda)$ and $Rth_2(\lambda)$ are Re and Rth, respectively, of the second retardation layer at a wavelength of $\lambda$ nm measured in an environment at 25° C. and a relative humidity of 60%.

As an embodiment of the invention, there is provided the liquid-crystal display device, wherein the first retardation layer is a protective film of the first polarizing element, and/or the second retardation layer is a protective film of the first polarizing element or the second polarizing element.

As an embodiment of the invention, there is provided the liquid-crystal display device, wherein the first retardation layer satisfies the following formula (8):

1.12≤sound velocity in the slow axis direction/sound velocity in the direction perpendicular to the slow axis≤1.25 (8).

As an embodiment of the invention, there is provided the liquid-crystal display device, wherein at least one of the first retardation layer and the second retardation layer is a cellulose acylate film.

As an embodiment of the invention, there is provided the liquid-crystal display device, wherein the liquid-crystal cell employs a VA-mode cell.

Figure 1:
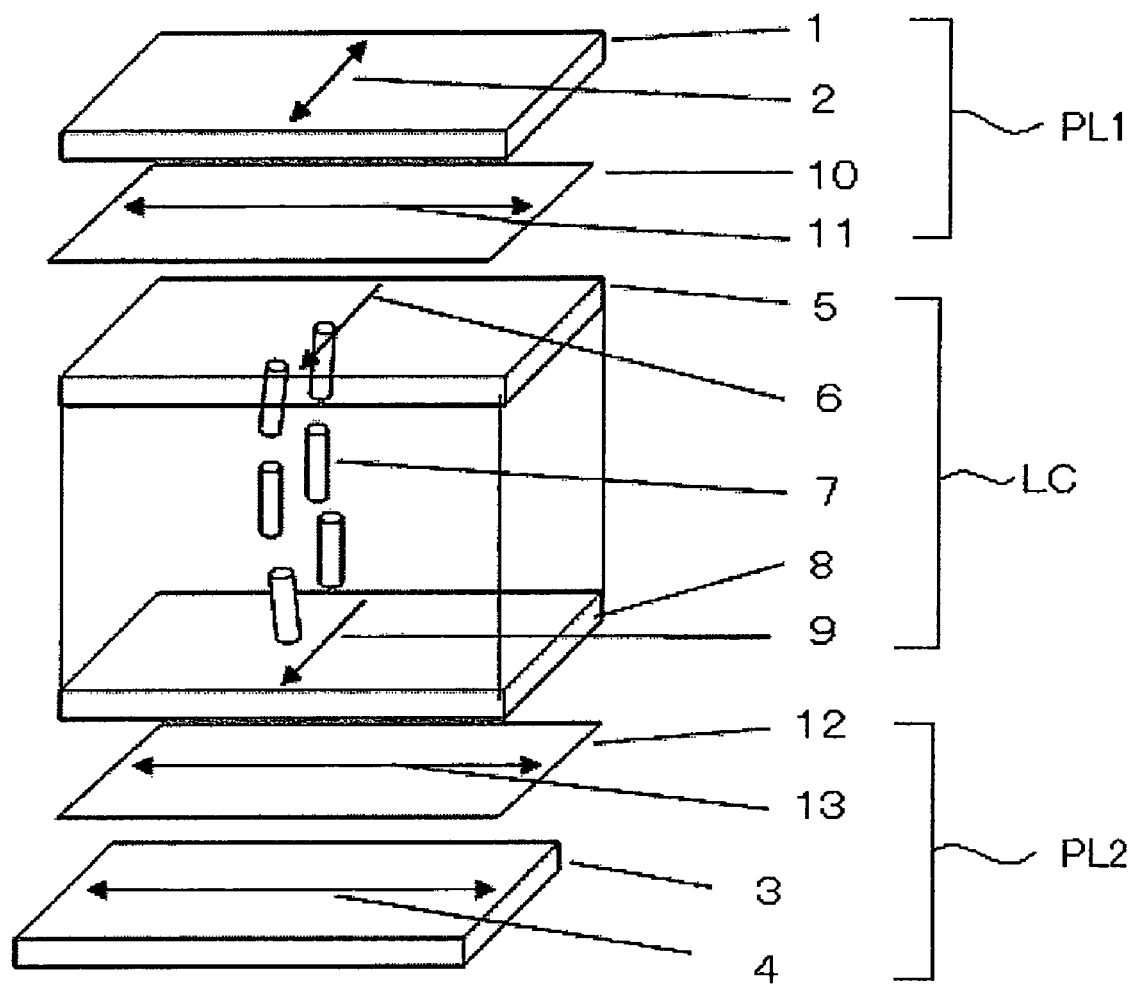
FIG. 1 is a schematic view showing one example of a liquid-crystal display device of the invention.

In the drawings, the reference numerals have the following meanings.

1 Upper Polarizing Element
2 Direction of Transmission Axis of Upper Polarizing Element
3 Lower Polarizing Element
4 Direction of Transmission Axis of Lower Polarizing Element
5 Upper Electrode Substrate of Liquid-Crystal Cell
6 Alignment Control Direction of Upper Substrate
7 Liquid-Crystal Layer
8 Lower Electrode Substrate of Liquid-Crystal Cell
9 Alignment Control Direction of Lower Substrate
10, 10' First Retardation Layer
11, 11' Slow Axis of First Retardation Layer
12, 12' Second Retardation Layer
13, 13' Slow Axis of Second Retardation Layer
LC Liquid-Crystal Cell
PL1, PL1' Upper Polarizing plate
PL2, PL2' Lower Polarizing plate

PREFERRED EMBODIMENT OF THE INVENTION

The contents of the invention are described in detail hereinunder. In this description, the numerical range expressed by the wording "a number to another number" means the range that falls between the former number indicating the lowermost limit of the range and the latter number indicating the uppermost limit thereof.

[Retardation of Film]

In the description, $Re(\lambda)$ and $Rth(\lambda)$ each indicate the in-plane retardation (unit: nm) and the thickness direction retardation (unit: nm) at a wavelength $\lambda$. $Re(\lambda)$ is measured by applying a light having a wavelength of $\lambda$ nm in the normal line direction of a sample such as a film, using KOBRA-21ADH or WR (by Oji Scientific Instruments).

When the sample to be tested is represented by an uniaxial or biaxial refractive index ellipsoid, then its $Rth(\lambda)$ is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), $Re(\lambda)$ of the sample is measured at 6 points in all thereof, up to +50° relative to the normal line direction of the sample at intervals of 10°, by applying a light having a wavelength of $\lambda$ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (21) and (22):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (21)$$

$$Rth = \{(nx + ny)/2 - nz\} \times d \quad (22)$$

wherein Re (θ) means the retardation value of the sample in the direction inclined by an angle θ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a monoaxial or biaxial index ellipsoid, or that is, when the sample does not have an optical axis, then its Rth(λ) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal line direction of the sample at intervals of 10°, by applying a light having a wavelength of nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In the description, when there is no notation regarding the measurement wavelength, the measurement wavelength for Re or Rth is 550 nm.

In this description, when the humidity and temperature are not specifically indicated in the measurement thereof, Re(λ) and Rth(λ) are measured under the conditions that a relative humidity is 60% and that a temperature is 25° C.

In this description, ΔRe(λ) and ΔRth(λ) each are values obtained by subtracting Re(λ) and Rth(λ) measured under the conditions that a relative humidity is 80% and that a temperature is 25° C., from Re(λ) and Rth(λ) measured under the conditions that a relative humidity is 10% and that a temperature is 25° C.; and when Re(λ) and Rth(λ) are measured under those conditions, the samples to be analyzed are left under the condition for at least 2 hours, and thereafter their measurement is started.

In this description, the subscript of "1" or "2" written at the left of "Re" or "Rth" indicates which of the first or the second retardation layer has the Re or Rth.

In the description, regarding angles between two axes, such as "parallel" and "perpendicular", a certain error margin is acceptable in terms of manufacturing as far as the effect of the invention can be obtained. In general, the error margin may be within ±10°.

In the description, "polarizing element" is differentiated from "polarizing plate". "Polarizing plate" is meant to indicate a laminate that comprises a "polarizing element" and, as formed on at least one surface thereof, a transparent protective film to protect the polarizing element.

Embodiments of the liquid-crystal display device of the invention are described below with reference to the drawings.

FIG. 1 is a schematic cross-sectional view of a first embodiment of a liquid-crystal display device of the invention. The liquid-crystal display device shown in FIG. 1 comprises a first polarizing element 1 and a second polarizing element 3 disposed in the top and the bottom of a liquid-crystal cell LC, and comprises a first retardation layer 10 between the liquid-crystal cell LC and the first polarizing element 1, and a second retardation layer 12 between the liquid-crystal cell LC and the second polarizing element 3. The first polarizing element 1 and the second polarizing element 3 are so disposed that their transmission axes 3 and 4 are perpendicular to each other. The first retardation layer 10 is so disposed that its slow axis 11 is perpendicular to the transmission axis 2 of the first polarizing element 1; and the second retardation layer 12 is so that its slow axis 13 is in parallel to the transmission axis 4 of the second polarizing element 3. Not shown in FIG. 1, the liquid-crystal display device is provided with a backlight. The backlight may be disposed outside any of the upper and lower polarizing elements, but in general, it is preferably disposed outside the polarizing element 3.

Figure 2:
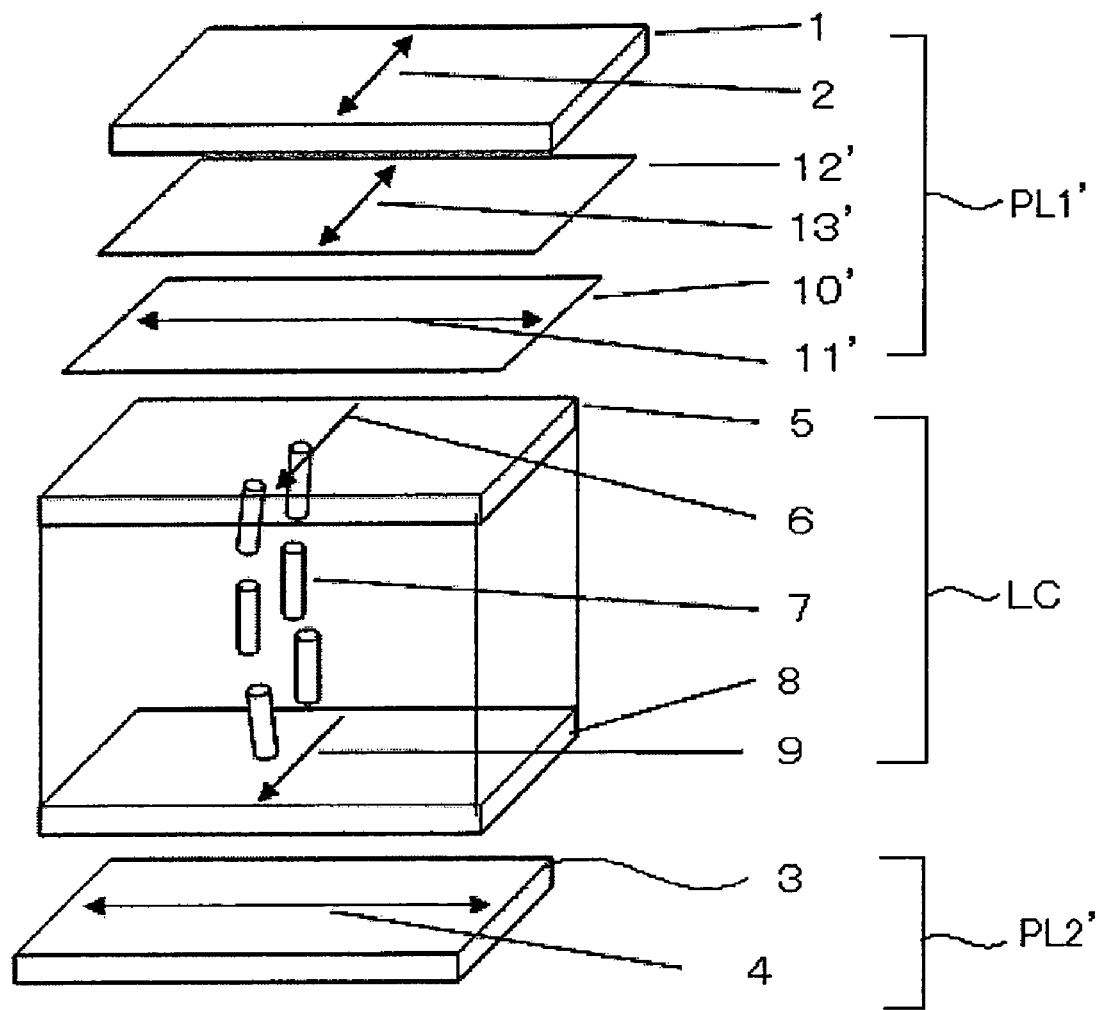
FIG. 2 is a schematic view showing another example of a liquid-crystal display device of the invention.

FIG. 2 is a schematic cross-sectional view of a second embodiment of a liquid-crystal display device of the invention. The liquid-crystal display device shown in FIG. 2 comprises a first polarizing element 1 and a second polarizing element 3 disposed in the top and the bottom of a liquid-crystal cell LC, and comprises a second retardation layer 12' and a first retardation layer 10' between the liquid-crystal cell LC and the first polarizing element 1. The first polarizing element 1 and the second polarizing element 3 are so disposed that their transmission axes 2 and 4 are perpendicular to each other. The first retardation layer 10' and the second retardation layer 12' are so disposed that their slow axes 11' and 13' are perpendicular to each other. Not shown in FIG. 2, the liquid-crystal display device is provided with a backlight. The backlight may be disposed outside any of the upper and lower polarizing elements, but in general, it is preferably disposed outside the polarizing element 3.

The first retardation layer 10 (10') and the second retardation layer 12 (12') each may be a protective film of the first polarizing element 1 and the second polarizing element 3, respectively. For example, in the embodiment shown in FIG. 1, they may be used in the liquid-crystal display device as constitutive members of the upper polarizing plate PL1 and the lower polarizing plate PL2, respectively. In the embodiment shown in FIG. 2, they may be used in the liquid-crystal display device as constitutive members of the upper polarizing plate PL1'. Not shown in FIG. 1, a protective film formed of a polymer film is disposed outside the first polarizing element 1 and the second polarizing element 3 to protect them, and it constitutes a part of the upper polarizing plate PL1 (or PL1') and the lower polarizing plate PL2 (or PL2'), respectively.

In the first and second embodiments shown in FIG. 1 and FIG. 2, the first retardation layer 10 and the second retardation layer 12, and the first retardation layer 10' and the second retardation layer 12' satisfy the following formula (1):

$$0\ nm < \Delta Re_1(548) - \Delta Re_2(548) \leq 50\ nm \tag{1}$$

In this, $\Delta Re_1(548)$ is a value obtained by subtracting in-plane retardation (Re) of the first retardation layer (10 or 10'), measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.; and $\Delta Re_2(548)$ is a value obtained by subtracting Re of the second retardation layer (12 or 12'), measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.

In the first and second embodiments of the invention, the two retardation layers, or that is, the first retardation layer (10 or 10') of which the humidity-dependent Re fluctuation is relatively large and the second retardation layer (12 or 12') of which the humidity-dependent Re fluctuation is relative small are disposed as in the relation shown in FIG. 1 and FIG. 2, and therefore, the humidity-dependent Re fluctuation of the two layers is thereby canceled and the humidity-dependent Re fluctuation is reduced as a whole, and accordingly, the invention provides a liquid-crystal display device of which the humidity dependence of the display capability is small.

Taking an embodiment comprising a VA mode liquid crystal cell, the effect and function of the invention will be described in detail. According to the VA mode liquid crystal cell in a non-driving state without driving voltage, liquid crystal molecules in the liquid crystal layer ("7" in FIG. 1) are substantially vertically-aligned relative to the plane of the substrate. In such a state, being observed in the normal line direction, the VA mode liquid crystal cell achieves a high contrast; on the other hand, being observed in the oblique direction, it suffers from low contrast. This may be caused by two factors, one is that, being observed in the oblique direction, the vertically-aligned liquid crystal layer generates birefringence and another is that, being observed in the oblique direction, the relation between the two transmission axes of the upper and lower polarizing plates shifts from the perpendicular arrangement. According to the invention, the first retardation layer, indicated with "10" in FIG. 1 or "10'" in FIG. 2, and the second retardation layer, indicated with "12" in FIG. 1 or "12'" in FIG. 12', contribute to reducing the light leakage which is caused in the black state by the two factors.

FIGS. 3A-3D and 4A-4D express light-leakage phenomena in an oblique direction on Poincare spheres. The polarizing states expressed on a Poincare sphere are described, for example, in "Crystal Optics (Kessyo Kougaku)" written by Hiroshi Takasaki, published by Morikita Publishing Co., Ltd in 1975, p. 146-163. In each of Figures, the point "P" indicates a polarizing state of a polarizer in an oblique direction; and the point "E" indicates a polarizing state that an analyzer can absorb most effectively in the oblique direction.

Figure 3A:
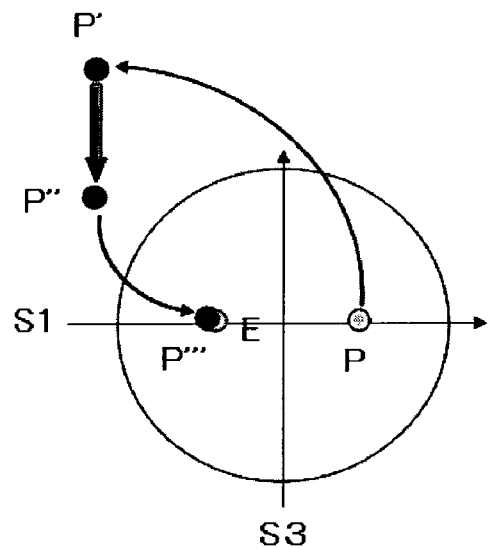
FIGS. 3A and 3B each show a Poincare sphere used for explaining the function of the first embodiment of the invention compared with a comparative example shown in FIGS. 3C and 3D respectively.
Figure 3B:
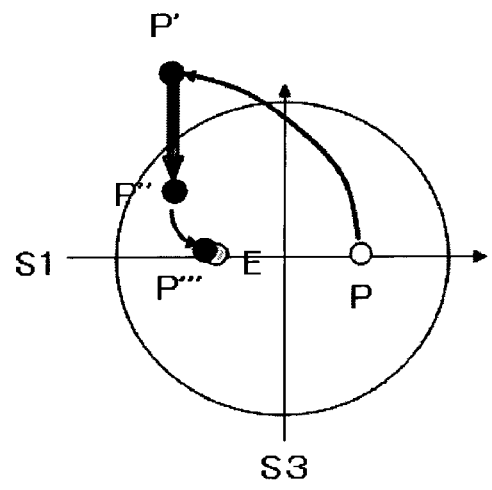

FIG. 3A expresses the functions of the first and second retardation layers according to the first embodiment of the invention. A function of a retardation layer is expressed on a Poincare sphere by a rotational transfer of a point, indicating a polarizing state of light just coming into the retardation layer, to another point with an angle determined as $\{(2\pi) \times (\text{retardation})/(\lambda)\}$ (unit: rad.) with respect to a slow axis on the sphere. As shown in FIG. 3A, passing through the first retardation layer, light is changed in polarizing state from the polarizing state point P to the polarizing state point P'; and, passing through the liquid crystal cell, light is changed in polarizing state to the polarizing state point P''. Passing through the second retardation layer, light is changed in polarizing state from the polarizing state point P'' to the polarizing state point P''' which is equal to the polarizing state point E; and therefore the light leakage in the oblique direction is reduced and the displaying quality is improved. FIG. 3B expresses the functions of the first and second retardation layers of which retardation values are decreased depending on the variation of humidity. The rotational angle for converting from the point P to the point. P' by passing through the first retardation layer is smaller than that shown in FIG. 3A; as well as the rotational angle by the first retardation layer, the rotational angle for converting from the point P'' to the point P''' by passing through the second retardation layer is smaller than that shown in FIG. 3A. Therefore the polarizing state point P''' is nearly equal to the polarizing state point E, and even when the humidity is changed, the light leakage in the oblique direction is reduced and the displaying quality is improved.

Figure 3C:
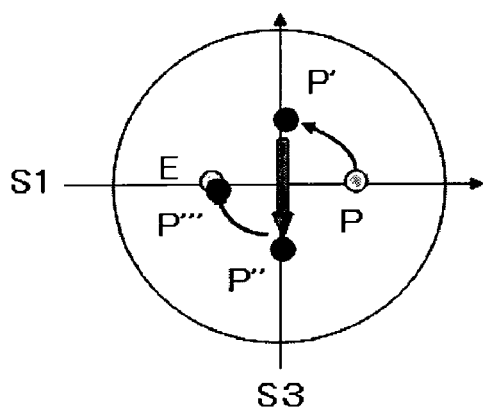
Figure 3D:
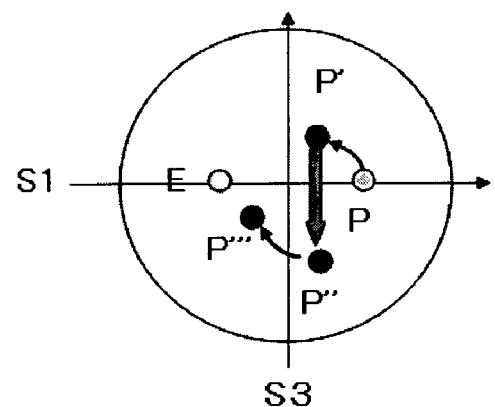

On the other hand, FIGS. 3C and 3D express the functions of the first and second retardation layers of which slow axes are disposed parallel to the transmission axes of the first and second polarizing elements respectively. As shown in FIG. 3D, when the humidity is changed and the retardation values of the first and second retardation layers are decreased, the influences of both of the retardation layers are added to each other rather than canceled to each other. Therefore, the polarizing state point P''' is far from the polarizing state point E; and the light leakage in the oblique direction is increased compared with FIGS. 3A and 3B.

Figure 4A:
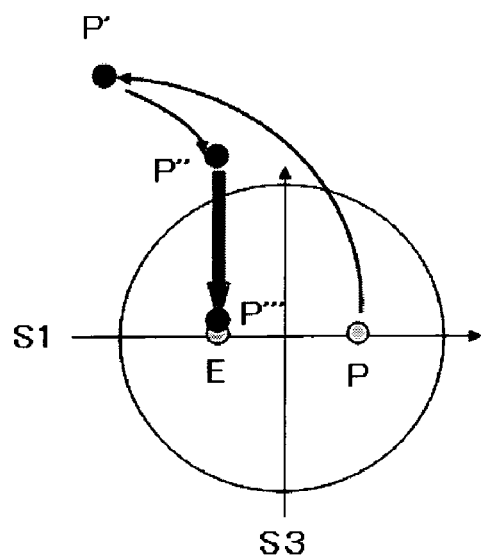
FIGS. 4A and 4B each show a Poincare sphere used for explaining the function of the second embodiment of the invention compared with a comparative example shown in FIGS. 4C and 4D respectively.
Figure 4B:
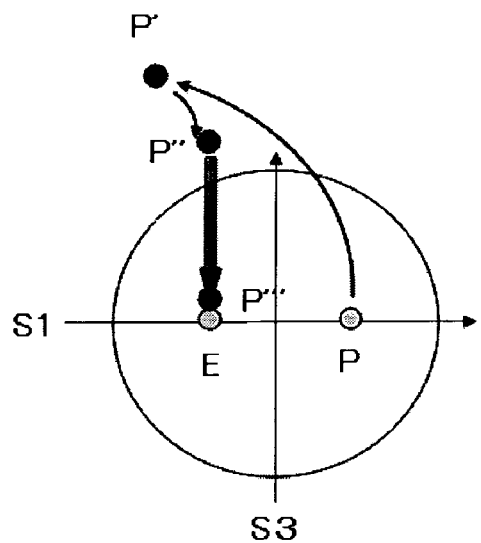

FIG. 4A expresses the functions of the first and second retardation layers according to the second embodiment of the invention. As shown in FIG. 3A, passing through the first retardation layer, light is changed in polarizing state from the polarizing state point P to the polarizing state point P'; and, passing through the second retardation layer, light is changed in polarizing state to the polarizing state point P''. Passing through the liquid crystal cell, light is changed in polarizing state from the polarizing state point P'' to the polarizing state point P''' which is equal to the polarizing state point E; and therefore the light leakage in the oblique direction is reduced and the displaying quality is improved. FIG. 4B expresses the functions of the first and second retardation layers of which retardation values are decreased depending on the variation of humidity. The rotational angle for converting from the point P to the point P' by passing through the first retardation layer is smaller than that shown in FIG. 4A; as well as the rotational angle by the first retardation layer, the rotational angle for converting from the point P' to the point P'' by passing through the second retardation layer is smaller than that shown in FIG. 3B. Therefore, ultimately, the polarizing state point P''' is nearly equal to the polarizing state point E, and even when the humidity is changed, the light leakage in the oblique direction is reduced and the displaying quality is improved.

Figure 4C:
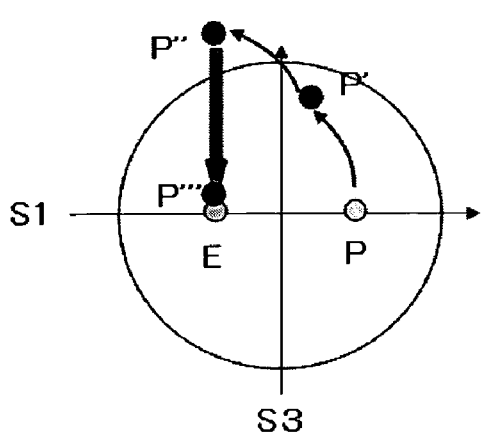
Figure 4D:
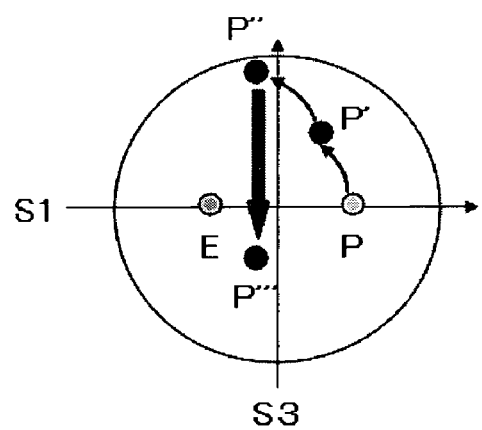

On the other hand, FIGS. 4C and 4D express the functions of the first and second retardation layers disposed so that the slow axis of the first retardation layer is parallel to the transmission axis of the first polarizing element and parallel to the slow axis of the second retardation layer. As shown in FIG. 4D, when the humidity is changed and the retardation values of the first and second retardation layers are decreased, the influences of both of the retardation layers are added to each other rather than canceled to each other. Therefore, the polarizing state point P''' is far from the polarizing state point E; and the light leakage in the oblique direction is increased compared with FIGS. 4A and 4B.

According to the above mentioned functions, in order to obtain more improved effect, preferably, the retardation layers satisfy the following formula;

$$5\ nm \leq \Delta Re_1(548) - \Delta Re_2(548) \leq 40\ nm;$$

and even more preferably, they satisfy the following formula:

$$5\ nm \leq \Delta Re_1(548) - \Delta Re_2(548) \leq 30\ nm.$$

Preferably, Re at a wavelength of 548 nm of the first retardation layer (indicated with 10 or 10' in figs.) and the second retardation layer (indicated with 12 or 12' in figs.) satisfies the following formula (3):

$$Re_1(548) < Re_2(548) \tag{3}$$

Specifically, in the first and second embodiments of the invention, it is desirable that the humidity dependence of Re of the second retardation layer having a relatively large Re is relatively smaller than the humidity dependence of Re of the first retardation layer having a relatively small Re. More preferably, $Re_1(548)+20 \leq Re_2(548)$; and even more preferably, $Re_1(548)+40 \leq Re_2(548)$.

As shown in FIGS. 3A-3D and 4A-4D, the variation in Rth depending on the variation in humidity is expressed on a Poincare sphere by the variation in position (an angle relative to S1 axis) of the rotational axis. Accordingly, for utilizing the effect of the invention sufficiently, that is cancelling the variation in Re depending on the variation in humidity between two retardation layers, it is desirable that the variation in Rth depending on the variation in humidity falls within the certain range relative to the variation in Re depending on the variation in humidity. According to the invention, in terms of more reducing the humidity dependence of the display capability of the device, it is desirable that the first retardation layer 10 and the second retardation layer 12, and the first retardation layer 10' and the second retardation layer 12' satisfy the following formula (2):

$$0.5 \leq |\Delta Rth_1(548) + \Delta Rth_2(548)|/|\Delta Re_1(548) - \Delta Re_2(548)| \leq 10 \tag{2}$$

In this, $\Delta Rth_1(548)$ is a value obtained by subtracting the thickness-direction retardation (Rth) of the first retardation layer (10 or 10') measured under the conditions that a wavelength is 548 nm, that a relative humidity is 80% and that a temperature is 25° C., from Rth thereof measured under the conditions that a wavelength is 548 nm, that a relative humidity is 10% and that a temperature is 25° C.; and $\Delta Rth_2(548)$ is a value obtained by subtracting Rth of the second retardation layer (12 or 12'), measured under the conditions that a wavelength is 548 nm, that a relative humidity is 80% and that a temperature is 25° C., from Rth thereof measured under the conditions that a wavelength is 548 nm, that a relative humidity is 10% and that a temperature is 25° C.

More preferably, the formula (2) is $$0.5 \leq |\Delta Rth_1(548) + \Delta Rth_2(548)|/|\Delta Re_1(548) - \Delta Re_2(548)| \leq 5,$$

even more preferably, $$1 \leq |\Delta Rth_1(548) + \Delta Rth_2(548)|/|\Delta Re_1(548) - \Delta Re_2(548)| \leq 3.$$

The polarization state of the light having passed through the liquid-crystal display device of FIG. 1 and FIG. 2 is described below.

The liquid-crystal cell LC comprises a liquid-crystal layer 7 and, as disposed in the top and the bottom thereof, a liquid-crystal cell upper substrate 5 and a liquid-crystal cell lower substrate 8. Not shown in FIG. 1, the liquid-crystal cell LC comprises, inside it, an alignment film and a pair of electrode layers for imparting an electric field to the liquid-crystal layer 7. The liquid-crystal cell LC is a VA-mode liquid-crystal cell, and this is so planned that the tilt angle that indicates the alignment direction of the liquid-crystal molecules in the liquid-crystal layer 7 is controlled to be vertical, at about 90° to the substrates 5 and 8 at the time of no driving voltage application to the cell. At the time of driving voltage application thereto, the liquid-crystal molecules in the liquid-crystal layer 7 are inclined along the direction going to the substrate surface. Depending on the level of the product $\Delta$nd of the thickness d of the liquid-crystal layer 7 and the diffractive anisotropy $\Delta$n, the brightness in the white state varies, and therefore, for obtaining the maximum brightness, the thickness of the liquid-crystal layer 7 is defined to fall within a range of from 0.2 µm to 0.5 µm. One example of the liquid-crystal layer 7 is a liquid-crystal layer of a liquid crystal having negative dielectric anisotropy of $\Delta$n of 0.0813 and $\Delta\epsilon$ of −4.6 or so, and having a thickness d of about 3.5 µm or so.

In the non-driving condition in which no driving voltage is applied to the liquid-crystal layer 7, the liquid-crystal molecules in the liquid-crystal layer 7 are aligned nearly vertically relative to the substrate surface, and as a result, the polarization state of the light having entered the cell through the lower polarizing plate PL2 (or PL2') does not almost change in the liquid-crystal layer 7. As opposed to this, in the driving condition, the liquid-crystal molecules are inclined along the direction going to the substrate surface, and therefore light is changed in polarization state by passing through the liquid crystal layer 7 from the lower polarizing plate PL2 (or PL2'). In other words, in the non-driving condition, the device provides the black state; and in the driving condition, it provides the white state. When the panel is observed in the normal line direction to the panel face, then the device provides a high contrast because of this principle; but in the oblique direction, the contrast lowers. This may be caused by two factors, one is that, being observed in the oblique direction, the vertically-aligned liquid crystal layer generates birefringence and another is that, being observed in the oblique direction, the relation between the two transmission axes of the upper and lower polarizing plates shifts from the perpendicular position. According to the invention, the first retardation layer, indicated with "10" in FIG. 1 or "10'" in FIG. 2, and the second retardation layer, indicated with "12" in FIG. 1 or "12'" in FIG. 12', contribute to reducing the light leakage which is caused in the black state by the two factors. Accordingly, it is desirable that the first retardation layer (10 or 10') and the second retardation layer (12 or 12') satisfy the above-mentioned formula (1) (more preferably satisfy the formula (2)), and in terms of contributing toward preventing the viewing angle-dependent contrast reduction and color shift, the first retardation layer (10 or 10') preferably satisfies the following formulas (4) and (5) and the second retardation layer (12 or 12') preferably satisfies the following formulas (6) and (7):

$$5\ nm \leq Re_1(548) \leq 300\ nm \tag{4}$$

$$50\ nm \leq Rth_1(548) \leq 400\ nm \tag{5}$$

$$40\ nm \leq Re_2(548) \leq 300\ nm \tag{6}$$

$$60\ nm \leq Rth_2(548) \leq 400\ nm \tag{7}$$

The above expression (4) is preferably $10\ nm \leq Re_1(548) \leq 80\ nm$, more preferably $15\ nm \leq Re_1(548) \leq 60\ nm$.

The above expression (5) is preferably $65\ nm \leq Rth_1(548) \leq 300\ nm$, more preferably $80\ nm \leq Rth_1(548) \leq 250\ nm$.

The above expression (6) is preferably $50\ nm \leq Re_2(548) \leq 250\ nm$, more preferably $60\ nm \leq Re_2(548) \leq 200\ nm$.

The above expression (7) is preferably $80\ nm \leq Rth_2(548) \leq 300\ nm$, more preferably $90\ nm \leq Rth_2(548) \leq 200\ nm$.

In FIG. 1 and FIG. 2, an embodiment of using a liquid-crystal material having negative dielectric anisotropy is shown in which an electric field is applied between the upper and lower substrates and the liquid-crystal molecules respond vertically to the direction of the electric field. In a different case where an electrode is disposed on one substrate and an electric field is applied in the horizontal direction parallel to the substrate surface, a liquid-crystal material having positive dielectric anisotropy may be used.

In a VA-mode liquid-crystal display device, a chiral agent that is generally used in a TN-mode liquid-crystal display device is scarcely added as worsening the dynamic response characteristics of the device, but it may be added for reducing the alignment failure. Concretely, liquid-crystal molecules hardly respond in the region boundary of alignment domains and there may occur a problem of brightness reduction since the black display is kept at the time of normal black level of display; but in such a case, a chiral agent may be added to the liquid-crystal material so as to reduce the boundary region.

Though the detailed structure is not shown in the drawings, a color filter may be disposed inside the liquid-crystal cell. Also not shown, in a transmission-type liquid-crystal display device, a cold cathode or hot cathode fluorescent tube, or a backlight with a light source of a light-emitting diode, a field emission element or an electroluminescent element may be disposed in the back of the device.

The liquid-crystal display device of the invention includes image direct-view type devices, image projection type devices and photomodulation type devices. The invention is effective to active matrix liquid-crystal display devices comprising a 3-terminal or 2-terminal semiconductor element such as TFT or MIM. Needless-to-say, the invention is also effective to passive matrix liquid-crystal display devices such as typically STN mode devices that are referred to as time-shearing driving devices.

In a VA-mode liquid-crystal display device, the liquid-crystal molecules are inclined to the substrate face and aligned as such at the time of white level of display; but in the direction opposite to the inclination direction, the birefringence level of the liquid-crystal molecules varies when watched obliquely, therefore giving a difference in the brightness and the color tone. To solve this problem, a technique of multi-domain structure formation has been proposed in which one pixel of a liquid-crystal display device is divided into plural domains. The liquid-crystal display device of the invention may also have such a multi-domain structure where one pixel is divided into plural domains. Concretely, one pixel is divided into plural domains, and in electric field application, the liquid-crystal molecules in the individual domains are made to be inclined in different directions from the others, thereby averaging the viewing angle characteristics of the device. In order to divide the alignment in one pixel, the electrodes may be planned to have slits or projections, or the electric field direction may be changed or the electric field density may be shifted. For obtaining a viewing angle for uniform image expression in every direction, the number of the domains may be increased. For example, an almost uniform viewing angle can be obtained the devices with 4-domains or 8-domains. In particular, the devices with 8-domains are favorable since the absorption axis of the polarizing plate therein may be at any desired angle.

The first and second retardation layers for use in the invention are described in more detail hereinunder.

[First Retardation Layer]

In the invention, it is desirable that the first retardation layer serves also as a protective film for a polarizing plate element in terms of reducing the thickness of the liquid-crystal display device. Especially preferably, the first retardation layer is formed of a cellulose acylate film, as the film has the characteristics of a protective film for a polarizing element such as the workability into a polarizing plate and as its material is inexpensive.

In this description, "cellulose acylate film" is meant to indicate a film of which the material composition contains at least 50% by mass of cellulose acylate.

(Cellulose Acylate)

At first, cellulose acylate, which can be used as a material of a cellulose acylate film to be used as the first retardation layer, will be described in detail.

The degree of substitution of cellulose acylate means the degree of acylation of three hydroxyl groups existing in the constitutive unit (($\beta$)1,4-glycoside-bonding glucose) of cellulose. The degree of substitution (degree of acylation) may be computed by measuring the bonding fatty acid amount per the constitutive unit mass of cellulose. The determination may be carried out according to "ASTM D817-91".

Preferably, the cellulose acylate is selected from cellulose acetates having a degree of acetyl substitution of from 2.50 to 2.97. More preferably, the degree of acetyl substitution is from 2.70 to 2.97. The degree of acyl substitution at the 6-position with respect to the total degree of acyl substitution is preferably equal to or more than 0.25, and more preferably equal to or more than 3.0.

Preferably, the cellulose acylate has a mass-average degree of polymerization of from 300 to 800, more preferably from 370 to 600. Also preferably, the cellulose acylate for use in the invention has a number-average molecular weight of from 70,000 to 230,000, more preferably from 75,000 to 230,000, even more preferably from 78,000 to 120,000.

The cellulose acylate may be produced, using an acid anhydride or an acid chloride as the acylating agent for it. One most general production method for producing the cellulose acylate on an industrial scale comprises esterifying cellulose obtained from cotton linter, wood pulp or the like with a mixed organic acid component comprising an organic acid corresponding to an acetyl group and other acyl group (acetic acid, propionic acid, butyric acid) or its acid anhydride (acetic anhydride, propionic anhydride, butyric anhydride). According to this process, before being esterified, in general, cellulose obtained from cotton linter and wood pulp is subjected to an activation treatment with organic acid such as acetic acid. Acid anhydride may be used in excess compared with the amount of hydroxy groups in cellulose. According to the esterification, the hydrolysis, or in other words depolymerization reaction, of $\beta 1 \rightarrow 4$ glycoside bonds in cellulose major chain may be carried out while the esterification is carried out. When the hydrolysis of the main chain is carried out, the polymerization degree of cellulose acylate is decreased and therefore properties of a cellulose acylate film made of it may be lowered. The reaction conditions such as reaction temperature may reflect the preferable polymerization degree and/or molecular weight of cellulose acylate.

In order to obtain cellulose acylate having a high polymerization degree (high molecular weight), the highest temperature in the esterification step may be set to a temperature equal to or less than 50° C. The highest temperature is preferably from 35 to 50° C., and more preferably from 37 to 47° C. By setting the reaction temperature to a temperature equal to or higher than 35° C., it is possible to carry out the esterification more promptly. By setting the reaction temperature to a temperature equal to or less than 50° C., it is possible to prevent the polymerization degree from lowering more effectively. The reaction may be terminated as the temperature is controlled for avoiding increase of temperature, which can prevent the polymerization degree from lowering and can produce a cellulose acylate having a high polymerization degree. More specifically, when reaction terminator such as water or acetic acid is added to the reaction system after the termination of the reaction, excess acid anhydride, which is not involved in the esterification, may hydrolyze to form corresponding organic acid as by-product. Since the hydrolysis is exothermic intensively, the temperature inside of the reactor is increased. When the rate of addition of the reaction terminator is high, the increase of temperature cannot be canceled by the capability of cooling of the reactor and the temperature inside of the reactor is increased rapidly. As a result, the hydrolysis of cellulose major chain proceeds dramatically and the polymerization degree of the obtained cellulose acylate is decreased. A catalyst may combine to cellulose partially during the esterification, and almost all of the combined catalyst may be dissociated from cellulose during the addition of the reaction terminator. However, when the rate of addition of the reaction terminator is high, the addition period is so short that catalyst cannot be dissociated from cellulose partly and remains in the state combined with cellulose. The cellulose acylate combining with strong-acid catalyst partially suffers from low stability; and, being applied heat for drying, such the cellulose acylate may be easily decomposed and the polymerization degree may be decreased. Therefore, preferably, it takes four or more minutes, more preferably from 4 to 30 minutes, to terminate the reaction by adding the reaction terminator to the reaction system. The addition period for termination of the reaction is preferably not longer than 30 minutes in terms of manufacturing. Examples of the reaction terminator include water and alcohols which have been usually used for decomposition of acid anhydride. However, for avoiding precipitation of tri-esters, which are hardly dissolved in any organic solvent, a mixture of water and any alcohol is preferably used as a reaction terminator. The esterification is carried out under the above mentioned conditions, which easily produces a cellulose acylate having a high weight-averaged molecular weight equal to or more than 500.

(Retardation Enhancer)

For preparing a cellulose acylate film to be used as the first retardation layer, a retardation enhancer may be added to the cellulose acylate film. It is noted that the term "retardation enhancer" is used for any compounds capable of developing or enhancing birefringence in the in-plane direction and/or the thickness direction.

Preferably, the compounds having an absorption peak at a wavelength from 250 nm to 380 nm and, in addition to such a property, having a molar absorbance coefficient equal to or less than 1000 at any wavelength from 400 to 700 nm, are employed as the retardation enhancer. The compounds having such absorption properties may achieve the desired wavelength dependency in retardation without inducing any coloration.

The compounds represented by the formula (1) are especially preferred as the Rth enhancer.

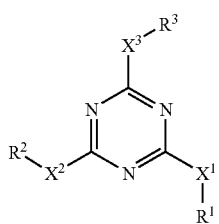

(I)

In the formula, $X^1$ represents a single bond, —$NR^4$—, —O— or —S—; $X^2$ represents a single bond, —$NR^5$—, —O— or —S—; $X^3$ represents a single bond, —$NR^6$—, —O— or —S—. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

In the formula, $R^1$, $R^2$ and $R^3$ each represent an alkyl group, an alkenyl group, an aromatic cyclic group or a heterocyclic group, preferably represent an aromatic cyclic group or a heterocyclic group, and even more preferably represent an aromatic cyclic group. Preferable examples of the aromatic cyclic group represented by $R^1$, $R^2$ or $R^3$ include phenyl and naphthyl, and phenyl is more especially preferred.

The aromatic cyclic group or heterocyclic group represented by $R^1$, $R^2$ or $R^3$ may have at least one substituent. Examples of the substituent include halogen atoms such as fluorine and chlorine atoms; hydroxy, cyano, nitro, carboxy, alkyls, alkenyls, aryls, alkoxys, alkenyloxys, aryloxys, acyloxys, alkoxycarbonyls, alkenyloxycarbonyls, aryloxycarbonyls, sulfamoyl, alkyl-substituted sulfamoyls, alkenyl-substituted sulfamoyls, aryl-substituted sulfamoyls, sulfonamido, carbamoyl, alkyl-substituted carbamoyls, alkenyl-substituted carbamoyls, aryl-substituted carbamoyls, amido, alkylthios, alkenylthios, arylthios and acyls. Examples also include those having at least one substituent selected from those.

The heterocyclic group represented by $R^1$, $R^2$ or $R^3$ is preferably selected from aromatic heterocyclic groups. In general, an aromatic hetero ring is an unsaturated hetero ring, and preferably an unsaturated hetero ring having a maximum number of double bondings. The hetero ring is preferably a 5-, 6- or 7-membered ring, more preferably 5- or 6-membered ring, and even more preferably 6-membered ring. Hetero atoms embedded in the hetero ring is preferably selected from the group consisting of nitrogen, sulfur and oxygen atoms, and more preferably a nitrogen atom. Preferable examples of the aromatic hetero ring include pyridine ring (as heterocyclic group, 2-pyridil group or 4-pylidil group). The heterocyclic group may have at least one substituent.

In the formula, preferably, $X^1$ represents a single bond, —$NR^4$—, —O— or —S— and more preferably —$NR^4$—; $X^2$ represents a single bond, —$NR^5$—, —O— or —S—, and more preferably —$NR^5$—; and $X^3$ represents a single bond, —$NR^6$—, —O— or —S—, and more preferably —$NR^6$—. $R^4$, $R^5$ and $R^6$ each represent a hydrogen atom, alkyl group, alkenyl group, aryl group or heterocyclic group; and more preferably all of are hydrogen atoms.

The alkyl group represented by $R^4$, $R^5$ or $R^6$ may have a cyclic or chain structure, and preferred are alkyls having a chain structure. Linear chain alkyls are preferred to branched-chain alkyls. Examples of the number of carbon atoms in the alkyl group include the range from 1 to 30, then range from 1 to 20, the range from 1 to 10, the range from 1 to 8, and the range from 1 to 6. The alkyl group may have at least one substituent. Examples of the substituent include halogen atoms, alkoxys such as methoxy and ethoxy; and acyloxys such as acryloyl oxy and methacryloyl oxy.

The alkenyl group represented by $R^4$, $R^5$ or $R^6$ may have a cyclic or chain structure, and preferred are alkenyls having a chain structure. Linear chain alkenyls are preferred to branched chain alkenyls. Examples of the number of carbon atoms in the alkenyl group include the range from 2 to 30, then range from 2 to 20, the range from 2 to 10, the range from 2 to 8, and the range from 2 to 6. The alkenyl group may have at least one substituent. Examples of the substituent are same as those exemplified as substituent of the alkyl.

The aromatic ring group or the heterocyclic group represented by $R^4$, $R^5$ or $R^6$ is as same as that respectively represented by $R^1$, $R^2$ or $R^3$; and preferable scopes of those are also same as those represented by $R^1$, $R^2$ or $R^3$. The aromatic ring group or the heterocyclic group may have at least one substituent, and examples of the substituent are same as those exemplified as substituent of the aromatic ring group or the heterocyclic group represented by $R^1$, $R^2$ or $R^3$.

Preferred examples, I-(1) to IV-(10), of the compound represented by formula (1) include, but are not limited to, those shown below.

I-(1) 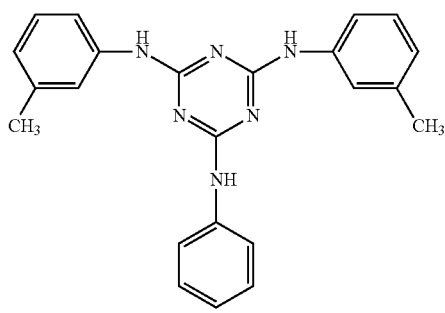
I-(2) 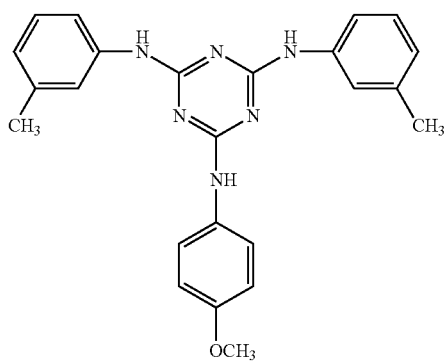
I-(3) 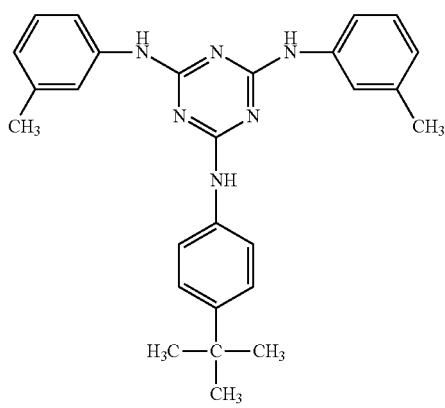
I-(4) 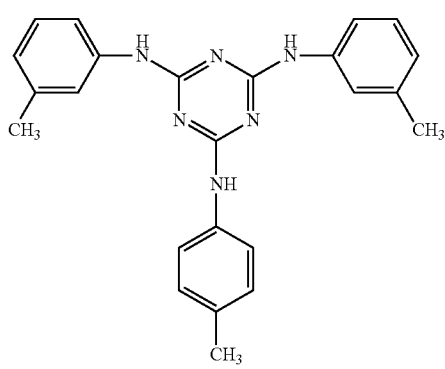
I-(5) 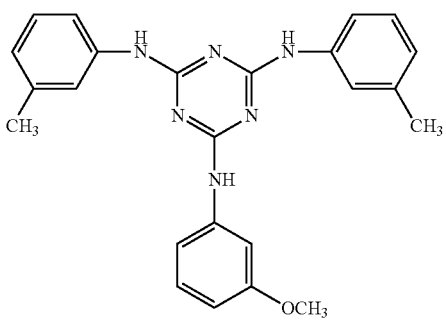
I-(6) 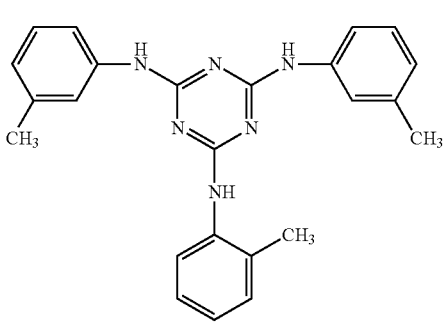
I-(7) 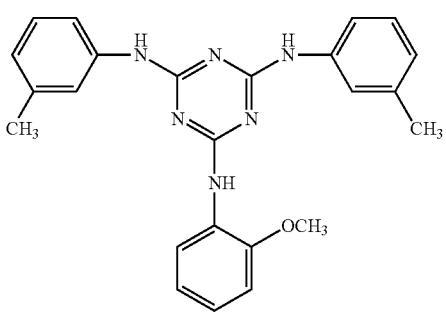
I-(8)

I-(9)
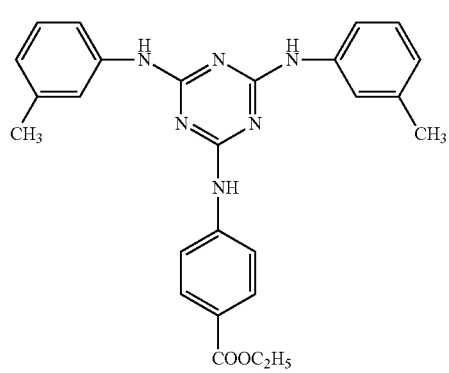
I-(10)
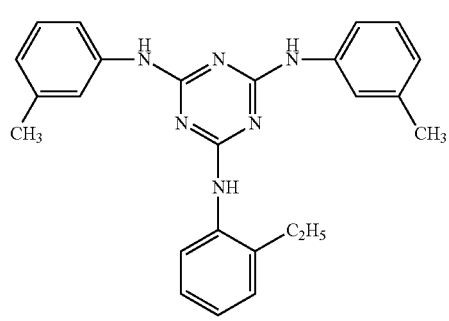
I-(11)
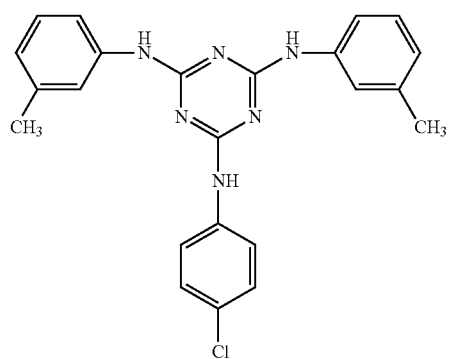
I-(12)
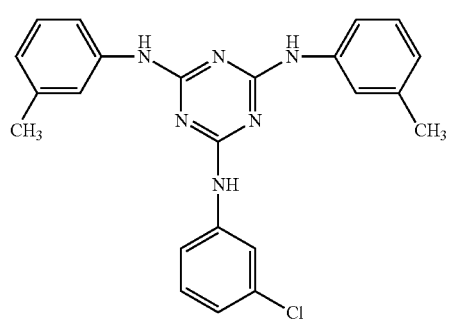
I-(13)
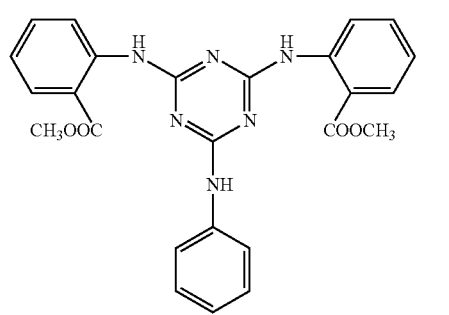
I-(14)
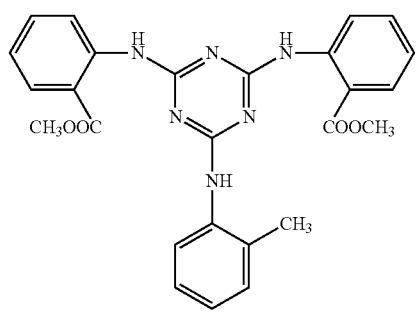
I-(15)
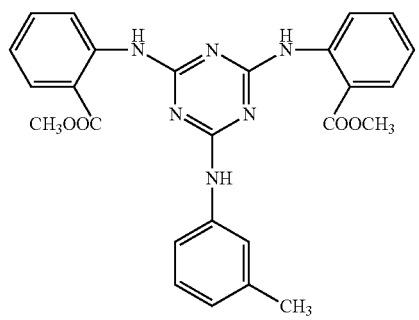
I-(16)
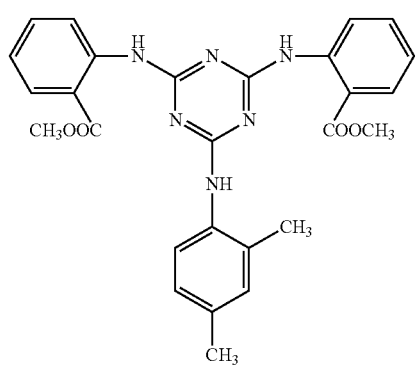
I-(17)
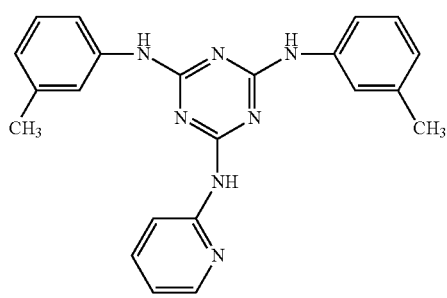
I-(18)
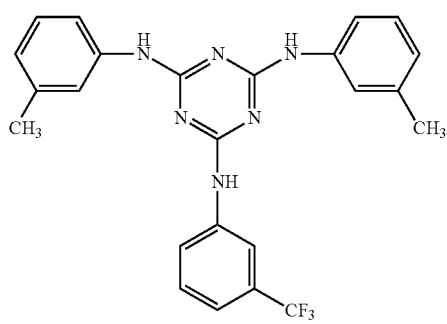

I-(19) 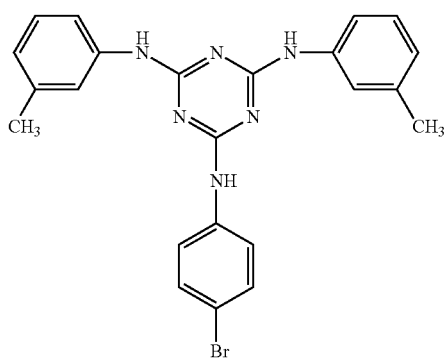
I-(20) 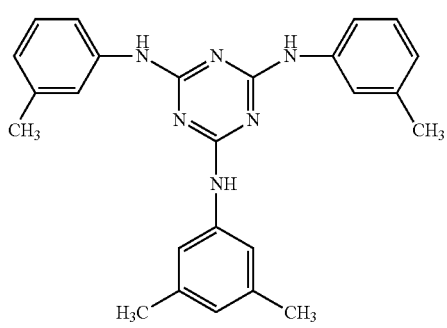
I-(21) 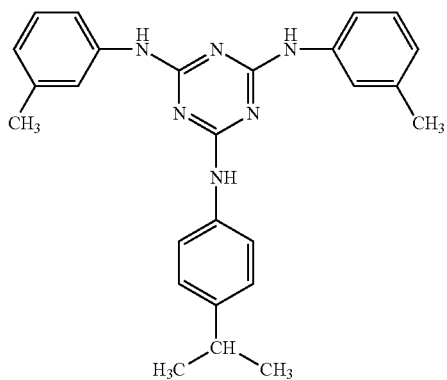
I-(22) 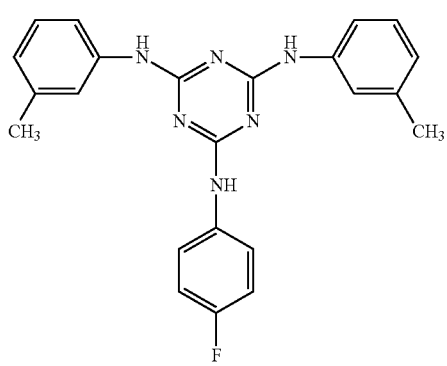
I-(23) 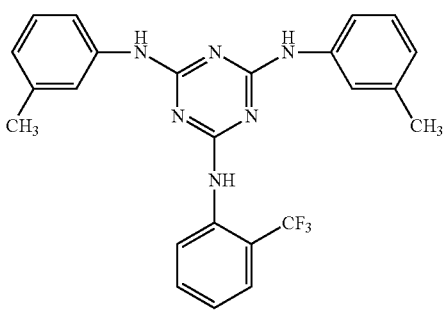
I-(24) 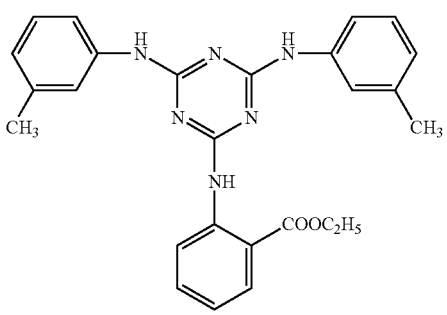
I-(25) 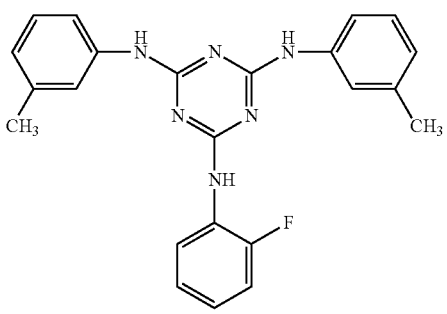
I-(26) 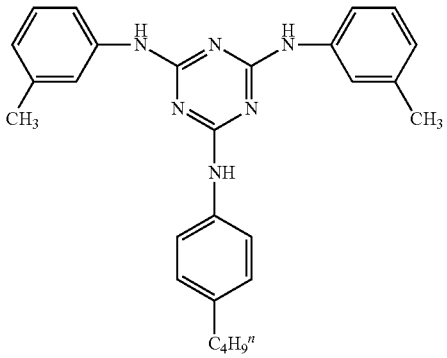
I-(27) 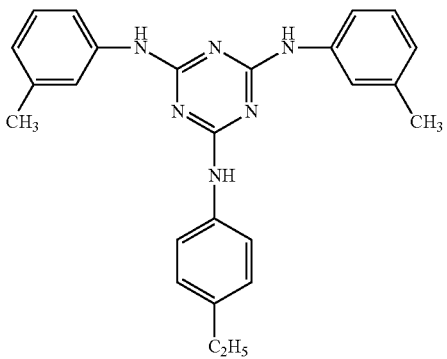

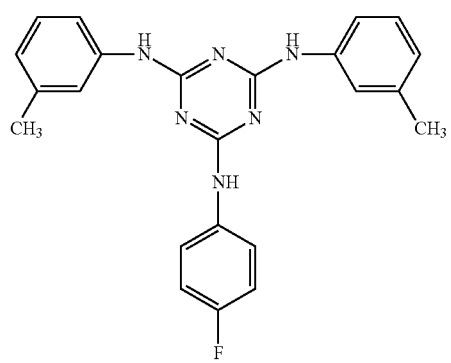 I-(28)
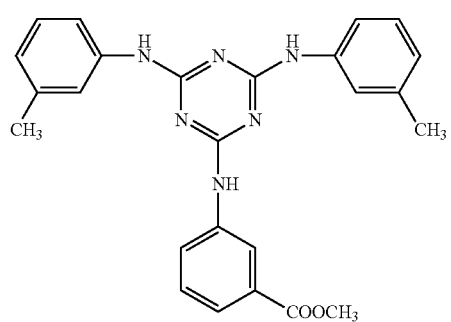 I-(29)
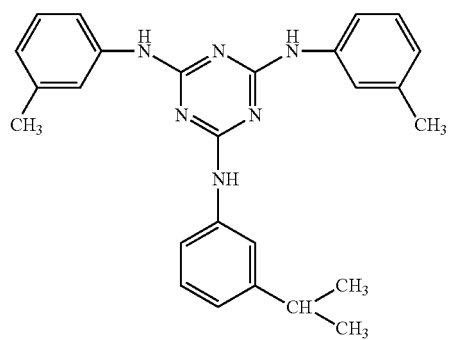 I-(30)
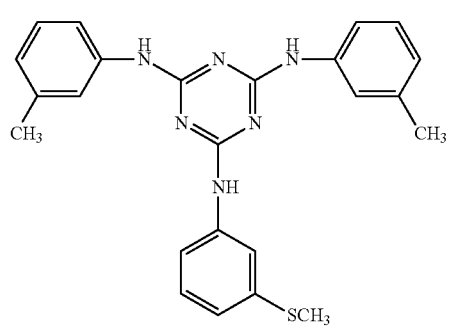 I-(31)
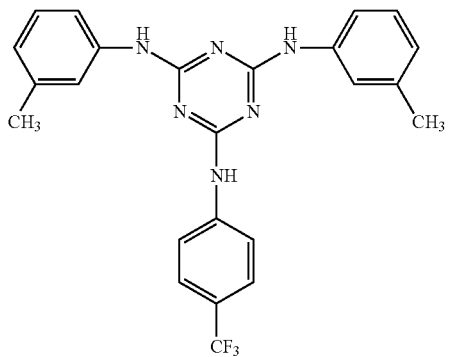 I-(32)
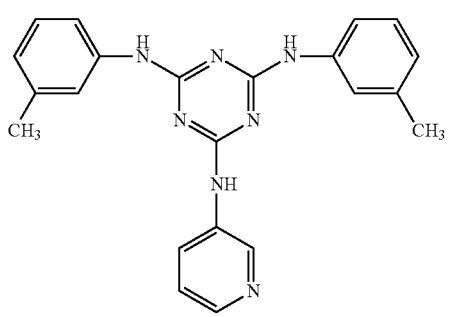 I-(33)
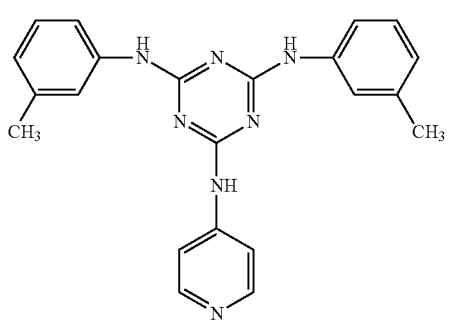 I-(34)
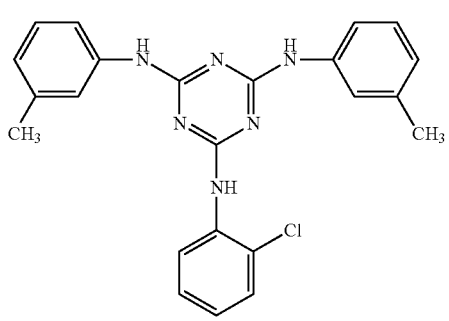 I-(35)
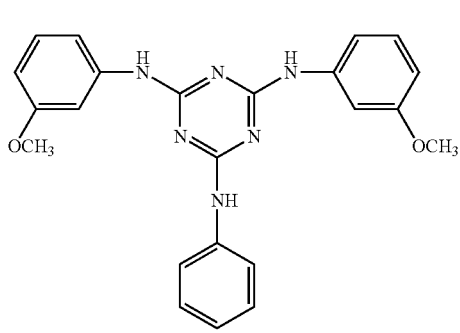 I-(36)

I-(37)
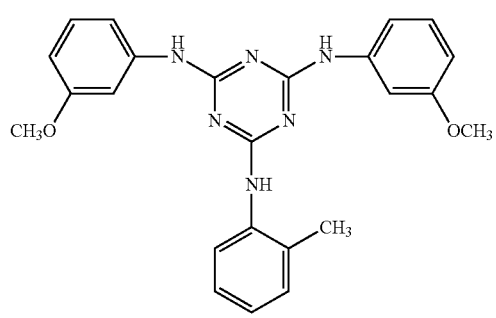
I-(41)
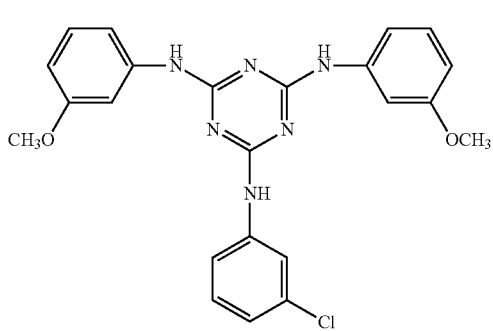
I-(38)
I-(42)
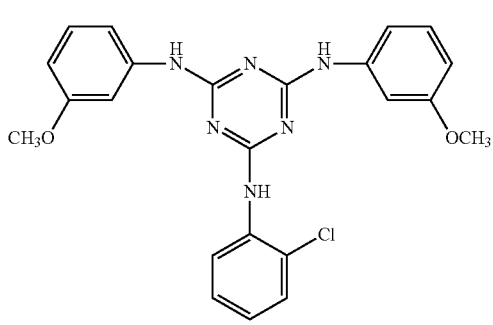
I-(39)
I-(43)
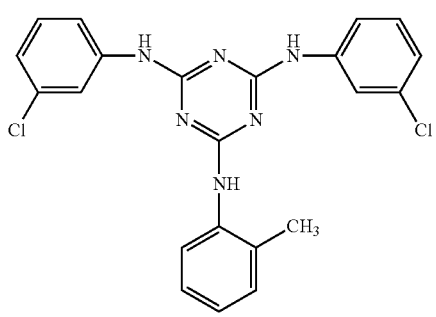
I-(40)
I-(44)
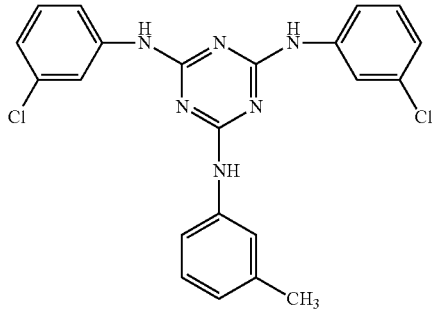

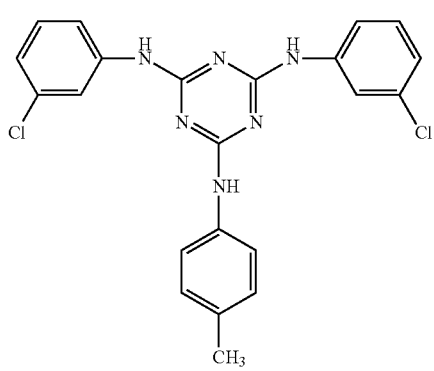
I-(45)
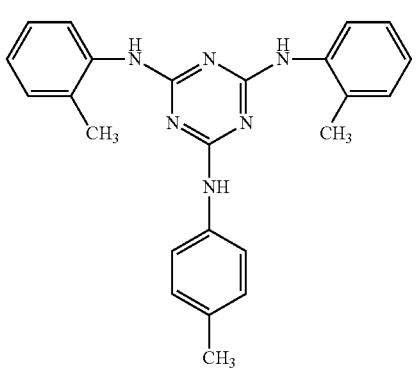
I-(49)
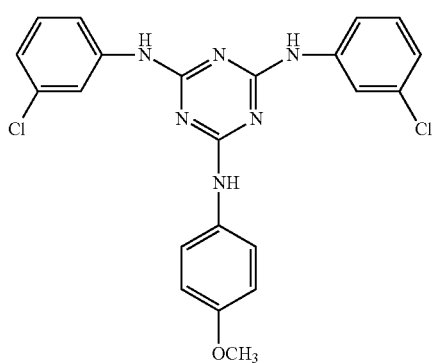
I-(46)
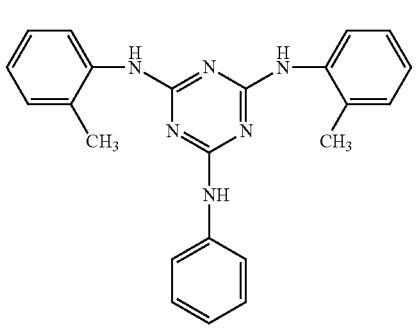
I-(50)
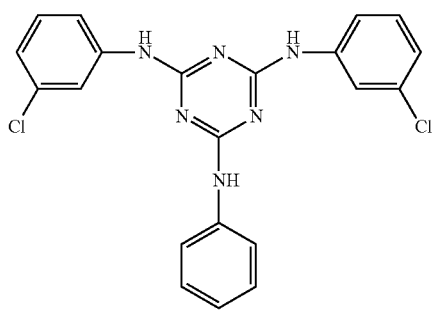
I-(47)
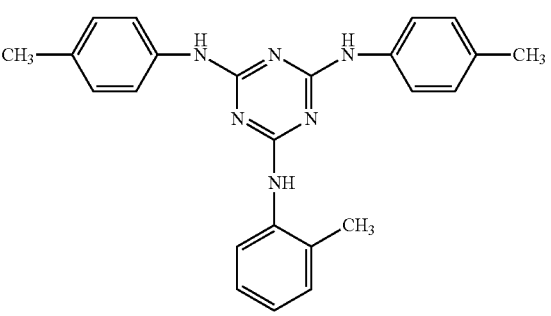
II-(1)
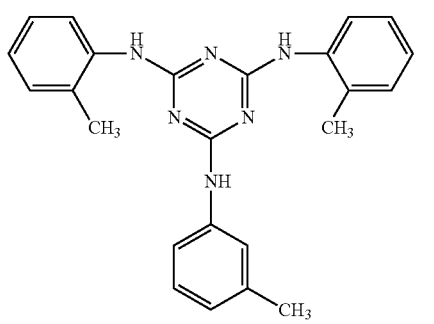
I-(48)
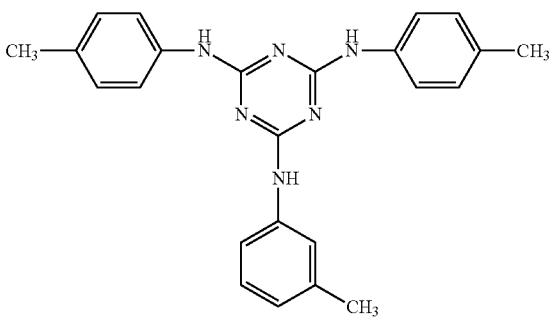
II-(2)

II-(3)
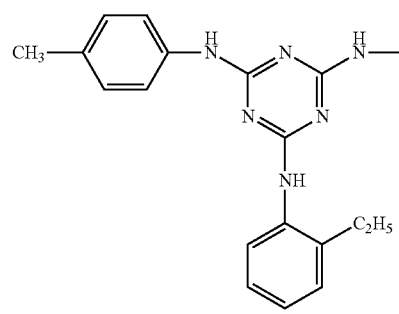
II-(4)
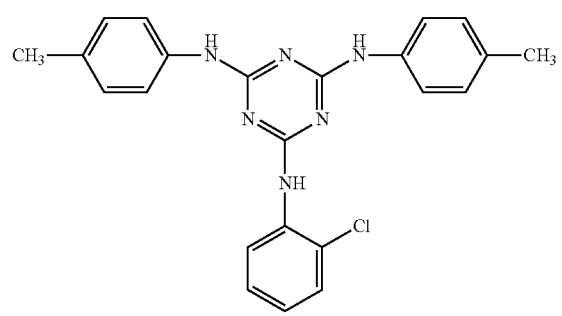
II-(5)
II-(6)
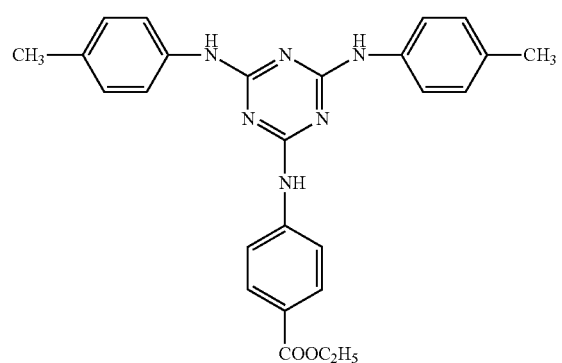
II-(7)
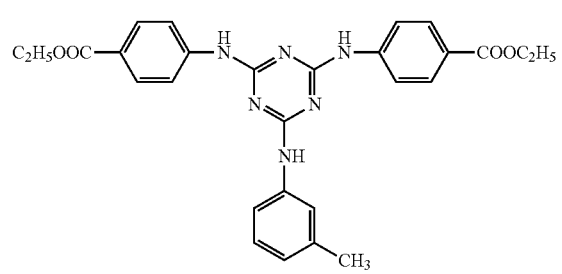
II-(8)
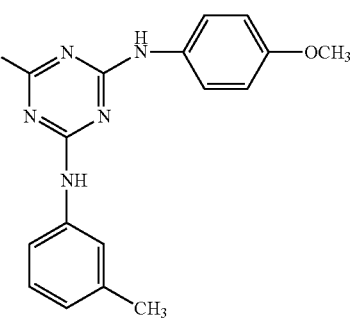
II-(9)
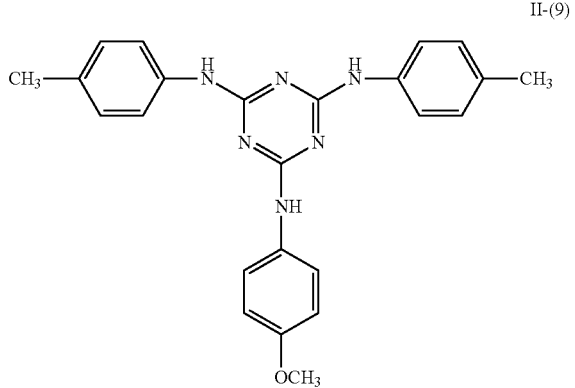
III-(1)
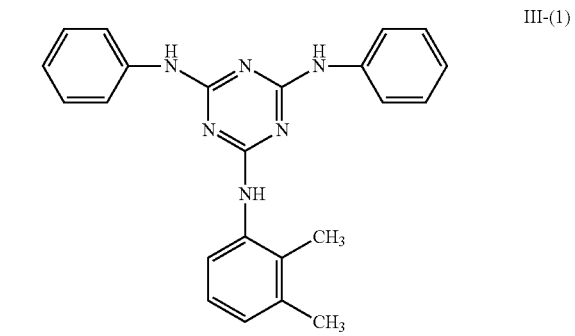
III-(2)
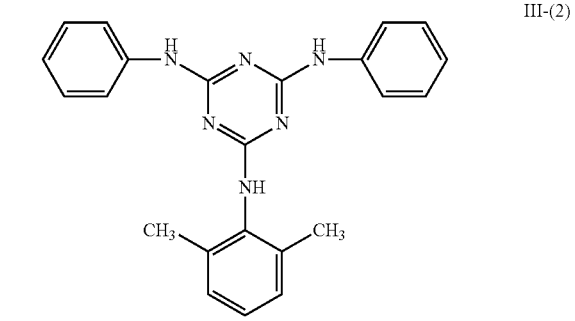

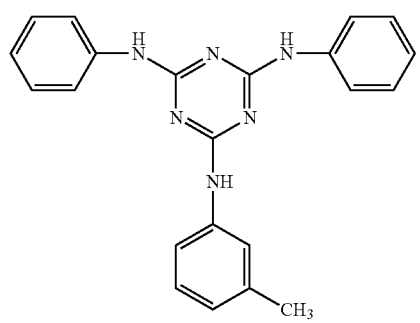
III-(3)
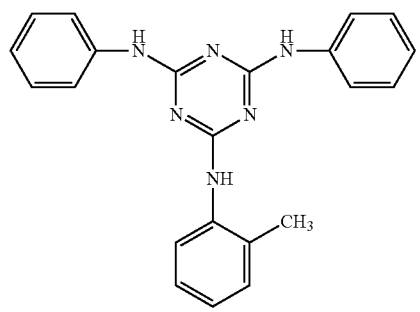
III-(4)
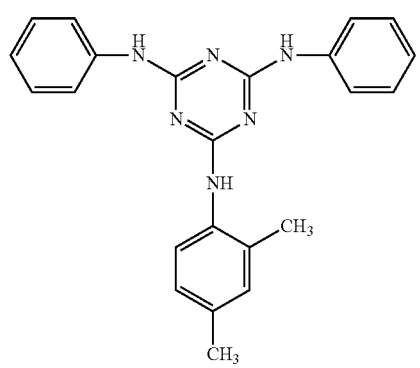
III-(5)
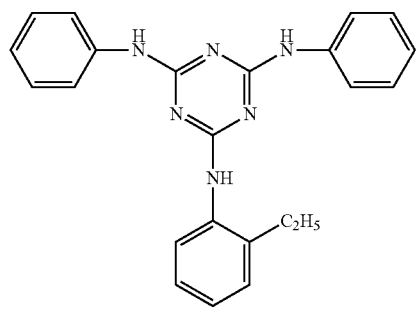
III-(6)
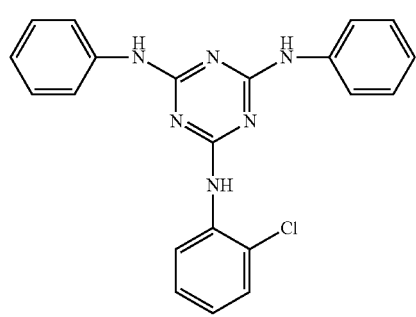
III-(7)
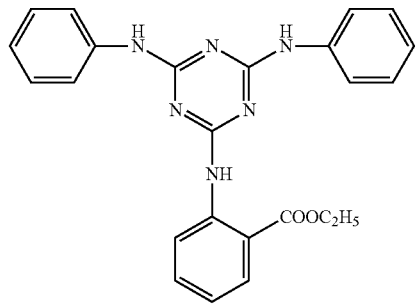
III-(8)
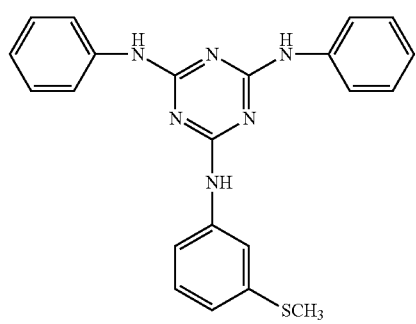
III-(9)
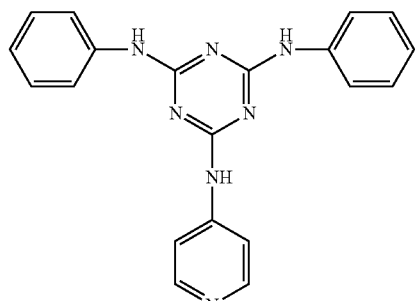
III-(10)
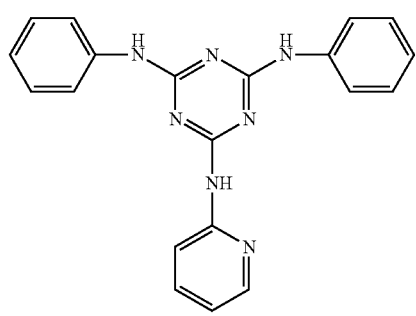
III-(11)
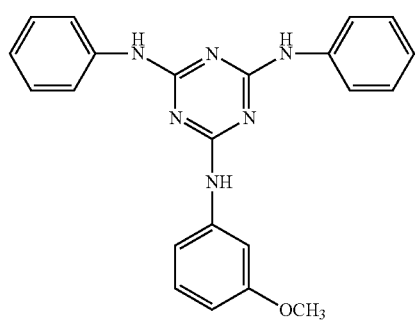
III-(12)

-continued
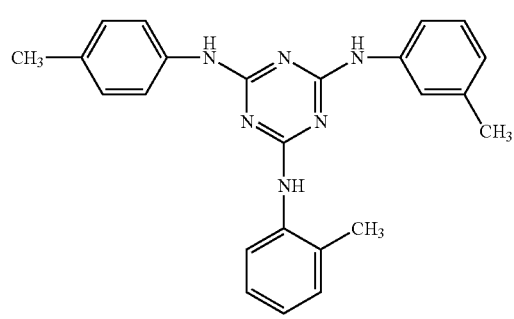
IV-(1)
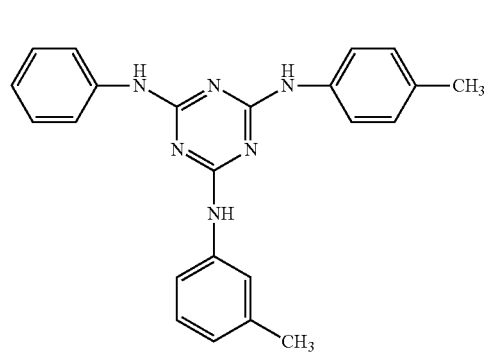
IV-(2)
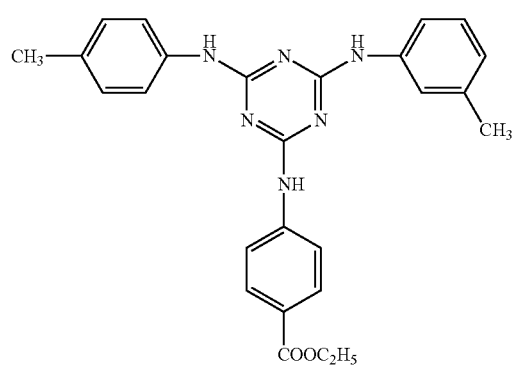
IV-(3)
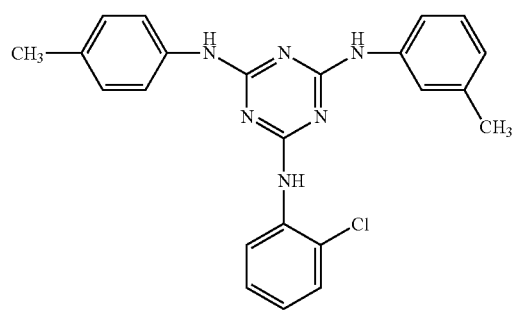
IV-(4)
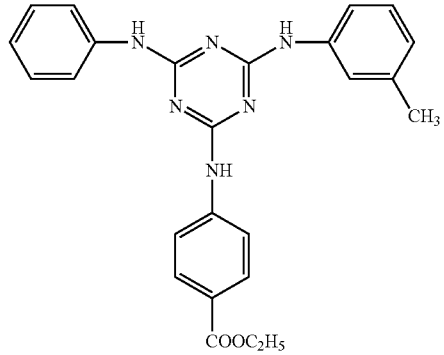
IV-(5)
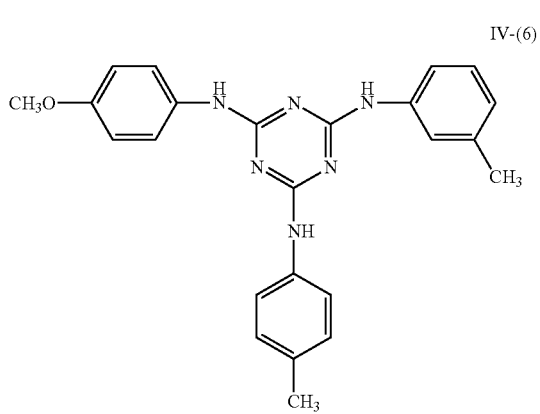
IV-(6)
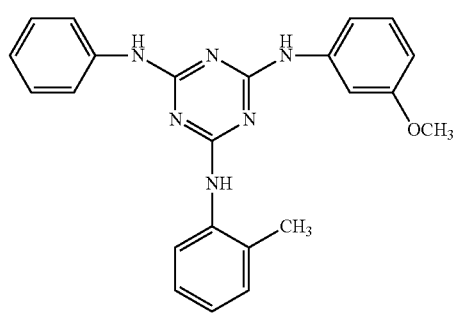
IV-(7)
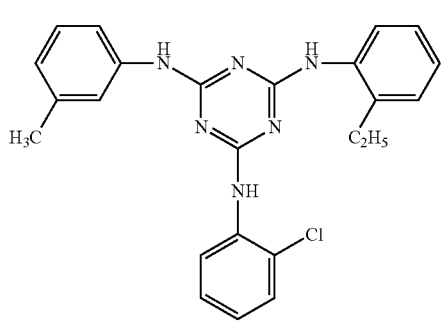
IV-(8)

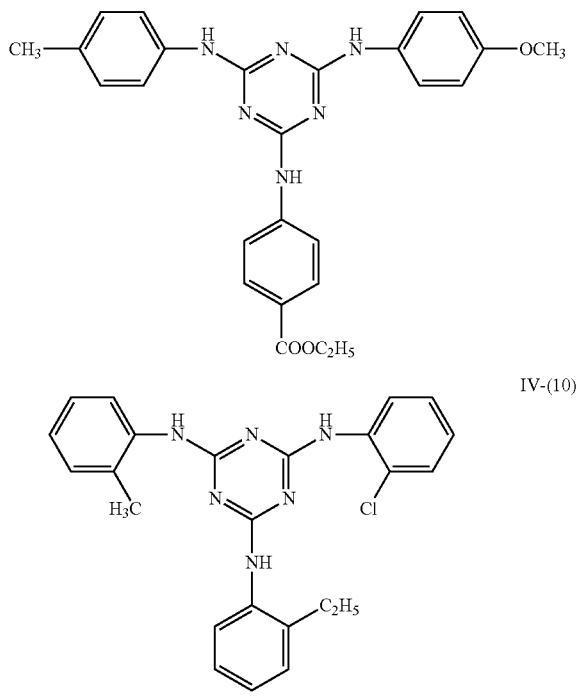

According to the invention, one species or any combinations of plural species of the compound represented by the formula may be employed as the retardation enhancer. The amount of the retardation enhancer is preferably from 0.1 to 30 mass %, more preferably from 1 to 25 mass % and much more preferably from 3 to 15 mass % with respect to the total mass of cellulose acylate. Using any combinations of plural species of the compound, the total amount of the compounds preferably fall within the range.

When the cellulose acylate film is produced according to a solvent cast method, the retardation enhancer may be added to the dope. The addition of the retardation enhancer to the dope may be conducted any stage, and for example, a solution of the Re enhance may be prepared by dissolving it in an organic solvent such as alcohol, methylene chloride or dioxolane and then added to the dope; or the retardation enhancer may be added to the dope directly.

(UV Absorber)

The cellulose acylate film to be used as the first retardation layer may comprise a UV absorber. Some UV absorbers can function as a retardation enhancer, and in the invention, UV absorber is used as a retardation enhancer alone or in combination with another additive. Examples of the UV absorbent include oxybenzophenone compounds, benzotriazole compounds, salicylate compounds, benzophenone compounds, cyanoacrylate compounds, nickel complex compounds and amino benzylidene compounds; and preferred are cyanoacrylate compounds since they contribute to adjusting the wavelength dependence in retardation to a wide range. In addition, UV absorbents described in JPA Nos. hei 10-182621 and hei 8-337574, and UV absorbent polymers described in JPA No. hei 6-148430 are also preferably used herein. For the UV absorber for the cellulose acylate film, preferred are those having an excellent ability to absorb UV rays having a wavelength of at most 370 nm, in terms of preventing degradation of polarizing elements and liquid crystals, and those not almost absorbing visible light having a wavelength of at least 400 nm in terms of the image display capability.

(Process for Producing Cellulose Acylate Film)

The cellulose acylate film to be used as the first retardation layer can be produced according to a solvent-casting method. According to the solvent-casting method, a solution (dope) which is prepared by dissolving polymer material in an organic solvent is used.

The organic solvent preferably contains ether having 3 to 12 carbon atoms, ketone having 3 to 12 carbon atoms, ester having 3 to 12 carbon atoms, or halogenated hydrocarbon having 1 to 6 carbon atoms.

The ether, ketone and ester may have cyclic structures. Any compounds having two or more functional groups of these ether, ketone and ester (that is, —O—, —CO— and —COO—) may be adoptable as the organic solvent. The organic solvent may have also other functional groups such as alcoholic hydroxyl group. As for any organic solvents, having two or more species of functional group, it is good enough that the number of carbon atoms falls in any specified range of compounds having any of these functional groups.

Examples of the ether having 3 to 12 carbon atoms include diisopropyl ether, dimethoxymethane, dimethoxyethane, 1,4-dioxane, 1,3-dioxolane, tetrahydrofuran, anisole and phenetol.

Examples of the ketone having 3 to 12 carbon atoms include acetone, methyl ethyl ketone, diethyl ketone, diisobutylketone, cyclohexanone and methyl cyclohexanone.

Examples of the ester having 3 to 12 carbon atoms include ethyl formate, propyl formate, pentyl formate, methyl acetate, ethyl acetate and pentyl acetate.

Examples of the organic solvent having two species of more functional group include 2-ethoxyethyl acetate, 2-methoxy ethanol and 2-butoxy ethanol.

The number of carbon atoms of the halogenated $C_{1-6}$ hydrocarbon is preferably 1 or 2, and most preferably 1. Halogen in the halogenated hydrocarbon is preferably chlorine. For the case where the hydrogen atoms of the halogenated hydrocarbon are substituted by halogen, a ratio of substitution by halogen preferably falls in the range from 25 to 75 mol %, more preferably from 30 to 70 mol %, still more preferably from 35 to 65 mol %, and most preferably from 40 to 60 mol %.

Methylene chloride is a representative halogenated hydrocarbon.

Two or more species of organic solvents may be used in a mixed manner.

The cellulose acetate solution may be prepared by any general method. The general method herein means treatment at a temperature of 0° C. or above (normal temperature or higher temperatures). Preparation of the solution may be carried out by adopting methods and apparatuses for preparing dope in general solvent cast process. In the general method, halogenated hydrocarbon (in particular methylene chloride) may preferably used as the organic solvent.

Amount of cellulose acetate is preferably adjusted as being contained to as much as 10 to 40% by mass, and more preferably 10 to 30% by mass, in the resultant cellulose acetate solution. The organic solvent (main solvent) may be added with arbitrary additives described later.

The solution may be prepared by stirring cellulose acetate and an organic solvent at normal temperature (0 to 40° C.). A high concentration solution may be stirred under pressure or heating conditions. More specifically, cellulose acetate and an organic solvent are placed in a pressure vessel, the vessel is tightly closed, and the mixture is stirred under pressure while being heated to a range of temperature not lower than the boiling point under normal pressure of the solvent, so as to keep the solvent unboiled. The heating temperature is normally 40° C. or above, preferably 60 to 200° C., and more preferably 80 to 110° C.

The individual components may be placed in the vessel as being preliminarily mixed. Alternatively, they may be placed into the vessel sequentially. The vessel is preferably composed so as to allow stirring. The vessel may be pressurized as being injected by an inert gas such as nitrogen gas. Alternatively, elevation of vapor pressure under heating may be available. Still alternatively, the vessel is tightly closed, and then added with the individual components under pressure.

Heating is preferably given from the external of the vessel. For example, a jacket-type heating apparatus may be adoptable. Alternatively, a plate heater may be placed outside the vessel, a piping may be attached thereto, and a liquid medium may be allowed to circulate therethrough so as to heat the entire vessel.

Stirring is preferably effected by using a stirring propeller provided inside the vessel. The stirring propeller is preferably as long as reaching close to the vessel wall. The stirring propeller is preferably provided with a scraper blade for refreshing liquid film formed on the vessel wall.

Stirring is preferably effected by using a stirring propeller provided inside the vessel. The stirring propeller is preferably as long as reaching close to the vessel wall. The stirring propeller is preferably provided with a scraper blade for refreshing liquid film formed on the vessel wall.

The solution may be prepared also by the cooled solubilization method. By the cooled solubilization method, cellulose acetate may be solubilized also into an organic solvent into which cellulose acetate cannot readily be dissolved by general methods of dissolution. The cooled solubilization method is preferable also for solvents allowing cellulose acetate to dissolve therein by the general methods, because a homogeneous solution may rapidly be obtained.

In the cooled solubilization method, first, cellulose acetate is gradually added to an organic solvent under stirring at room temperature. The amount of cellulose acetate is preferably adjusted to 10 to 40% by mass of the mixture. The amount of cellulose acetate is more preferably adjusted to 10 to 30% by mass. Alternatively, the mixture may further be added with arbitrary additives described later.

Next, the mixture is cooled to −100 to −10° C. (preferably 80 to −10° C., more preferably −50 to −20° C., and most preferably −50 to −30° C.). The cooling may be carried out typically in a diethylene glycol solution (−30 to −20° C.) cooled on a dry ice-methanol bath (−75° C.). Under such cooling, a mixture of cellulose acetate and the organic solvent solidifies.

Rate of cooling is preferably 4° C./min or faster, more preferably 8° C./min or faster, and most preferably 12° C./min or faster. Faster rate of cooling is more preferable, wherein theoretical upper limit may be 10000° C./sec, technical upper limit may be 1000° C./sec, and practical upper limit may be 100° C./sec. The rate of cooling herein is a value obtained by dividing difference between the temperature at the start of cooling and the temperature finally reached by the cooling, by length of time ranging from the start of cooling up to when the final temperature of cooling is reached.

Preferably, the cooled mixture is heated up to a temperature from 0 to 100° C. (more preferably from 0 to 150° C., even more preferably from 0 to 120° C. and even furthermore preferably from 0 to 50° C.), and then the cellulose acylate is dissolved in the organic solvent. Heating may be carried out by leaving the mixture in the atmosphere at a room temperature, and rate of heating is preferably 4° C./min or faster, more preferably 8° C./min or faster, and most preferably 12° C./min or faster. Faster rate of heating is more preferable, wherein theoretical upper limit may be 10000° C./sec, technical upper limit may be 1000° C./sec, and practical upper limit may be 100° C./sec. The rate of heating herein is a value obtained by dividing difference between the temperature at the start of heating and the temperature finally reached by the heating, by length of time ranging from the start of heating up to when the final temperature of heating is reached.

A homogeneous solution may be obtained in this way. Operations of cooling and heating may be repeated if the dissolution is insufficient. Whether the dissolution is sufficient or not may be judged by visual observation of appearance of the solution.

In the cooled solubilization method, a sealable vessel is preferably used in order to avoid contamination by moisture due to dewing in the process of cooling. In the process of cooling and heating, pressurizing in the process of cooling and reducing pressure in the process of heating may shorten the time for solubilization. A pressure-proof vessel is preferably used so as to allow pressurizing and reduction in pressure.

For example, a 20%-by-mass solution of cellulose acetate having a degree of acetylation of 60.9% and a viscosity-average degree of polymerization of 299, dissolved in methyl acetate by the cooled solubilization method was found to have a quasi-phase transition point between sol state and gel state at around 33° C., when measured by differential scanning calorimetry (DSC), showing a uniform gel state at and below the temperature. It is therefore necessary to keep this solution at or above the quasi-phase transition point, and preferably at a temperature approximately 10° C. higher than a gel phase transition temperature. It is, however, to be noted that the quasi-phase transition temperature may vary depending on the degree of acetylation and viscosity-average degree of polymerization of cellulose acetate, concentration of the solution, and organic solvent to be adopted.

As described previously, the cellulose acetate film to be used as the first retardation layer is preferably produced from the prepared cellulose acetate solution (dope) according to the solvent cast method. For the purpose of producing the cellulose acetate film used as the first retardation layer, the dope is preferably added with the above-described retardation enhancer. The dope is cast on a drum or band, from which the solvent is vaporized off to thereby form the film. The dope before being cast is preferably adjusted in the concentration thereof so that the solid content falls in the range from 18 to 35%. Surfaces of the drum and the band are preferably finished to a mirror-like state. The dope is preferably cast on the drum or the band having a surface temperature of 10° C. or lower.

Methods of casting and drying in the solvent cast method are described in patent specifications of U.S. Pat. Nos. 2,336, 310, 2,367,603, 2,492,078, 2,492,977, 2,492,978, 2,607,704, 2,739,069 and 2739070, British Patent Nos. 640731 and 736892, Examined Japanese Patent Publication Nos. S45-4554 and S49-5614, Japanese Laid-Open Patent Publication Nos. S60-176834, S60-203430 and S62-115035. Drying the dope on the drum or band may be carried out by blowing inactive gas such as nitrogen gas.

Alternatively, the obtained film may be separated from the drum or the band, and the residual solvent may be vaporized by drying under hot air blow, while sequentially varying the temperature thereof from 100 to 160° C. This method is described in Examined Japanese Patent Publication No. H5-17844, by which the length of time from casting to separation may desirably be shortened. In order to carry out this method, the dope may necessarily be gellated at the surface temperature of the drum and the band in the process of casting.

The casting may be carried out so as to form two layers using thus-prepared cellulose acetate solution (dope), and make them into a film. In this case, the cellulose acetate film may preferably be produced by the solvent cast process. The dope is cast onto the drum or the band, from which the solvent is vaporized off to thereby form the film. The dope before being cast is preferably adjusted in the concentration thereof so that the solid content falls in the range from 10 to 40%. Surfaces of the drum and the band are preferably finished to a mirror-like state.

For the case where two or more layers of cellulose acetate solution are cast, a plurality of cellulose acetate solutions may be cast, wherein the film may be produced by stacking the solutions containing cellulose acetate, cast respectively from a plurality of casting ports provided at intervals in the direction of feeding of the support. The methods typically described in JPA Nos. syo 61-158414, hei 1-122419, and hei 11-198285 may be applicable. Alternatively, the film may be produced also by casting the cellulose acetate solutions from two casting ports. The methods typically described in Examined JPA No. syo 60-27562, JPA Nos. syo 61-94724, syo 61-947245, syo 61-104813, syo 61-158413, and hei 6-134933 may be applicable. Alternatively, a method of forming a cellulose acetate film by casting, described in JPA No. syo 56-162617, by which flow of a high-viscosity cellulose acetate solution is wrapped by a low-viscosity cellulose acetate solution, and the high- and low-viscosity cellulose acetate solutions are extruded at the same time.

Alternatively, the film may be produced also by using two casting ports, wherein a film formed on a support using a first casting port is separated off, and a second casting is carried out on the surface of the film, which had been brought into contact with the surface of support. For example, a method described in Examined Japanese Patent Publication No. syo 44-20235 may be exemplified.

The cellulose acetate solutions to be cast may be same or different. In order to give functions to a plurality of cellulose acetate layers, the cellulose acetate solutions correspondent to the functions may be cast from the individual casting ports. The cellulose acetate solutions may also be cast together with other functional layers (for example, adhesive layer, dye layer, antistatic layer, anti-halation layer, ultraviolet absorbing layer, and polarizing element).

In the conventional single-layer liquid process, it has been necessary to extrude a high-concentration, high-viscosity cellulose acetate solution in order to achieve a necessary thickness of the film. However, this process has often suffered from a problem of causing granulation failure and flatness failure, due to poor stability of the cellulose acetate solution such as producing solid matters. As a solving means for this problem, a plurality of cellulose acetate solutions may be cast from the casting ports, and thereby not only high-viscosity solutions may be extruded onto the support at the same time, and the flatness may consequently be improved so as to produce a film having a good surface condition, but also the drying load may be reduced by virtue of use of dense cellulose acetate solutions, and thereby the production speed of the film may be improved.

The cellulose acylate film to be used as the first retardation layer may comprise an anti-degradation agent such as anti-oxidant agent, peroxide decomposer, radical inhibitor, metal deactivator, acid-trapping agent and amines. Examples of the anti-degradation agent include those described in JPA Nos, hei 3-199201, hei 5-1907073, hei 5-194789, hei 5-271471 and hei 6-107854. The amount of the anti-degradation agent is preferably from 0.01 to 1 mass % and more preferably from 0.01 to 0.2 mass % with respect to the total amount of the dope. When the amount of the anti-degradation agent is equal to or less than 1 mass %, the anti-degradation agent may rarely bleed out through the surface of the film, which therefore is preferable. Preferable examples of the anti-degradation agent include butylated hydroxy toluene (BHT) and tribenzylamine (TBA).

The steps from casting to post-drying may be carried out under an air atmosphere or an inert gas atmosphere such as nitrogen gas.

In the process for producing the cellulose acylate film to be used as the first retardation layer, a winder may be used. Examples of the winder which can be used in the process include any winders usually used such as constant-tension winders, constant-torque winders, taper-tension winders and programmed-tension-controlling winders in which the internal stress is constant.

(Stretching Treatment)

Especially preferably, the cellulose acylate film to be used as the first retardation layer is a cellulose acylate film processed for stretching (stretched cellulose acylate film). The stretching treatment may give a desired retardation to the stretched cellulose acylate film. Preferably, the cellulose acylate film to be used as the first retardation layer is stretched in the machine direction. When stretched in the machine direction, the cellulose acylate film may have a retardation expressing in the machine direction; and therefore, the first retardation layer may be stuck to a polarizing element in a mode of roll-to-roll operation in such a manner that the absorption axis (or transmission axis) of the polarizing element could be in parallel (or perpendicular) to the slow axis of the first retardation layer. This is favorable for enhancing the producibility and for reducing the cost in polarizing plate production. The machine-direction stretching may be attained, for example, by controlling the speed of the conveyor rollers for the film in such a manner that the film rolling up speed could be higher than the film unrolling speed. In general, the stretching direction is the same as the in-plane slow axis direction.

The machine-direction stretching of the film may be carried out at normal temperature or under heat, but is preferably in an atmosphere of from 60° C. to 100° C. The film may be stretched during drying it, and it is desirable that the residual solvent content of the film being stretched is within a range of from 60 to 120% by mass. When the film of which a residual solvent content falls within the range is stretched in the temperature of which the temperature falls within the range, the crystallization of the cellulose acylate film during stretching may be prevented, and the degree of alignment in the amorphous part of the film may be made high, and therefore, the film may be readily controlled to satisfy the above-mentioned formulas (1) and (2).

The residual solvent content may be represented by relation:

Residual solvent content={(mass of film)−(mass of film after dried at 120° C. for 2 hours)/(mass of film after dried at 120° C. for 2 hours)}×100.

Preferably, the stretching ratio of the film (percentage of elongation relative to the unstretched film) is from 1% to 50%, more preferably from 2% to 30%.

The cellulose acylate film to be used as the first retardation layer may additionally stretched in the transverse direction of the film so far as the direction in which the retardation is the maximum is the machine direction of the film. The cross-direction stretching in addition to the machine-direction stretching may control the degree of alignment of the polymer chains in the machine direction (film-traveling direction), and as a result, $\Delta Re_1$ and $\Delta Rth_1$ may be thereby controlled. The degree of alignment of the polymer chains may be determined by the sound velocity ratio of the film. The sound velocity ratio of the cellulose acylate film to be use as the first retardation layer preferably satisfies the following formula (8):

1.12≦sound velocity in the slow axis direction/sound velocity in the direction perpendicular to the slow axis≦1.25  (8)

More preferably, 1.14≦sound velocity in the slow axis direction/sound velocity in the direction perpendicular to the slow axis≦1.22.

The sound velocity of the film may be determined in an environment at 25° C. and 60% RH, using a sound velocity meter, NOMURA's SST-110.
(Thickness of Cellulose Acylate Film)

The thickness of the first retardation layer is not specifically defined. In one embodiment where a cellulose acylate film is used for the first retardation layer, its thickness is preferably from 10 μm to 200 μm, more preferably from 20 μm to 150 μm, even more preferably from 30 μm to 100 μm.
[Second Retardation Layer]

The second retardation layer in the invention is described in detail.

In the invention, it is desirable that the second retardation layer serves also as a protective film for a polarizing element in terms of reducing the thickness of the liquid-crystal display device.

Preferably, the second retardation layer is formed of a polymer film. Its material is not specifically defined. Especially preferred for it is a polymer film that contains a positive intrinsic birefringence component and a negative intrinsic birefringence component in terms of more reducing the viewing angle-dependent color shift. Concretely, preferred are modified polycarbonate films such as Teijin's "Pure Ace"; norbornene films as in JPA Nos. 2003-292639 and 2003-321535; modified polyacetal films as in JPA No. 2006-220726; and cellulose acylate films. Of those, more preferred are cellulose acylate films in terms of the workability into a polarizing plate. Cellulose acylate film preferred for use as the second retardation layer (hereinafter this may be referred to as "second retardation cellulose acylate film") is described in detail hereinunder.
(Cellulose Acylate)

Preferable examples of the cellulose acylate to be used as a material for producing a cellulose acylate film to be used as the second retardation layer are same as those for producing a cellulose acylate film to be used as the first retardation layer.
(Retardation Enhancer)

A cellulose acylate film to be used as the second retardation layer, may comprise a retardation enhancer. Preferably, the cellulose acylate film to be used as the second retardation layer comprises at least one compound represented by formula (II) and more preferably at least one compound represented by formula (II).

Formula (II)

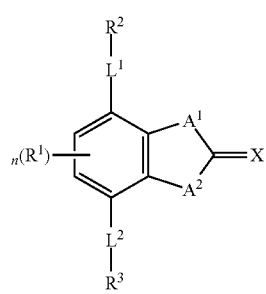

In the formula, $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

Formula (III)

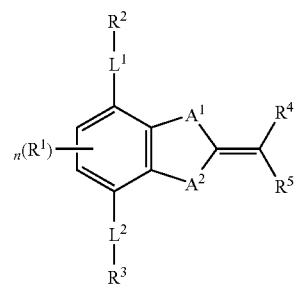

In the formula, $L^1$ and $L^2$ independently represent a single bond or a divalent group. $A^1$ and $A^2$ independently represent a group selected from the group consisting of —O—, —NR— where R represents a hydrogen atom or a substituent, —S— and —CO—. $R^1$, $R^2$ and $R^3$ independently represent a substituent. And n is an integer from 0 to 2.

Preferred examples of the divalent linking group represented by $L^1$ or $L^2$ in the formula (II) or (III) include those shown below.

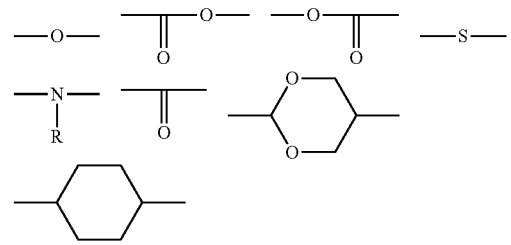

And further preferred are —O—, —COO— and —OCO—.

In the formulae (II) and (III), $R^1$ represents a substituent, if there are two or more R, they may be same or different from each other, or form a ring. Examples of the substituent include those shown below.

Halogen atoms such as fluorine, chlorine, bromine and iodine atoms; alkyls (preferably $C_{1-30}$ alkyls) such as methyl, ethyl, n-propyl, iso-propyl, tert-butyl, n-octyl, and 2-ethylhexyl; cylcoalkyls (preferably $C_{3-30}$ substituted or non-substituted cycloalkyls) such as cyclohexyl, cyclopentyl and 4-n-dodecylcyclohexyl; bicycloalkyls (preferably $C_{5-30}$ substitute or non-substituted bicycloalkyls, namely monovalent residues formed from $C_{5-30}$ bicycloalkanes from which a hydrogen atom is removed) such as bicyclo[1,2,2]heptane-2-yl and bicyclo[2,2,2]octane-3-yl; alkenyls (preferably $C_{2-30}$ alkenyls) such as vinyl and allyl; cycloalkenyls (preferably $C_{3-30}$ substituted or non-substituted cycloalkenyls, namely monovalent residues formed from $C_{3-30}$ cycloalkenes from which a hydrogen atom is removed) such as 2-cyclopentene-1-yl and 2-cyclohexene-1-yl; bicycloalkenyls (preferably $C_{5-30}$ substituted or non-substituted bicycloalkenyls, namely monovalent residues formed from $C_{5-30}$ bicycloalkenes from which a hydrogen atom is removed) such as bicyclo[2,2,1]

hepto-2-en-1-yl and bicyclo[2,2,2]octo-2-en-4-yl; alkynyls (preferably $C_{2-30}$ substitute or non-substituted alkynyls) such as etynyl and propargyl; aryls (preferably $C_{6-30}$ substitute or non-substituted aryls) such as phenyl, p-tolyl and naphthyl; heterocyclic groups (preferably (more preferably $C_{3-30}$) substituted or non-substituted, 5-membered or 6-membered, aromatic or non-aromatic heterocyclic monovalent residues) such as 2-furyl, 2-thienyl, 2-pyrimidinyl and 2-benzothiazolyl; cyano, hydroxyl, nitro, carboxyl, alkoxys (preferably $C_{1-30}$ substituted or non-substituted alkoxys) such as methoxy, ethoxy, iso-propoxy, t-butoxy, n-octyloxy and 2-methoxyethoxy; aryloxys (preferably $C_{6-30}$ substituted or non-substituted aryloxys) such as phenoxy, 2-methylphenoxy, 4-t-butylphenoxy, 3-nitrophenoxy and 2-tetradecanoyl aminophenoxy; silyloxys (preferably $C_{3-20}$ silyloxys) such as trimethylsilyloxy and t-butyldimethylsilyloxy; hetero-cyclic-oxys (preferably $C_{2-30}$ substituted or non-substituted hetero-cyclic-oxys) such as 1-phenyltetrazole-5-oxy and 2-tetrahydropyrenyloxy; acyloxys (preferably $C_{2-30}$ substitute or non-substituted alkylcarbonyloxys and $C_{6-30}$ substituted or non-substituted arylcarbonyloxys) such as formyloxy, acetyloxy, pivaloyloxy, stearoyoxy, benzoyloxy and p-methoxyphenylcarbonyloxy; carbamoyloxys (preferably $C_{2-30}$ substituted or non-substituted carbamoyloxys) such as N,N-dimethyl carbamoyloxy, N,N-diethyl carbamoyloxy, morpholinocarbonyloxy, N,N-di-n-octylaminocarbonyloxy and N-n-octylcarbamyloxy; alkoxy carbonyloxys (preferably $C_{2-30}$ substituted or non-substituted alkoxy carbonyloxys) such as methoxy carbonyloxy, ethoxy carbonyloxy, t-butoxy carbonyloxy and n-octyloxy carbonyloxy; aryloxy carbonyloxys (preferably $C_{7-30}$ substituted or non-substituted aryloxy carbonyloxys) such as phenoxy carbonyloxy, p-methoxyphenoxy carbonyloxy and p-n-hexadecyloxyphenoxy carbonyloxy; aminos (preferably $C_{0-30}$ substituted or non-substituted alkylaminos and $C_{6-30}$ substituted or non-substituted arylaminos) such as amino, methylamino, dimethylamino, anilino, N-methyl-anilino and diphenylamino; acylaminos (preferably $C_{1-30}$ substituted or non-substituted alkylcarbonylaminos and $C_{6-30}$ substituted or non-substituted arylcarbonylaminos) such as formylamino, acetylamino, pivaloylamino, lauroylamino and benzoylamino; aminocarbonylaminos (preferably $C_{1-30}$ substituted or non-substituted aminocarbonylaminos) such as carbamoylamino, N,N-dimethylaminocarbonylamino, N,N-diethylamino carbonylamino and morpholino carbonylamino; alkoxycarbonylaminos (preferably $C_{2-30}$ substituted or non-substituted alkoxycarbonylaminos) such as methoxycarbonylamino, ethoxycarbonylamino, t-butoxycarbonylamino, n-octadecyloxycarbonylamino and N-methyl-methoxy carbonylamino; aryloxycarbonylaminos (preferably $C_{7-30}$ substituted or non-substituted aryloxycarbonylaminos) such as phenoxycarbonylamino, p-chloro phenoxycarbonylamino and m-n-octyloxy phenoxy carbonylamino; sulfamoylaminos (preferably $C_{0-30}$ substituted or non-substituted sulfamoylaminos) such as sulfamoylamino, N,N-dimethylamino sulfonylamino and N-n-octylamino sulfonylamino; alkyl- and aryl-sulfonylaminos (preferably $C_{1-30}$ substituted or non-substituted alkyl-sulfonylaminos and $C_{6-30}$ substituted or non-substituted aryl-sulfonylaminos) such as methyl-sulfonylamino, butyl-sulfonylamino, phenyl-sulfonylamino, 2,3,5-trichlorophenyl-sulfonylamino and p-methylphenyl-sulfonylamino; mercapto; alkylthios (preferably substituted or non-substituted $C_{1-30}$ alkylthios such as methylthio, ethylthio and n-hexadecylthio; arylthios (preferably $C_{6-30}$ substituted or non-substituted arylthios) such as phenylthio, p-chlorophenylthio and m-methoxyphenylthio; heterocyclic-thios (preferably $C_{2-30}$ substituted or non-substituted heterocyclic-thios such as 2-benzothiazolyl thio and 1-phenyltetrazol-5-yl-thio; sulfamoyls (preferably $C_{0-30}$ substituted or non-substituted sulfamoyls) such as N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl; sulfo; alkyl- and aryl-sulfinyls (preferably $C_{1-30}$ substituted or non-substituted alkyl- or $C_{6-30}$ substituted or non-substituted aryl-sulfinyls) such as methylsulfinyl, ethylsulfinyl, phenylsulfinyl and p-methylphenylsulfinyl; alkyl- and aryl-sulfonyls (preferably $C_{1-30}$ substituted or non-substituted alkyl-sulfonyls and $C_{6-30}$ substituted or non-substituted arylsulfonyls) such as methylsulfonyl, ethylsulfonyl, phenylsulfonyl and p-methylphenylsulfonyl; acyls (preferably $C_{2-30}$ substituted non-substituted alkylcarbonyls, and $C_{7-30}$ substituted or non-substituted arylcarbonyls) such as formyl, acetyl and pivaloyl benzyl; aryloxycarbonyls (preferably $C_{7-30}$ substituted or non-substituted aryloxycarbonyls) such as phenoxycarbonyl, o-chlorophenoxycarbonyl, m-nitrophenoxycarbonyl and p-t-butylphenoxycarbonyl; alkoxycarbonyls (preferably $C_{2-30}$ substituted or non-substituted alkoxycarbonyls)methoxycarbonyl, ethoxycarbonyl, t-butoxycarbonyl and n-octadecyloxycarbonyl; carbamoyls (preferably $C_{1-30}$ substituted or non-substituted carbamoyls) such as carbamoyl, N-methylcarbamoyl, N,N-dimethylcarbamoyl, N,N-di-n-octylcarbamoyl and N-(methylsulfonyl)carbamoyl; aryl- and heterocyclic-azos (preferably $C_{6-30}$ substituted or non-substituted arylazos and $C_{3-30}$ substituted or non-substituted heterocyclicazos) such as phenylazo and p-chlorophenylazo, 5-ethylthio-1,3,4-thiadiazol-2-yl-azo, imides such as N-succinimide and N-phthalimide; phosphinos (preferably $C_{2-30}$ substituted or non-substituted phosphinos) such as dimethyl phosphino, diphenyl phosphino and methylphenoxy phosphino; phosphinyls (preferably $C_{2-30}$ substituted or non-substituted phosphinyls) such as phosphinyl, dioctyloxy phosphinyl and diethoxy phosphinyl; phosphinyloxys (preferably $C_{2-30}$ substituted or non-substituted phosphinyloxys) such as diphenoxyphosphinyloxy and dioctyloxyphosphinyloxy; phosphinylaminos (preferably $C_{2-30}$ substituted or non-substituted phosphinylaminos) such as dimethoxy phosphinylamino and dimethylamino phosphinylamino; and silyls (preferably $C_{3-30}$ substituted or non-substituted silyls) such as trimethylsilyl, t-butylmethylsilyl and phenyldimethylsilyl.

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

Preferably, $R^1$ represents a hydrogen atom, an alkyl group, an alkenyl group, an aryl group, a heterocyclic group, hydroxyl, carboxyl, an alkoxy group, an acyloxy group, cyano or an amino group; and more preferably, a halogen atom, an alkyl group, cyano or an alkoxy group.

$R^2$ and $R^3$ independently represent a substituent. Examples of the substituent include those exemplified above as examples of $R^1$. Preferably, $R^2$ and $R^3$ independently represent a substituted or non-substituted phenyl or a substituted or non-substituted cyclohexyl; more preferably, a substituted phenyl or a substituted cyclohexyl; and much more preferably, a phenyl having a substituent at a 4-position or a cyclohexyl having a substituent at a 4-position.

$R^4$ and $R^5$ independently represent a substituent. Examples of the substituent include those exemplified above as examples of $R^1$. Preferably, $R^4$ and $R^5$ independently represent an electron-attractant group having the Hammett value, $\sigma_p$, more than 0; more preferably an electron-attractant group having the Hammett value, $\sigma_p$, from 0 to 1.5. Examples of such an electron-attractant group include trifluoromethyl, cyano, carbonyl and nitro. $R^4$ and $R^5$ may bind to each other to form a ring.

It is to be noted that, regarding Hammett constant of the substituent, $\sigma_p$ and $\sigma_m$, there are detailed commentaries on the Hammett constant of the substituent, $\sigma_p$ and $\sigma_m$ in "Hammett Rule-Structure and Reactivity-(Hammeto soku-Kozo to Hanohsei)" published by Maruzen and written by Naoki Inamoto; "New Experimental Chemistry 14 Synthesis and Reaction of Organic Compound V (Shin Jikken Kagaku Koza 14 Yuuki Kagoubutsu no Gousei to Hannou)" on p. 2605, edited by Chemical Society of Japan and published by Maruzen; "Theory Organic Chemistry Review (Riron Yuuki Kagaku Gaisetsu)" on p. 217, published by TOKYO KAGAKU DOZIN CO. LTD., and written by Tadao Nakatani; and Chemical Reviews, Vol. 91, No. 2, pp. 165-195 (1991).

In the formula, $A^1$ and $A^2$ independently represent a group selected from the group consisting of —O—, —NR— where R represents a hydrogen atom or a substituent, —S— and —CO—; and preferably, —O—, —NR— where R represents a substituent selected from those exemplified above as examples of $R^1$, or —S—.

In the formula, X represents a nonmetal atom selected from the groups 14-16 atoms, provided that X may bind with at least one hydrogen atom or substituent. Preferably, X represents =O, =S, =NR or =C(R)R where R represents a substituent selected from those exemplified as examples of $R^1$.

In the formula, n is an integer from 0 to 2, and preferably 0 or 1.

Examples of the compound represented by the formula (II) or (III) include, but examples of the Re enhancer are not limited to, those shown below. Regarding the compounds shown below, each compound to which is appended (x) is referred to as "Example Compound (X)" unless it is specified.

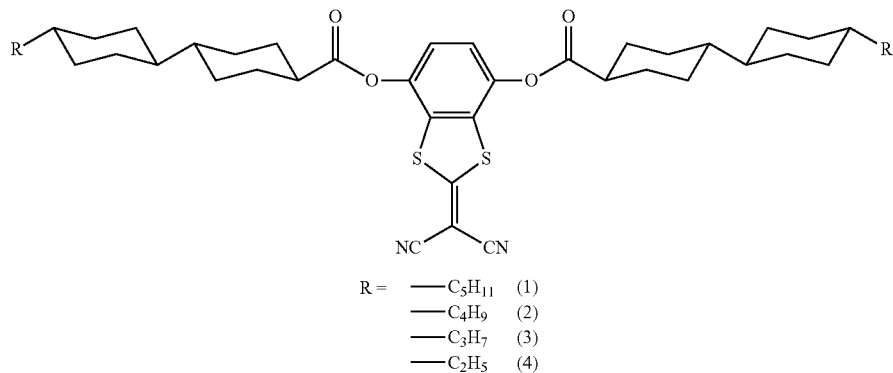

R = —$C_5H_{11}$ (1)
—$C_4H_9$ (2)
—$C_3H_7$ (3)
—$C_2H_5$ (4)

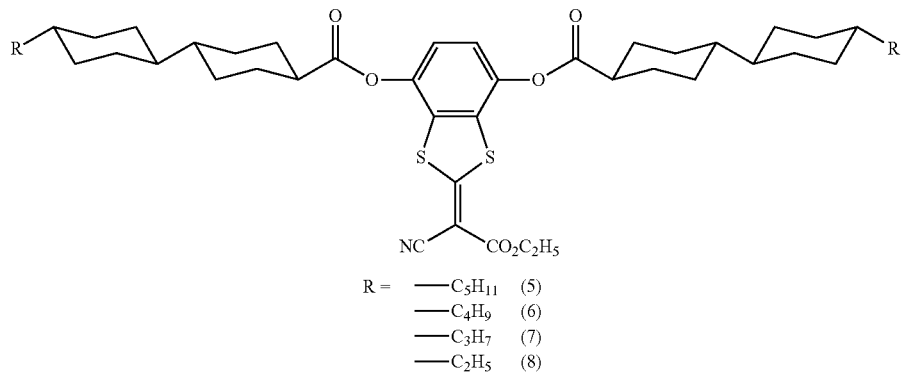

R = —$C_5H_{11}$ (5)
—$C_4H_9$ (6)
—$C_3H_7$ (7)
—$C_2H_5$ (8)

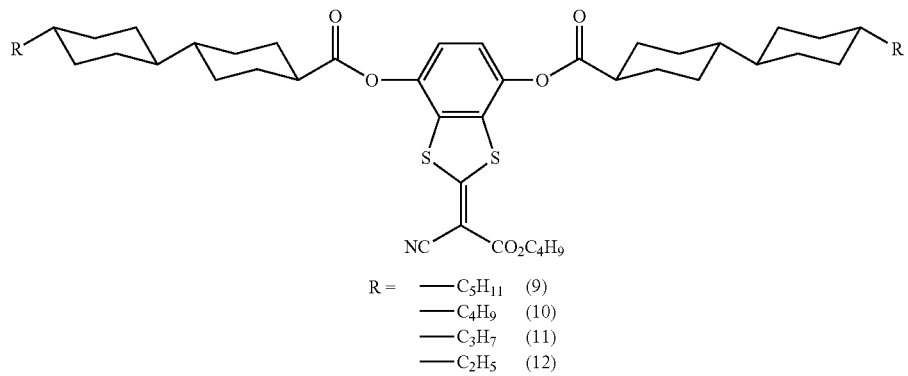

R = —$C_5H_{11}$ (9)
—$C_4H_9$ (10)
—$C_3H_7$ (11)
—$C_2H_5$ (12)

-continued
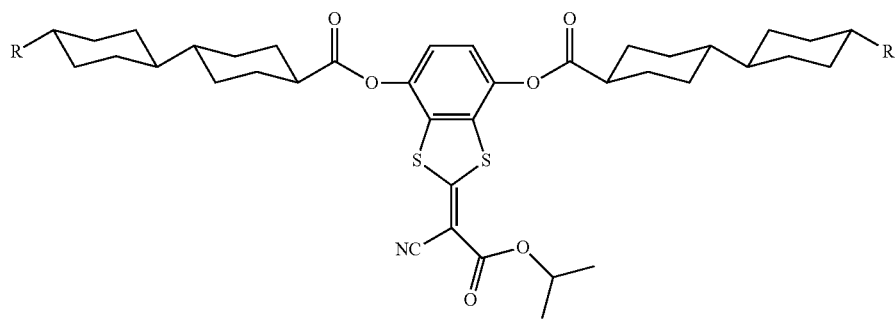
R = —C₅H₁₁ (13)
—C₄H₉ (14)
—C₃H₇ (15)
—C₂H₅ (16)
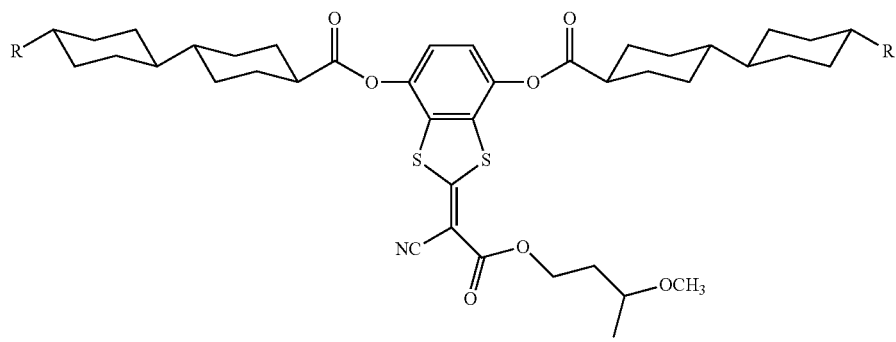
R = —C₅H₁₁ (17)
—C₄H₉ (18)
—C₃H₇ (19)
—C₂H₅ (20)
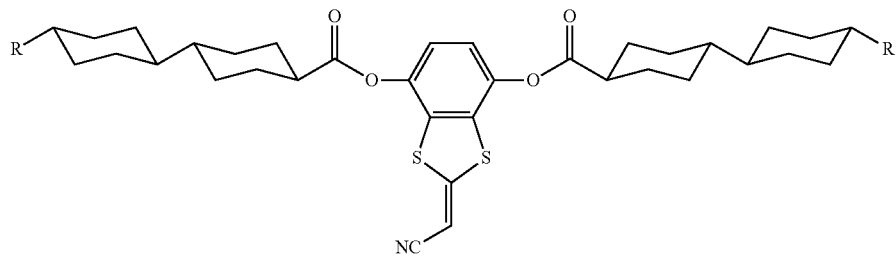
R = —C₅H₁₁ (21)
—C₄H₉ (22)
—C₃H₇ (23)
—C₂H₅ (24)
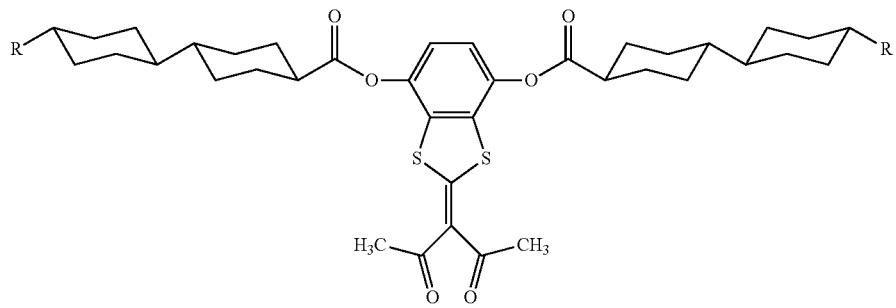
R = —C₅H₁₁ (25)
—C₄H₉ (26)
—C₃H₇ (27)
—C₂H₅ (28)

-continued
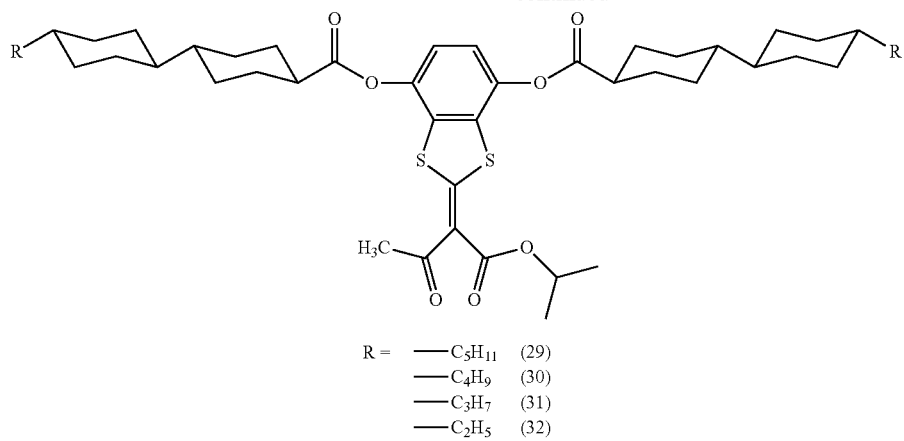
R = —C5H11 (29)
—C4H9 (30)
—C3H7 (31)
—C2H5 (32)
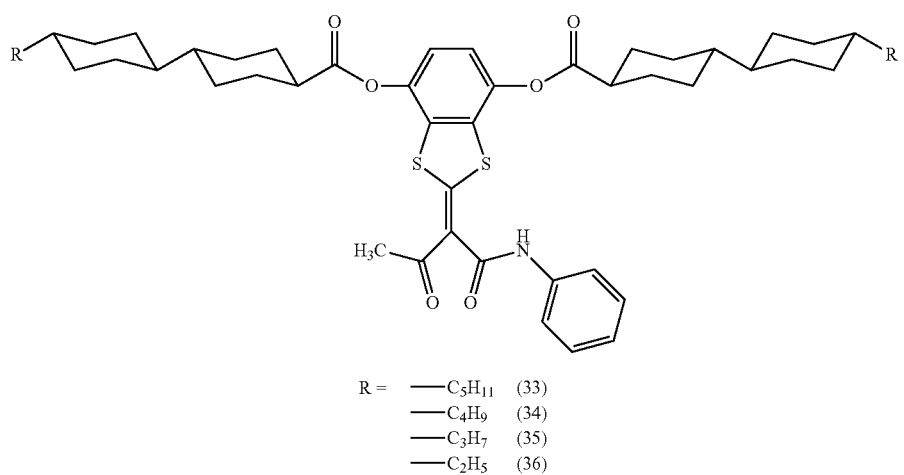
R = —C5H11 (33)
—C4H9 (34)
—C3H7 (35)
—C2H5 (36)
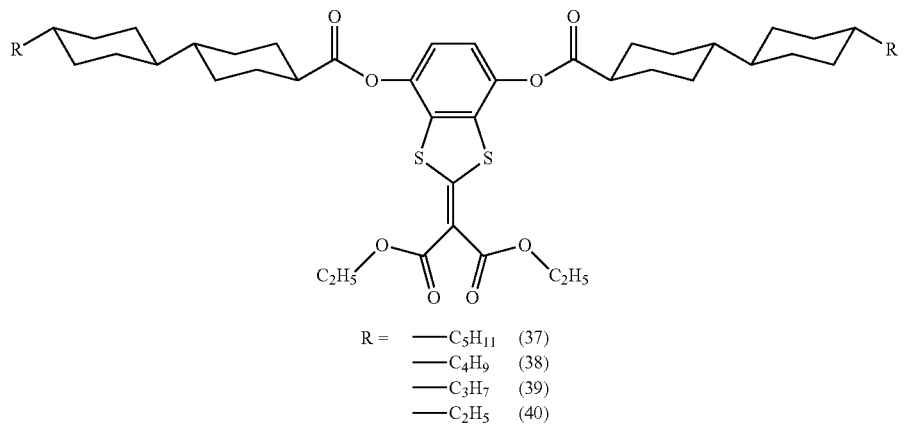
R = —C5H11 (37)
—C4H9 (38)
—C3H7 (39)
—C2H5 (40)

-continued
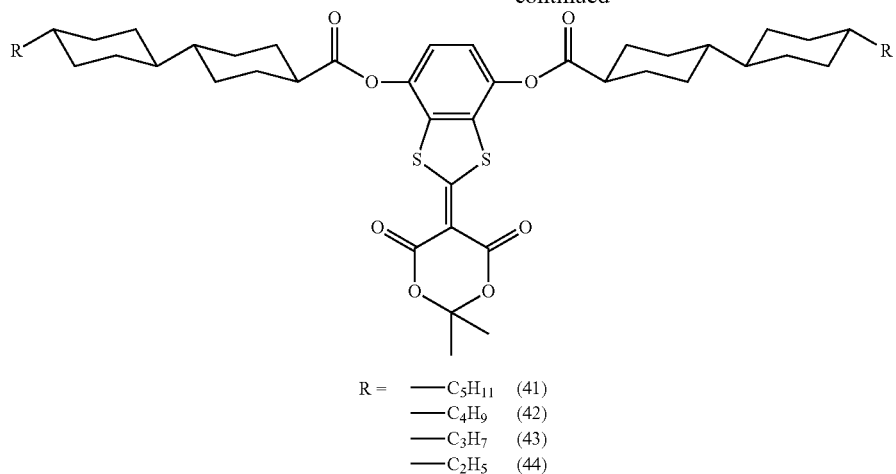
R = —C₅H₁₁ (41)
—C₄H₉ (42)
—C₃H₇ (43)
—C₂H₅ (44)
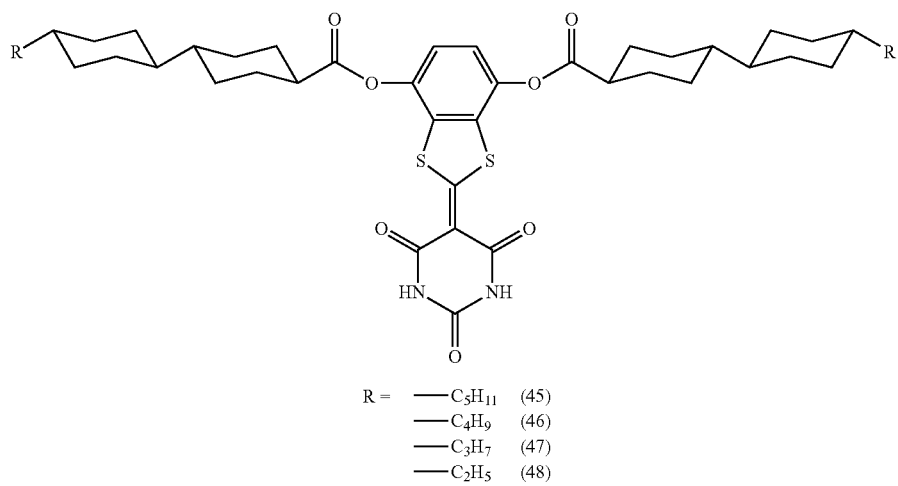
R = —C₅H₁₁ (45)
—C₄H₉ (46)
—C₃H₇ (47)
—C₂H₅ (48)
(49)
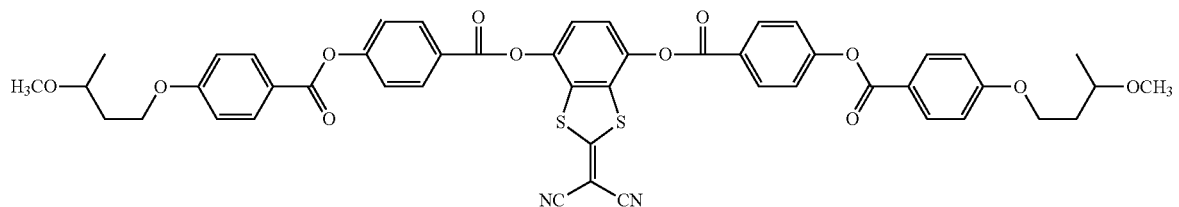
(50)
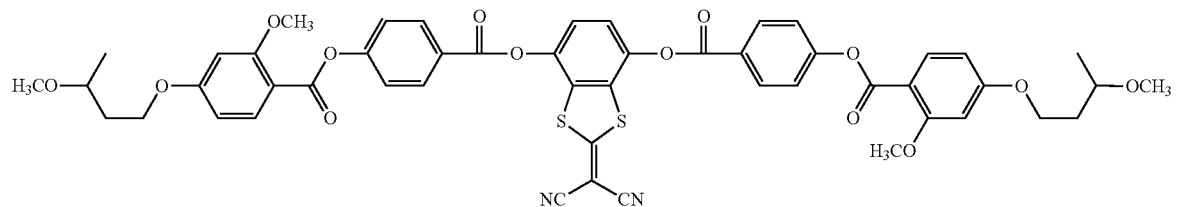

-continued
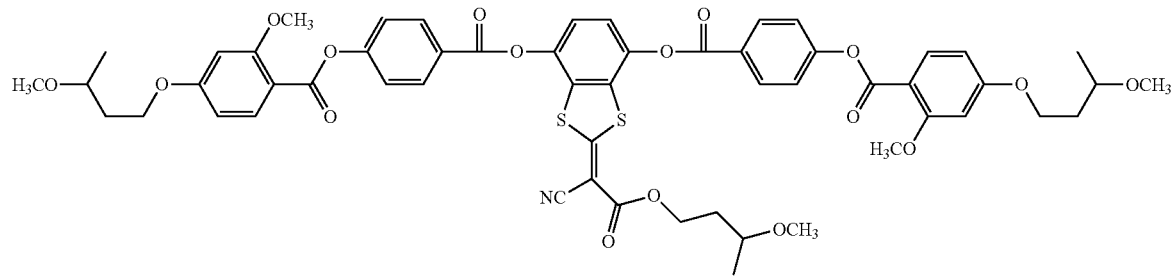
(51)
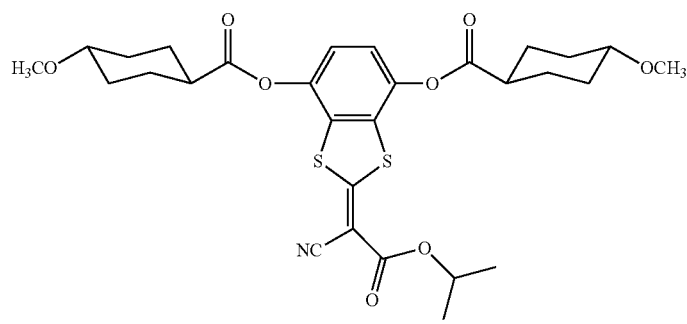
(52)
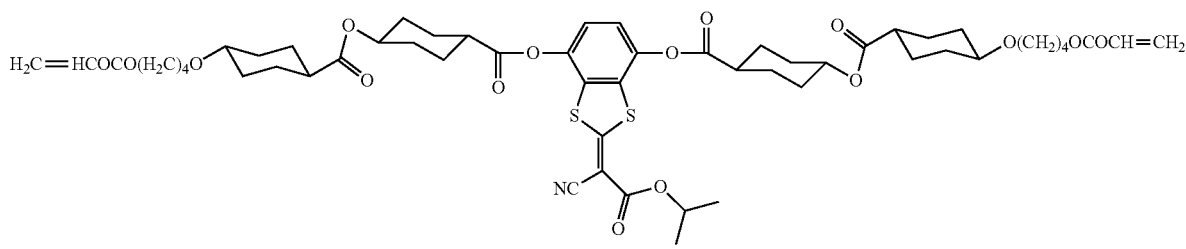
(53)
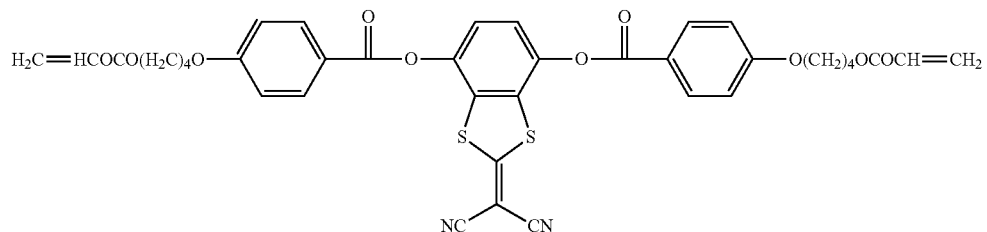
(54)
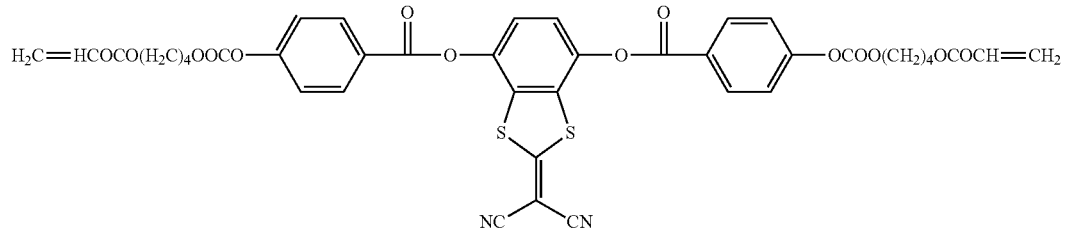
(55)
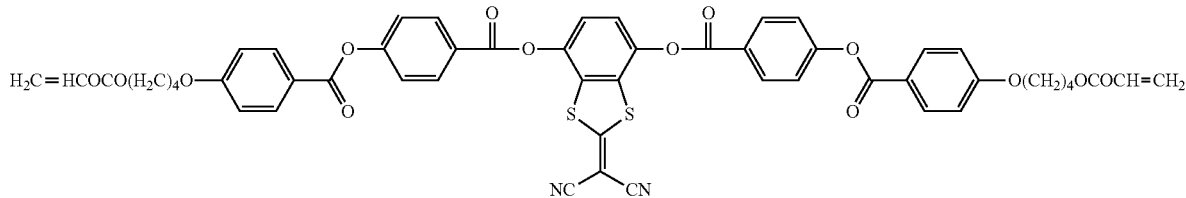
(56)

(57)
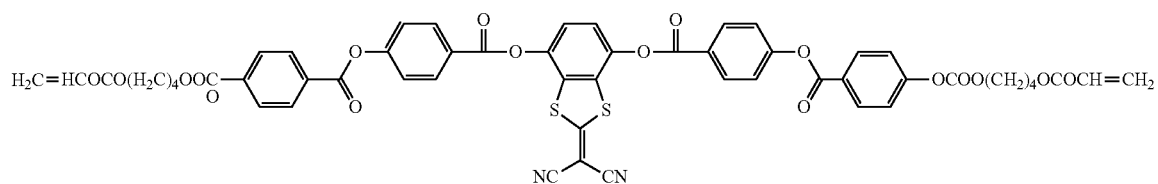
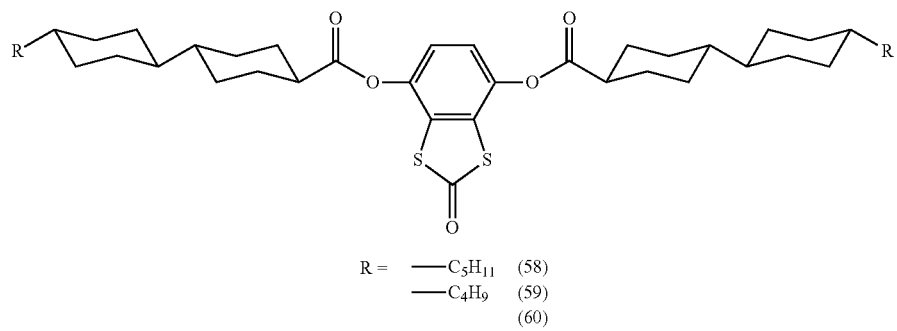
R = —C₅H₁₁ (58)
—C₄H₉ (59)
(60)
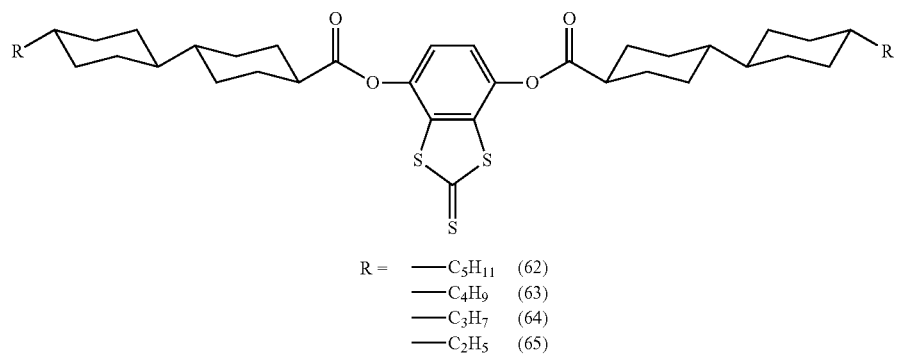
R = —C₅H₁₁ (62)
—C₄H₉ (63)
—C₃H₇ (64)
—C₂H₅ (65)
(66)
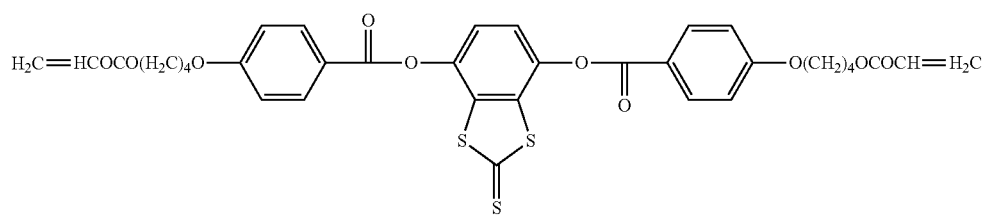
(67)
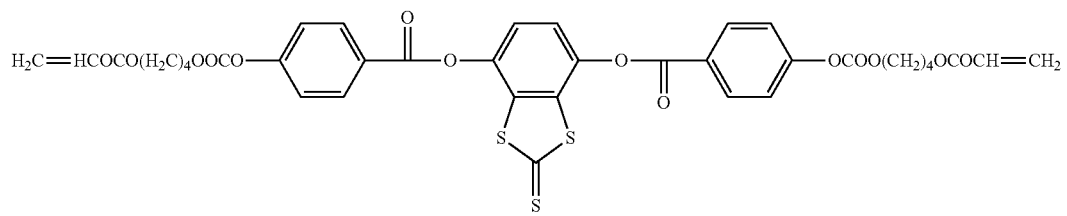
(68)
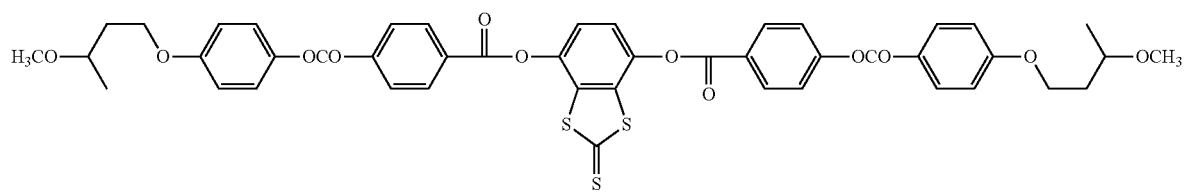

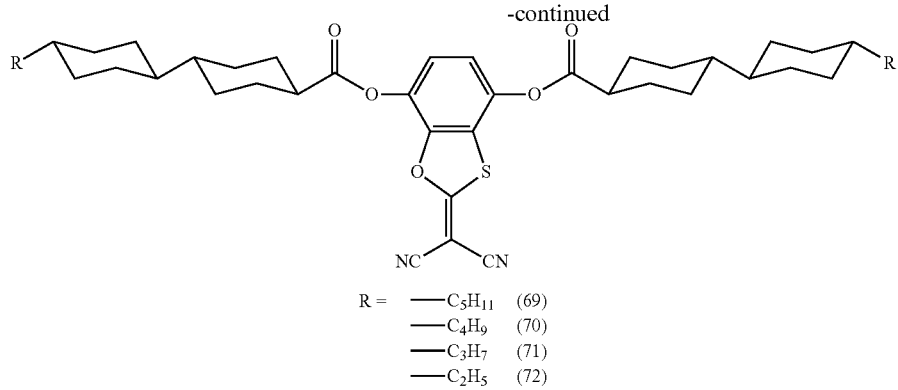
R = —C₅H₁₁ (69)
—C₄H₉ (70)
—C₃H₇ (71)
—C₂H₅ (72)
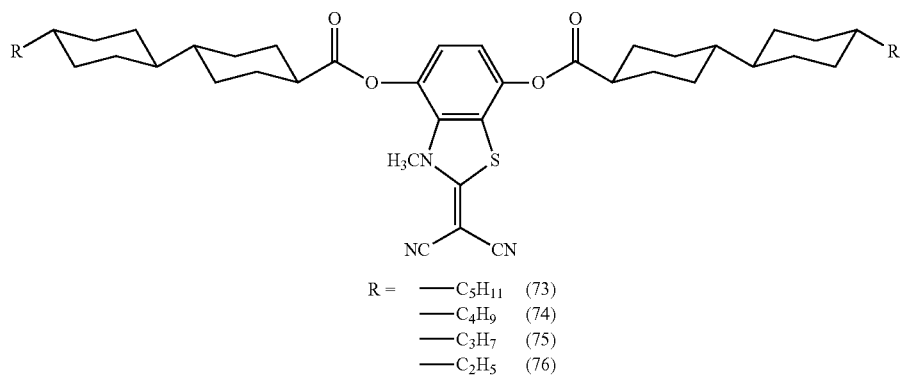
R = —C₅H₁₁ (73)
—C₄H₉ (74)
—C₃H₇ (75)
—C₂H₅ (76)
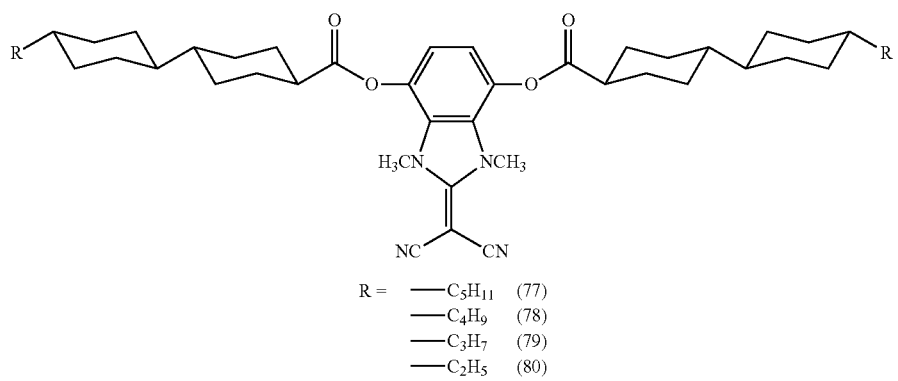
R = —C₅H₁₁ (77)
—C₄H₉ (78)
—C₃H₇ (79)
—C₂H₅ (80)
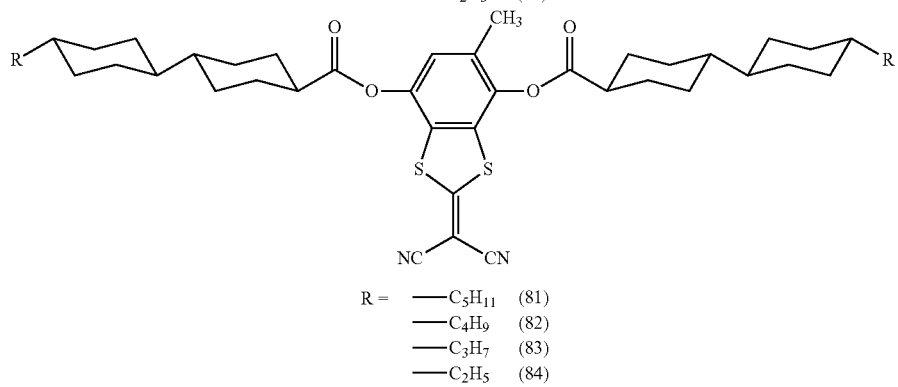
R = —C₅H₁₁ (81)
—C₄H₉ (82)
—C₃H₇ (83)
—C₂H₅ (84)

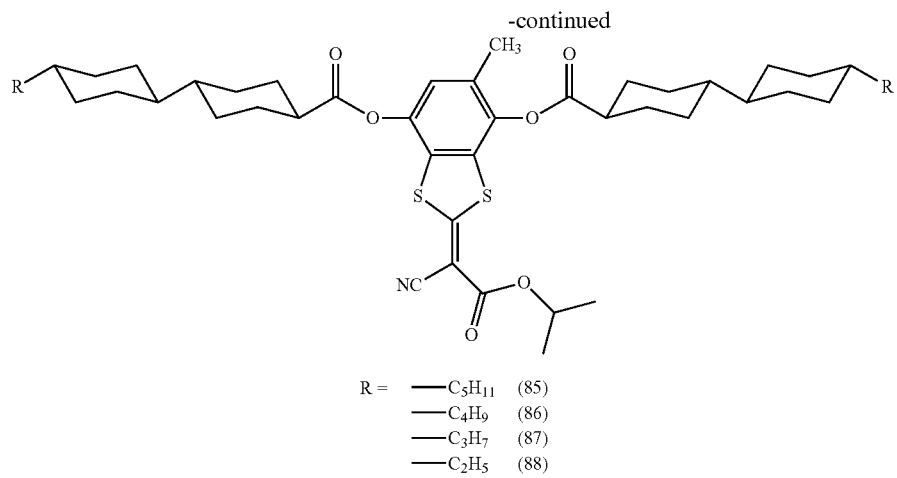
R = —C₅H₁₁ (85)
—C₄H₉ (86)
—C₃H₇ (87)
—C₂H₅ (88)
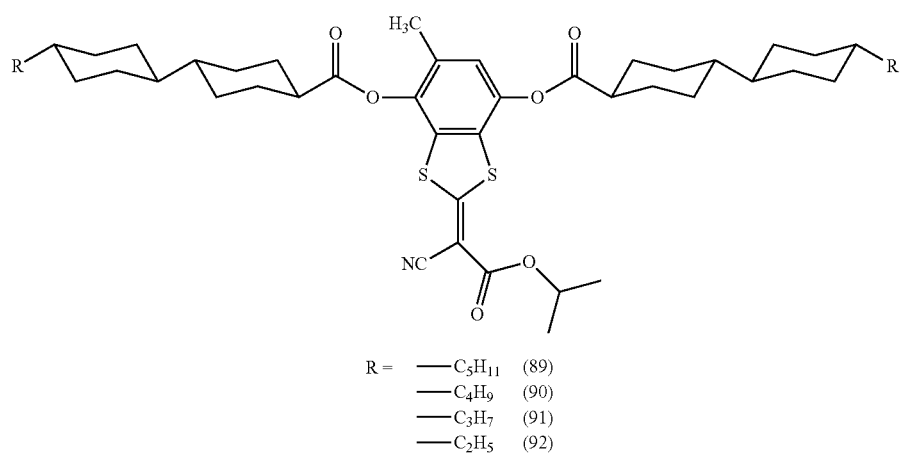
R = —C₅H₁₁ (89)
—C₄H₉ (90)
—C₃H₇ (91)
—C₂H₅ (92)
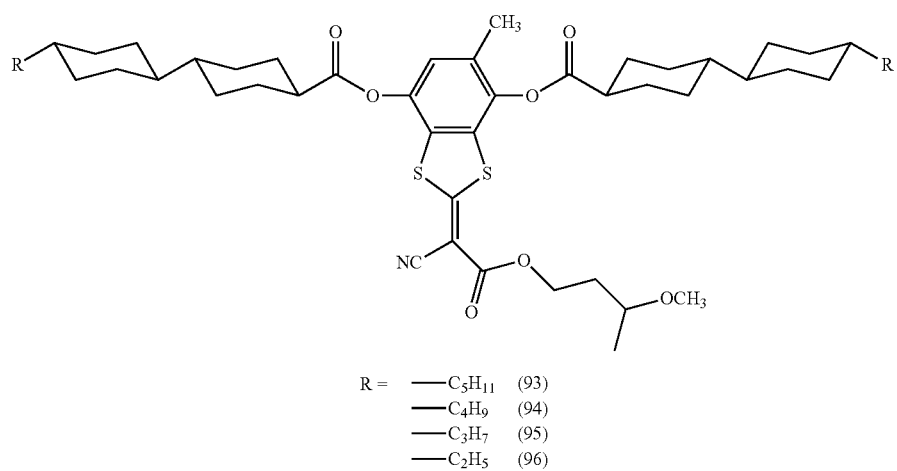
R = —C₅H₁₁ (93)
—C₄H₉ (94)
—C₃H₇ (95)
—C₂H₅ (96)

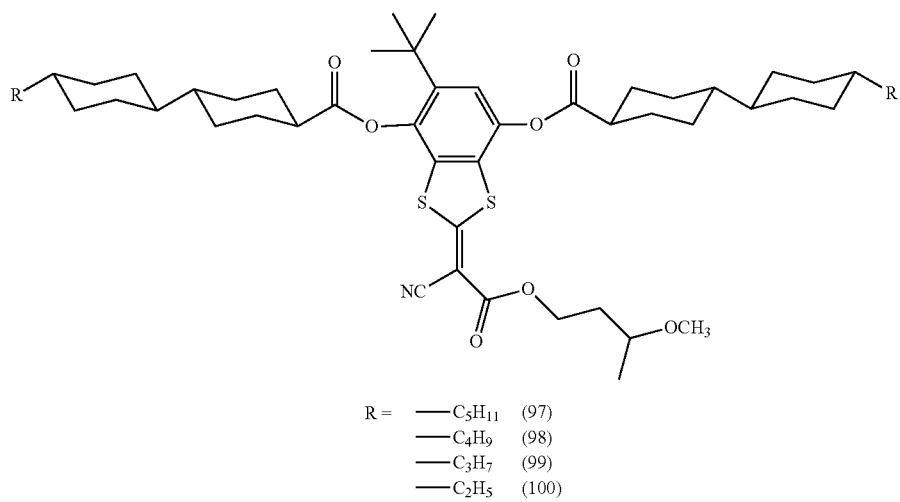
R = —C₅H₁₁ (97)
—C₄H₉ (98)
—C₃H₇ (99)
—C₂H₅ (100)
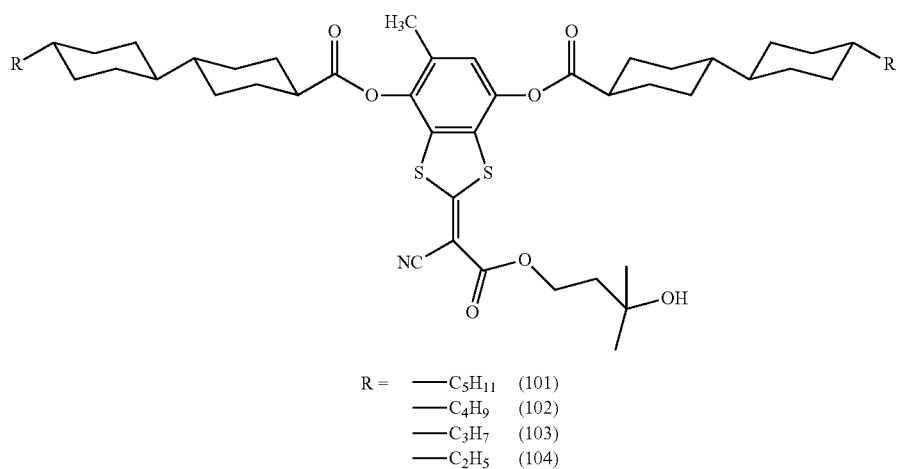
R = —C₅H₁₁ (101)
—C₄H₉ (102)
—C₃H₇ (103)
—C₂H₅ (104)
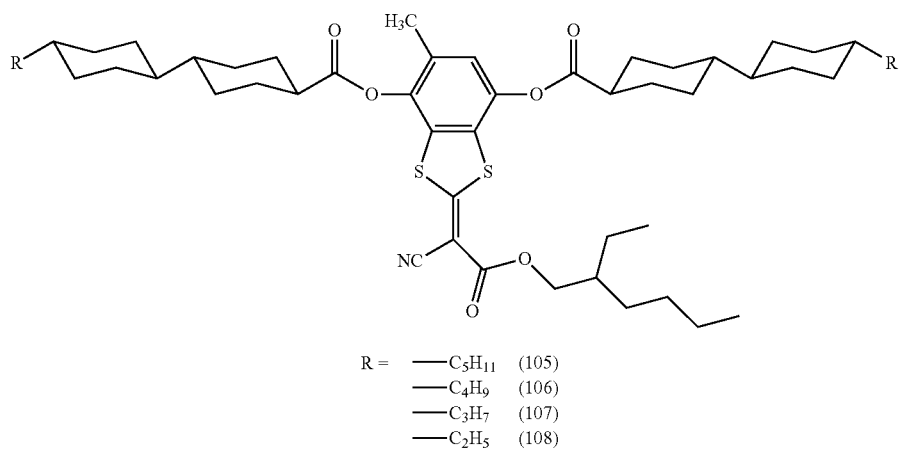
R = —C₅H₁₁ (105)
—C₄H₉ (106)
—C₃H₇ (107)
—C₂H₅ (108)

-continued
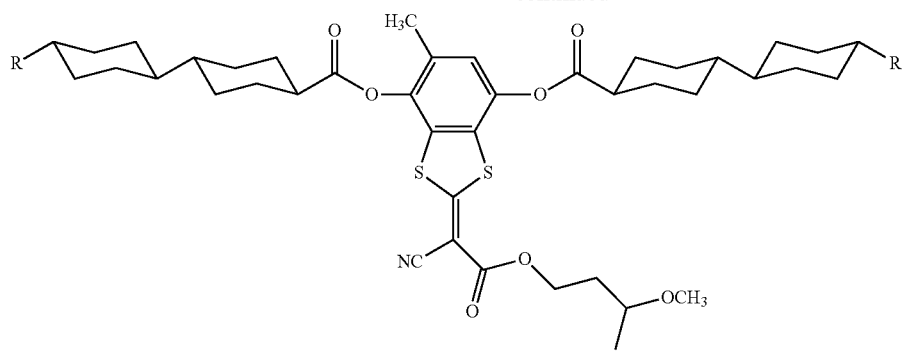
R = —C₅H₁₁ (109)
—C₄H₉ (110)
—C₃H₇ (111)
—C₂H₅ (112)
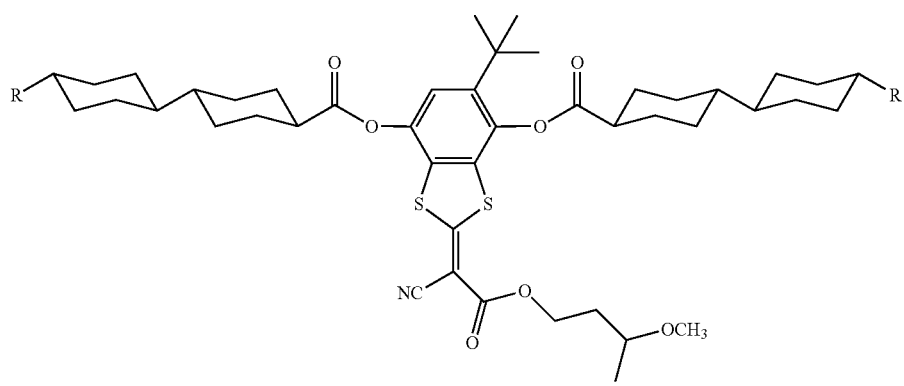
R = —C₅H₁₁ (113)
—C₄H₉ (114)
—C₃H₇ (115)
—C₂H₅ (116)
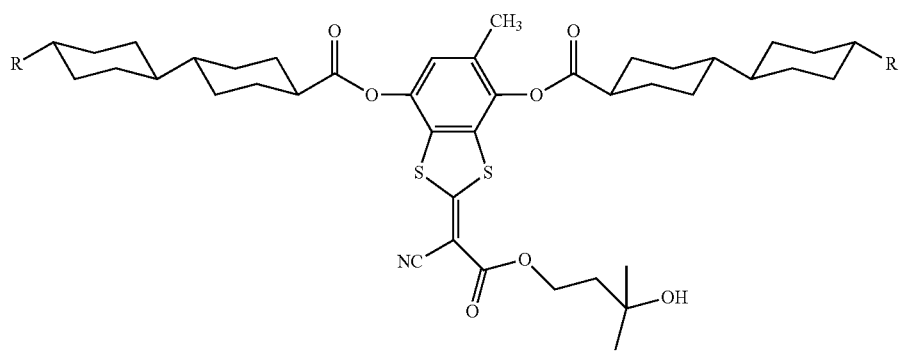
R = —C₅H₁₁ (117)
—C₄H₉ (118)
—C₃H₇ (119)
—C₂H₅ (120)

-continued
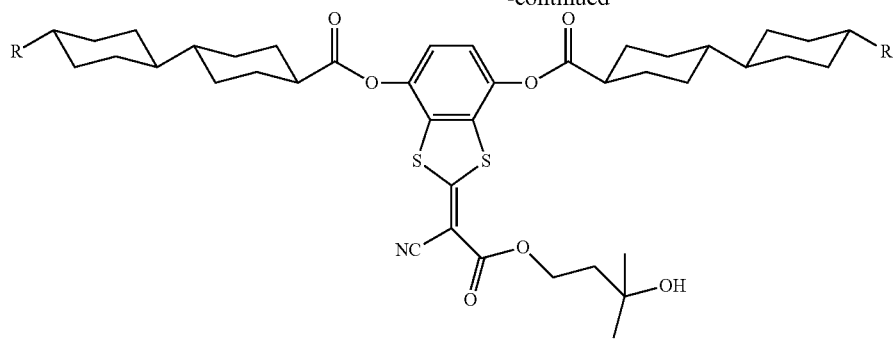
R = —C$_5$H$_{11}$ (121)
—C$_4$H$_9$ (122)
—C$_3$H$_7$ (123)
—C$_2$H$_5$ (124)
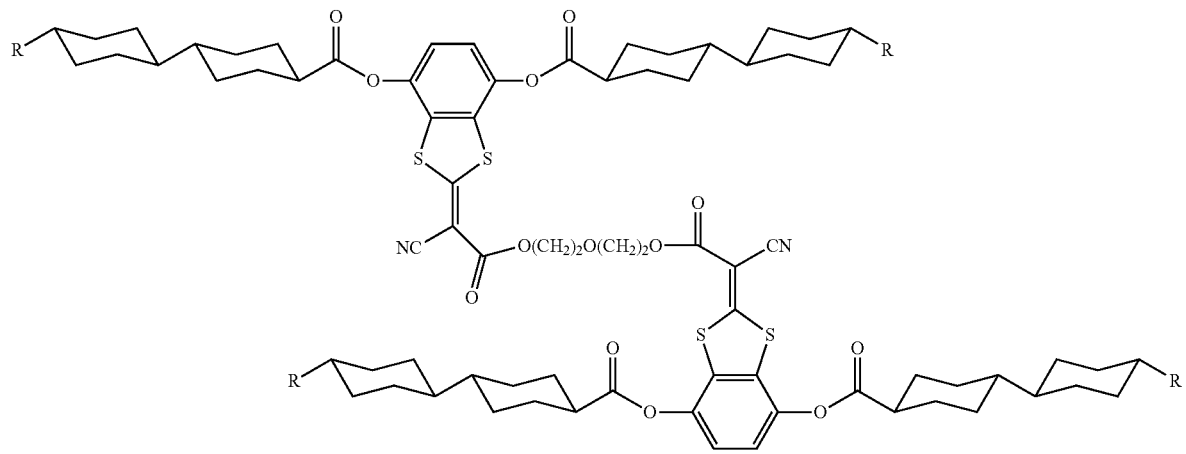
R = —C$_5$H$_{11}$ (125)
—C$_4$H$_9$ (126)
—C$_3$H$_7$ (127)
—C$_2$H$_5$ (128)
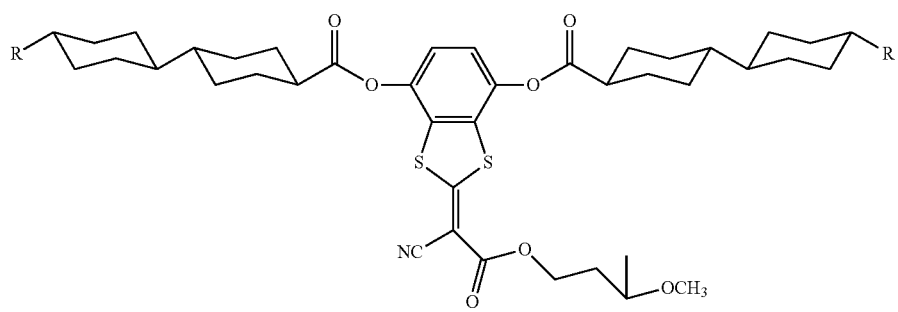
R = —C$_2$H$_5$ (129)
—C$_2$H$_5$ (130)
—C$_3$H$_7$ (131)
—C$_3$H$_7$ (132)

-continued
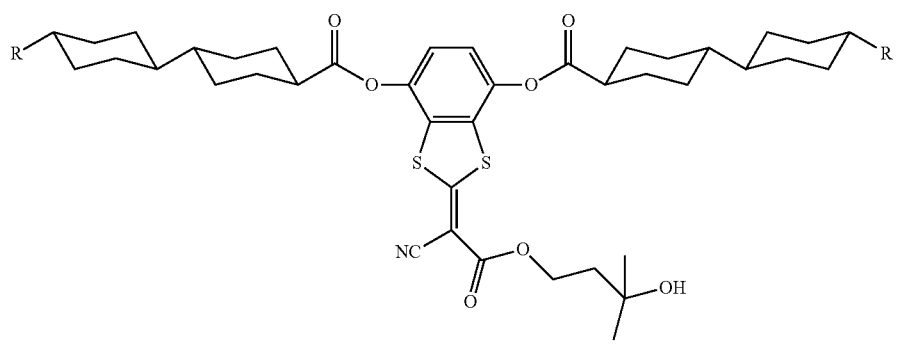
| R1 = | | R2 = | | |
|---|---|---|---|---|
| —C$_2$H$_5$ | | —C$_4$H$_9$ | | (133) |
| —C$_2$H$_5$ | | —C$_3$H$_7$ | | (134) |
| —C$_3$H$_7$ | | —C$_4$H$_9$ | | (135) |
| —C$_3$H$_7$ | | —C$_5$H$_{11}$ | | (136) |
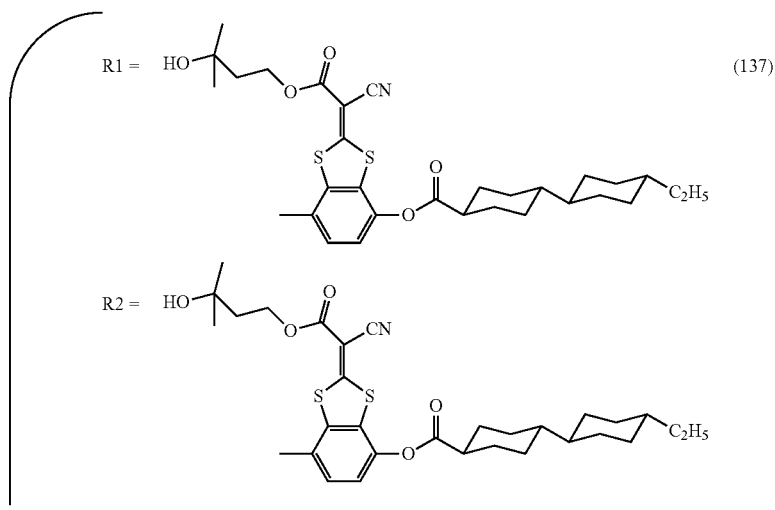
(137)
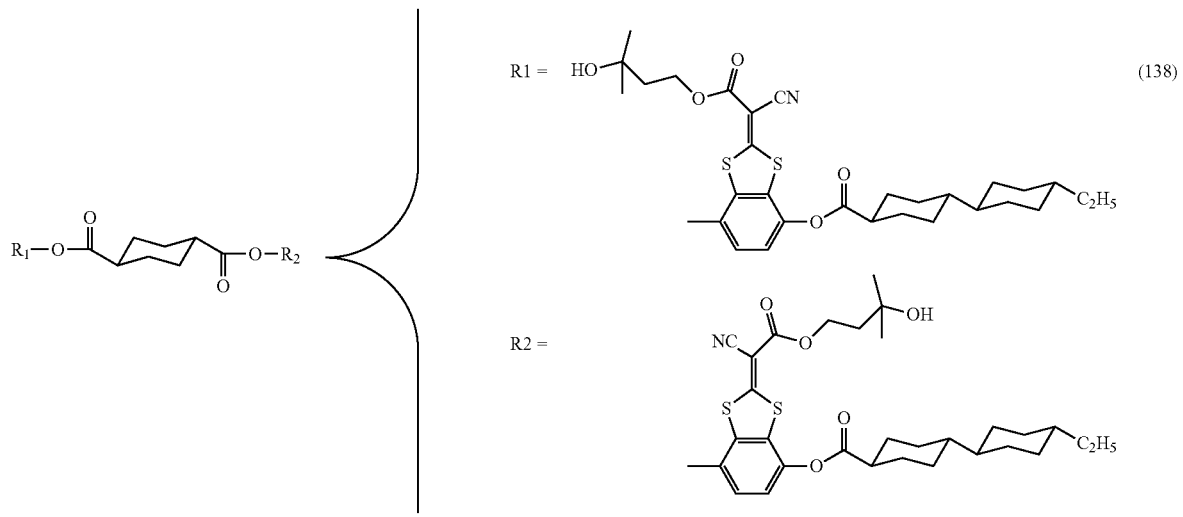
(138)

-continued
R1 = 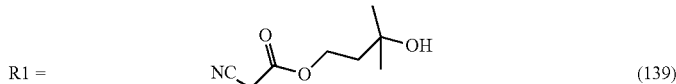 (139)
R2 = 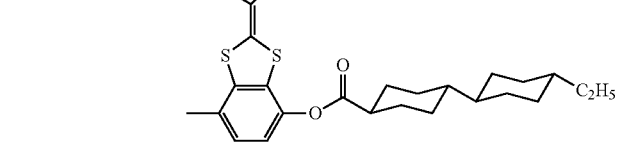
R1 =  (140)
R2 = 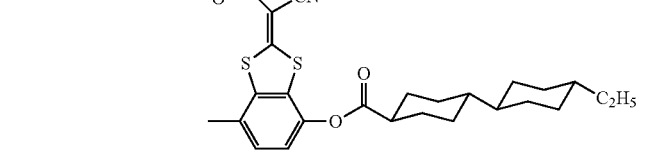
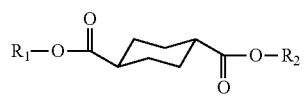
R1 =  (141)
R2 = 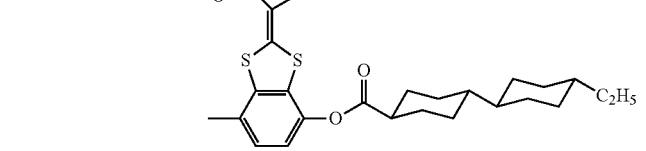

R1 = 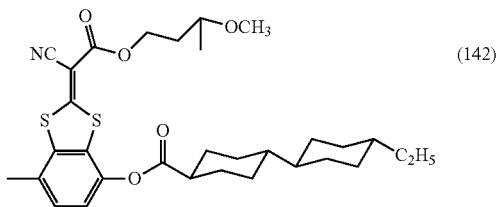 (142)
R2 = 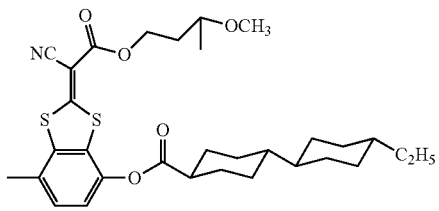
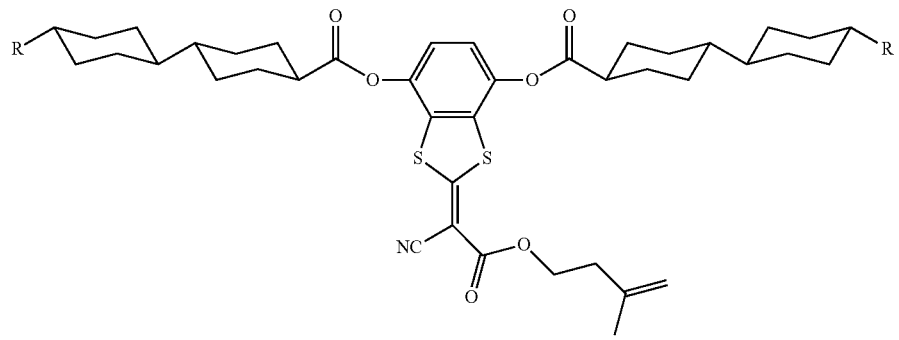
R = —C$_2$H$_5$ (143)
—C$_2$H$_5$ (144)
—C$_3$H$_7$ (145)
—C$_3$H$_7$ (146)
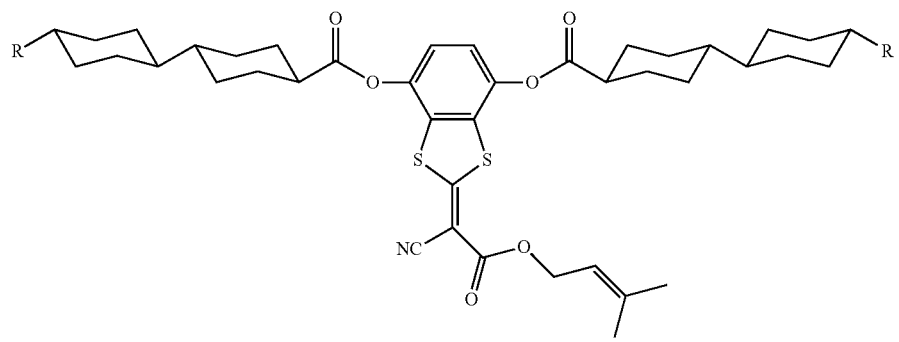
R = —C$_2$H$_5$ (147)
—C$_2$H$_5$ (148)
—C$_3$H$_7$ (149)
—C$_3$H$_7$ (150)

-continued
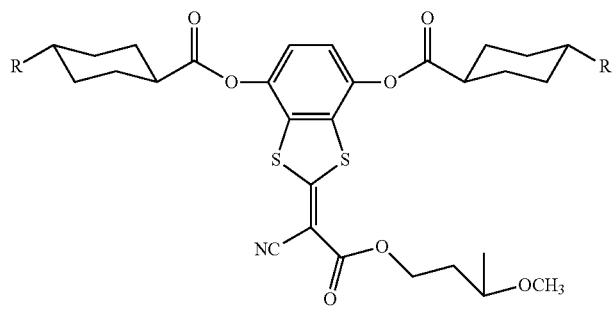
R = —H (151)
—C$_4$H$_9$ (152)
—C$_5$H$_{11}$ (153)
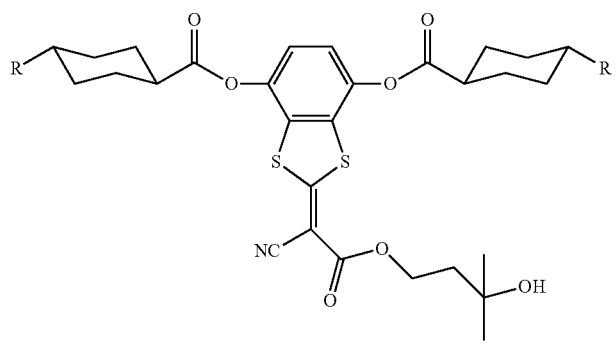
R = —H (154)
—C$_4$H$_9$ (155)
—C$_5$H$_{11}$ (156)
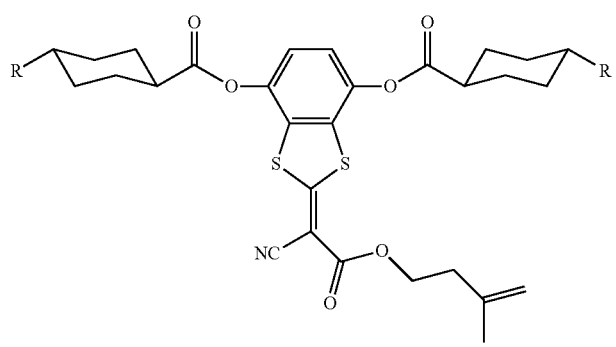
R = —H (157)
—C$_4$H$_9$ (158)
—C$_5$H$_{11}$ (159)
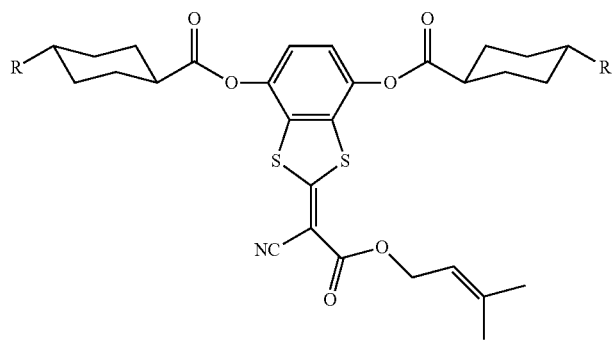
R = —H (160)
—C$_4$H$_9$ (161)
—C$_5$H$_{11}$ (162)

-continued
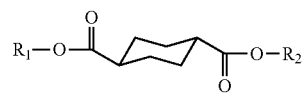
R1 =  (163)
R2 = 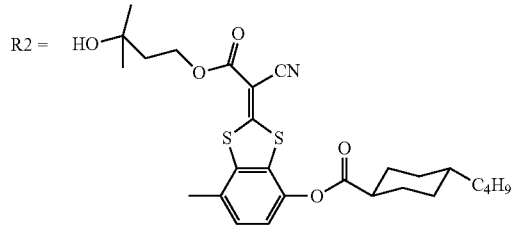
R1 =  (164)
R2 = 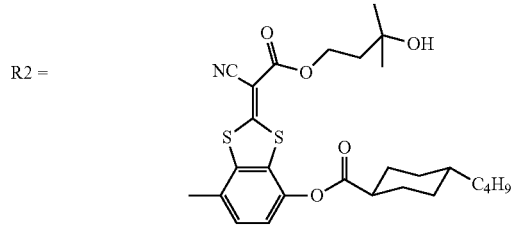
R1 = 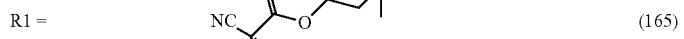 (165)
R2 = 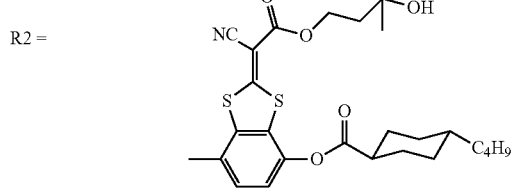

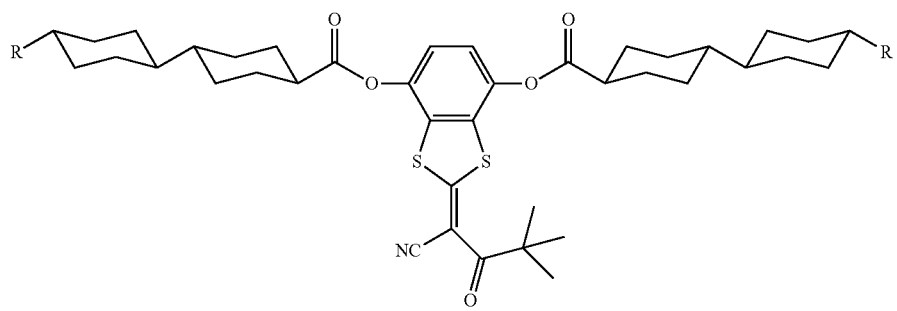
R =  —C₅H₁₁  (166)
    —C₄H₉   (167)
    —C₃H₇   (168)
    —C₂H₅   (169)
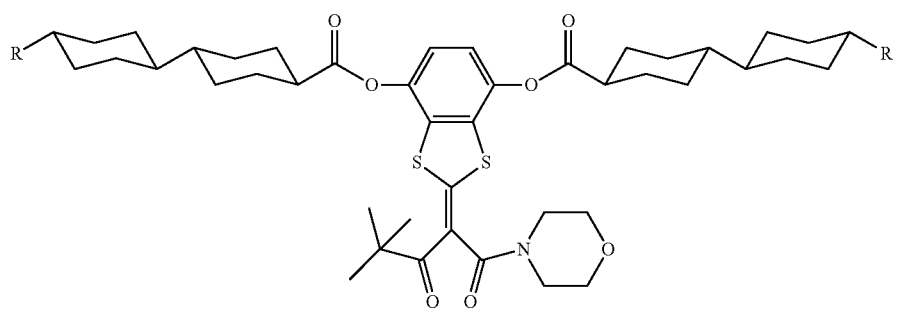
R =  —C₅H₁₁  (170)
    —C₄H₉   (171)
    —C₃H₇   (172)
    —C₂H₅   (173)
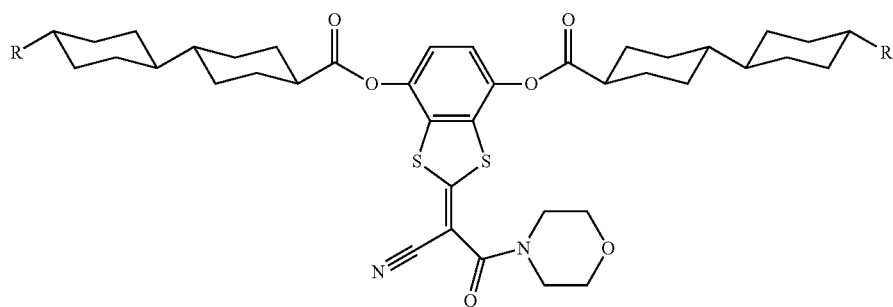
R =  —C₅H₁₁  (174)
    —C₄H₉   (175)
    —C₃H₇   (176)
    —C₂H₅   (177)
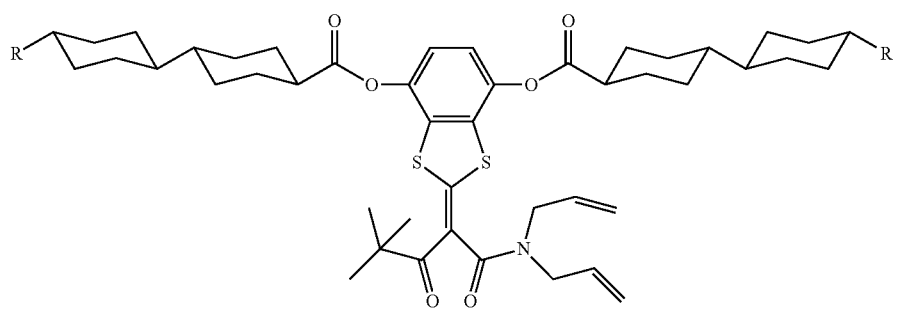
R =  —C₅H₁₁  (178)
    —C₄H₉   (179)
    —C₃H₇   (180)
    —C₂H₅   (181)

-continued
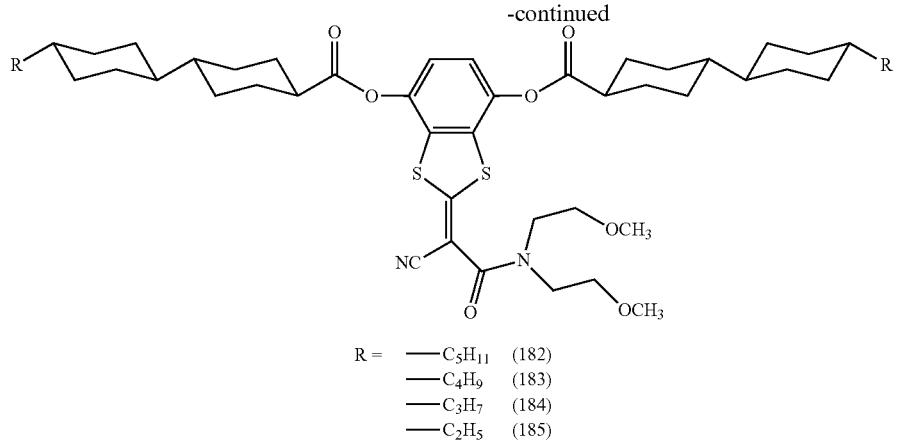
R =  —C$_5$H$_{11}$ (182)
    —C$_4$H$_9$ (183)
    —C$_3$H$_7$ (184)
    —C$_2$H$_5$ (185)
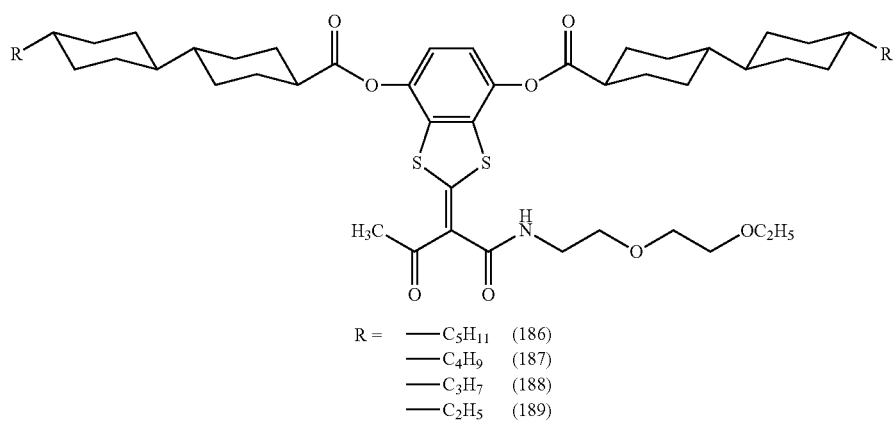
R =  —C$_5$H$_{11}$ (186)
    —C$_4$H$_9$ (187)
    —C$_3$H$_7$ (188)
    —C$_2$H$_5$ (189)
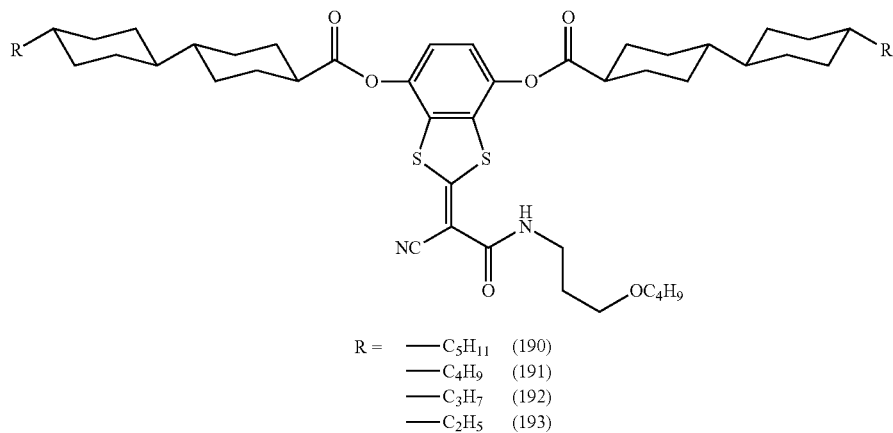
R =  —C$_5$H$_{11}$ (190)
    —C$_4$H$_9$ (191)
    —C$_3$H$_7$ (192)
    —C$_2$H$_5$ (193)

The compound represented by the formula (II) or (III) may be synthesized referring to known methods. For example, Example Compound (I) may be synthesized according to the following scheme.

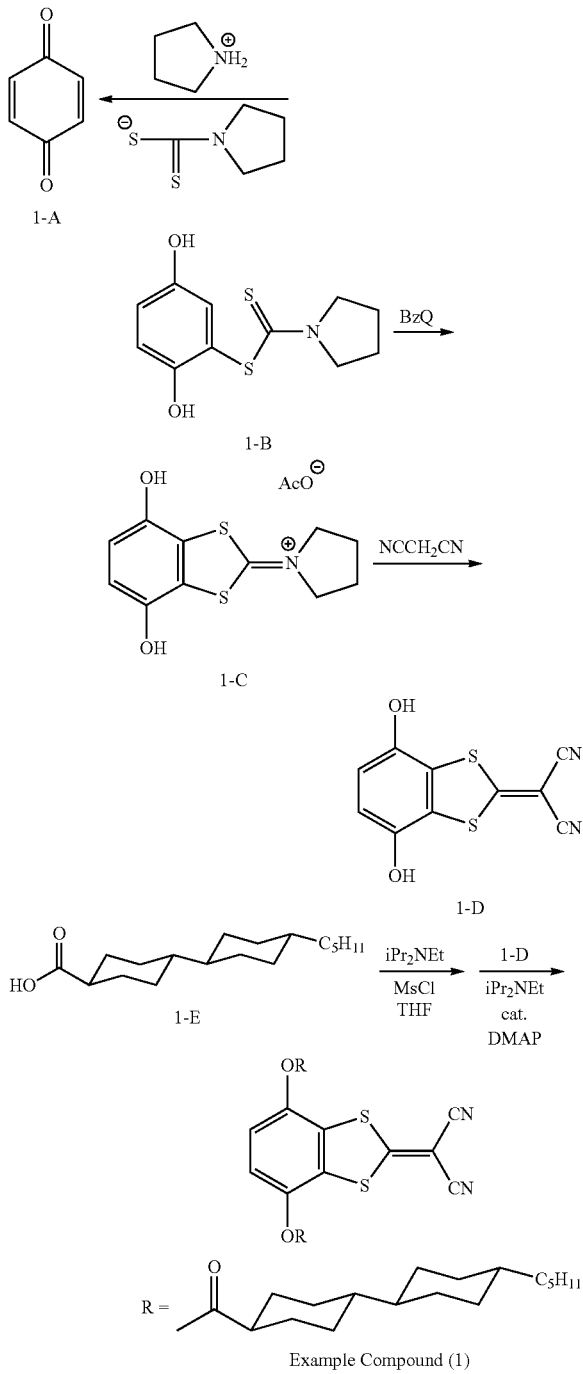

Example Compound (1)

In the above scheme, the steps for producing Compound (1-d) from Compound (1-A) may be carried out referring to the description in "Journal of Chemical Crystallography" (1997); 27(9); p. 515-526.

As shown in the above scheme, Example Compound (1) may be produced as follows. A tetrahydrofuran solution of Compound (1-E) is added with methanesulfonic acid chloride, added dropewise with N,N-di-iso-propylethylamine and then stirred. After that, the reaction solution is added with N,N-di-iso-propylethylamine, added dropewise with a tetrahydrofuran of Compound (1-D), and then added dropewise with a tetrahydrofuran solution of N,N-dimethylamino pyridine (DMAP).

One species or two or more species of compounds may be used as the retardation enhancer. The amount of the retardation enhancer is preferably from 0.1 to 30 mass % and more preferably from 0.5 to 20 mass % with respect to 100 parts mass of cellulose acylate.

When the cellulose acylate film is produced according to a solvent cast method, the retardation enhancer may be added to the dope. The addition of the retardation enhancer to the dope may be conducted any stage, and for example, a solution of the retardation enhancer may be prepared by dissolving it in an organic solvent such as alcohol, methylene chloride or dioxolane and then added to the dope; or the retardation enhancer may be added to the dope directly.

(Compound Capable of Mending Humidity Dependence)

The second retardation layer is characterized in that its $\Delta Re_2$ is smaller than $\Delta Re_1$ of the first retardation layer. For satisfying this characteristic, it is desirable to add a compound capable of mending the humidity dependence to the second retardation layer. In case where the second retardation layer is a cellulose acylate film, one preferred example of the compound capable of mending the humidity dependence is a compound having a cyclic structure group and having at least two substituents capable of hydrogen-bonding to water in the cyclic structure group, in which the structures capable of forming a hydrogen bond to water molecule are positioned in point symmetry relative to the center of the cyclic structure. The compound having such a structure is characterized in that it may competitively prevent water molecule from bonding to other molecules (molecules of polymer and additive such as retardation enhancer), and that the intrinsic birefringence change caused by the hydrogen bonding formation between the polymer and/or additives such as retardation enhancer and water may be canceled by the intrinsic birefringence change to be caused by the hydrogen bonding formation between the compound and water. Examples of the compound having such characteristics, which can be used as the compound capable of mending the humidity dependence, include those represented by following formula (A). Of the compounds of formula (A), preferred are those having a hydrophilicity/hydrophobicity index, log P, of from 3 to 10.

$$R^1\text{-L-X-L-}R^1 \quad (A)$$

In this, X represents an aromatic or aliphatic cyclic group; L represents a linking group being capable of forming a hydrogen bond to water, and the two L's are positioned symmetrically each other with the cyclic group X between; and $R^1$ represents an aromatic or aliphatic substituent.

The aromatic ring for X is preferably a benzene ring, a naphthalene ring or a triphenylene ring, more preferably a benzene ring. The aliphatic ring is preferably a cyclobutane ring, a cyclohexane ring or a cyclooctane ring, more preferably a cyclohexane ring. The aliphatic ring preferably has a carbonyl group in the trans-position.

L is preferably a divalent linking group selected from —O—CO—, —CO—O—, —NH—CO—, —CO—NH— and their combinations, more preferably —CO—O— or —CO—NH—.

$R^1$ is preferably an alkyl group having from 1 to 30 carbon atoms, an alkenyl group, a silyloxy group, an amino group, a sulfamoylamino group, a sulfamoyl group, an acyl group, an aryl group or a heterocyclic azo group.

Of the compounds of formula (A), more preferred for the compound capable of mending the humidity dependence are compounds having a structure of following formula (B):

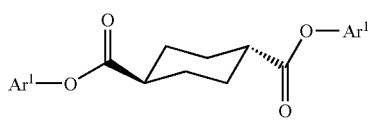
(B)

In formula (B), Ar¹ each independently represents an aromatic group. In this description, the term "aromatic group" is used for any aryl groups (aromatic hydrocarbon groups), any substituted aryl groups, any aromatic heterocyclic groups and any substituted aromatic heterocyclic groups.

The aryl group and the substituted aryl group are preferred to the aromatic heterocyclic group and the substituted aromatic heterocyclic group. The hetero ring of the aromatic heterocyclic group is generally unsaturated. The aromatic hetero ring is preferably a 5-membered ring, a 6-membered ring or a 7-membered ring, more preferably a 5-membered ring or a 6-membered ring. The aromatic hetero ring generally has maximum double bonds. The hetero atom is preferably a nitrogen atom, an oxygen atom and/or a sulfur atom, more preferably a nitrogen atom and/or a sulfur atom.

Preferable examples of the aromatic ring include benzene ring, furan ring, thiophene ring, pyrrole ring, oxazole ring, thiazole ring, imidazole ring, triazole ring, pyridine ring, pyrimidine ring and pyrazine ring; and benzene ring is especially preferable.

Examples of the substituent of the substituted aryl or aromatic heterocyclic group include halogen atoms such as F, Cl, Br and I; hydroxy, carboxy, cyano, amino, alkylaminos such as methylamino, ethylamino, butylamino and dimethylamino; nitro, sulfo, carbamoyl, alkylcarbamoyls such as N-methylcarbamoyl, N-ethylcarbamoyl and N,N-dimethylcarbamoyl; sulfamoyl, alkylsulfamoyls such as N-methylsulfamoyl, N-ethylsulfamoyl and N,N-dimethylsulfamoyl; ureido, allylureidos such as N-methylureido, N,N-dimethylureido and N,N,N'-trimethyl ureido; alkyls such as methyl, ethyl, propyl, butyl, pentyl, heptyl, octyl, isopropyl, s-butyl, t-amyl, cyclohexyl and cyclopentyl; alkenyls such as vinyl, allyl and hexenyl; alkynyls such as ethynyl and butynyl; acyls such as formyl, acetyl, butyryl, hexanoyl and lauryl; acyloxys such as acetoxy, butyryloxy, hexanoyloxy and lauryloxy; alkoxys such as methoxy, ethoxy, propoxy, butoxy, pentyloxy, heptyloxy and octyloxy; aryloxys such as phenoxy; alkoxycarbonyls such as methoxycarbonyl, ethoxycarbonyl, propioxycarbonyl, butoxycarbonyl, pentyloxycarbonyl and heptyloxycarbonyl; aryloxycarbonyls such as phenoxycarbonyl; alkoxycarbonylaminos such as butoxycarbonylamino and hexyloxycarbonylamino; alkylthios such as methylthio, ethylthio, propylthio, butylthio, pentylthio, heptylthio and octylthio; arylthios such as phnylthio; alkylsulfonyls such as methylsulfonyl, ethylsulfonyl, propylsulfonyl, butylsulfonyl, pentylsulfonyl, heptylsulfonyl and octylsulfonyl; amidos such as acetoamido, butylamido, hexylamido and laurylamido; and non-aromatic heterocyclic groups such as morpholino and pyrazinyl.

Examples of the substituent of the substituted aryl or aromatic heterocyclic group include halogen atoms, cyano, carboxyl, hydroxy, amino, alkyl-substituted aminos, acyls, acyloxys, amidos, alkoxycarbonyls, alkoxys, alkylthios and alkyls.

The alkyl moiety of the alkylamino, alkoxycarbonyl or alkoxy and the alkyl may have at least one substituent. Examples of such substituent include halogen atoms, hydroxy, carboxyl, cyano, amino, alkylaminos, nitro, sulfo, carbamoyl, alkylcarbamoyls, sulfamoyl, alkylsulfamoyls, ureido, alkylureidos, alkenyls, alkynyls, acyls, acyloxys, acylaminos, alkoxys, aryloxys, alkoxycarbonyls, aryloxycarbonyls, alkoxycarbonylaminos, alkylthios, arylthios, alkylsulfonyls, amidos and non-aromatic heterocyclic groups. Preferable examples of the substituent of the alkyl moiety or the alkyl include halogen atoms, hydroxy, amino, alkylaminos, acyls, acyloxys, acylaminos, alkoxycarbonyls and alkoxys.

Specific examples of the compound capable of mending the humidity dependence of formula (A) are shown below, to which, however, the invention should not be limited.

A-1

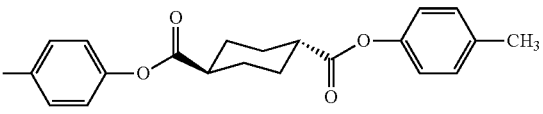
A-2

A-3

A-4

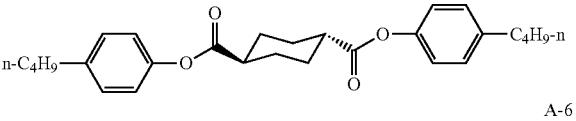
A-5

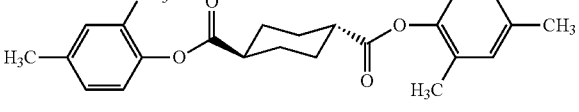
A-6

The compounds capable of mending the humidity dependence of formulae (A) and (B) may be produced according to methods described in literature. The literature includes Mol. Cryst. Liq. Cryst., Vol., 53, p. 229 (1979); ibid., Vol. 89, p. 93 (1982); ibid., Vol. 145, p. 111 (1987); ibid., Vol. 170, p. 43 (1989); J. Am. Chem. Soc., Vol. 113, p. 1349 (1991); ibid., Vol. 118, p. 5346 (1996); ibid., Vol. 92, p. 1582 (1970); J. Org. Chem., Vol. 40, p. 420 (1975); Tetrahedron, Vol. 48, No. 16, p. 3437 (1992).

Log P of the compound capable of mending the humidity dependence for use in the invention is preferably from 3 to 10, more preferably from 3 to 7. Using the compound capable of mending the humidity dependence having log P that falls within the above range may reduce the humidity dependence of Re not causing a face condition trouble such as bleeding out, etc.

The log P value means an octanol-water partition coefficient, and it may be determined according to the flask shaking method described in JIS (Japanese Industrial Standards) Z7260-107 (2000). In place of determining it through actual measurement, the octanol-water partition coefficient (log P value) may be estimated according to a computational chemical method or an experimental method. As the computational method, preferably employed are a Crippen's fragmentation method (J. Chem. Inf. Comput. Sci., 27, 21 (1987)), a Viswanadhan's fragmentation method (J. Chem. Inf. Comput. Sci., 29, 163 (1989)), a Broto's fragmentation method (Eur. J. Med. Chem.-Chim. Theor., 19, 71 (1984)). Particularly, the Crippen's fragmentation method (J. Chem. Inf. Comput. Sci., 27, 21 (1987)) is preferably employed. In case where the log P value of a certain compound differs depending on the measurement method or the computational method employed, the compound is preferably judged according to a Crippen's fragmentation method as to whether or not it could fall within the preferred range.

Two or more compounds may be used, as combined, as the compound capable of mending the humidity dependence. The amount of the compound capable of mending the humidity dependence to be added is preferably from 0.1 to 30 parts by mass relative to 100 parts by mass of cellulose acylate, more preferably from 0.5 to 20 parts by mass, even more preferably from 1 to 15 parts by mass. Also preferably, the ratio by mass of the compound capable of mending the humidity dependence to the additives is from 30% by mass to 100% by mass, more preferably from 40% by mass to 100% by mass.

Regarding the method of adding the compound capable of mending the humidity dependence, a solution prepared by dissolving a retardation enhancer in an organic solvent such as alcohol, methylene chloride or dioxolane may be added to a cellulose acylate solution (dope), or a retardation enhancer may be directly added to a dope composition.

(Process for Producing Cellulose Acylate Film)

The cellulose acylate film to be used as the second retardation layer may be produced according to the same method as that for the first retardation cellulose acylate film mentioned in the above.

(Stretching Treatment)

Preferably, the cellulose acylate film to be used as the second retardation layer is stretched. The stretching may give a desired retardation to the cellulose acylate film. Preferably, the cellulose acylate film to be used as the second retardation layer is stretched in the transverse direction (transverse-direction stretching). As stretched in the transverse direction, the second retardation layer may be stuck to a polarizing element in a mode of roll-to-roll operation in such a manner that the transmission axis of the polarizing element is in parallel to the slow axis of the second retardation layer.

Examples of the method for stretching a film in the transverse direction include those described in JPA Nos. syo 62-115035, hei 4-152125, hei 4-284211, hei 4-298310 and hei 11-48271. Stretching may be carried out at normal temperature or under heating. When a film is dried for film-forming, is may be subjected to a stretching treatment, and this process is effective for the film containing the remaining solvent. Stretching in the transverse direction may be carried out as follows: a film is fed while the film is held both sides of the transverse direction by a tenter, and then the distance between the clips are gradually widened. Or after drying, the film may be stretched by using a stretch machine, preferably stretched uniaxially by using a long-stretch machine.

Preferably, the stretching ratio of the film (percentage of elongation relative to the unstretched film) is from 1% to 200%, more preferably from 5% to 150%.

In the production method that includes the stretching step of stretching the film in the transverse direction and the step of shrinking it in the machine direction, the film is held by a pantograph-type or linear motor-type tenter, and while stretched in the transverse direction, the film may be shrunk in the machine direction by gradually narrowing the distance between the clips.

Concretely, as the stretching device for stretching any one of the machine direction or the transverse direction of the film and simultaneously shrinking it in the other direction with increasing the thickness of the film at the same time, preferably employed is an Ichigane Industry's machine, FITZ. The device is described in JPA No. 2001-38802.

The stretching ratio in the stretching step and the shrinking ratio in the shrinking step may be suitably selected and determined in accordance with the intended in-plane retardation Re and the thickness-direction retardation Rth of the film. Preferably, the stretching ratio in the stretching step is at least 10%, and the shrinking ratio in the shrinking step is at least 5%.

The shrinking ratio as referred to in the invention means the ratio of the shrunk length in the shrinking direction of the film after shrunk to the length of the original film before not as yet shrunk.

The shrinking ratio is preferably from 5 to 40%, more preferably from 10 to 30%.

(Thickness of Cellulose Acylate Film)

The thickness of the second retardation layer is not specifically defined. In one example where a cellulose acylate film is used for the second retardation layer, the thickness of the layer (after stretched) is preferably from 10 μm to 200 μm, more preferably from 20 μm to 150 μm, even more preferably from 30 μm to 100 μm.

(Mat Agent Fine Particles)

Preferably, fine particles are added as a mat agent to the polymer film for use as the first retardation layer and the second retardation layer. Fine particles for use in the invention includes silicon dioxide (silica), titanium dioxide, aluminium oxide, zirconium oxide, calcium carbonate, calcium carbonate, talc, clay, calcined kaolin, calcined calcium silicate, calcium silicate hydrate, aluminum silicate, magnesium silicate and calcium phosphate. Of the fine particles, preferred are those containing silicon as the haze of the film with them may be low, and more preferred is silicon dioxide. Preferably, fine particles of silicon dioxide for use herein have a primary mean particle size of from 1 nm to 20 nm and an apparent specific gravity of at least 70 g/liter. Those having a mean particle size of the primary particles of from 5 to 25 nm are more preferred as capable of reducing the haze of the film with them. The apparent specific gravity is preferably from 90 to 200 g/liter or more, more preferably from 100 to 200 g/liter or more. Having a larger apparent specific gravity, the particles may form a dispersion of high concentration, and they are favorable as capable of reducing the haze of the film with them and capable bettering their aggregates.

The fine particles generally form secondary particles having a mean particle size of from 0.05 to 2.0 μm, and the fine particles may exist in the film as aggregates of their primary particles, therefore forming fine projections and recesses with a size of from 0.05 to 2.0 μm in the film surface. The secondary mean particle size is preferably from 0.05 μm to 1.0 μm, more preferably from 0.1 μm to 0.7 μm, even more preferably from 0.1 μm to 0.4 μm. The primary or secondary particle size as referred to herein means the particle size as determined by observing the particles in the film with a scanning electronic microscope and measuring the diameter of the circle that circumscribes the particle. 200 different particles in different sites are analyzed and measured in that manner, and their mean value is the mean particle size.

For fine particles of silicon dioxide, for example, herein usable are commercial products of AEROSIL R972, R972V, R974, R812, 200, 200V, 300, R202, OX50, TT600 (all by Nippon Aerosil). Fine particles of zirconium oxide are commercially available, for example, as AEROSIL R976 and R811 (both by Nippon Aerosil), and they are usable herein.

Of those, especially preferred are AEROSIL 200V and AEROSIL R972V, as they are fine particles of silicon dioxide having a primary mean particle size at most 20 nm and an apparent specific gravity of at least 70 g/liter, and they are significantly effective for reducing the friction coefficient of the optical film with them while keeping the haze of the film low.

In the invention, the method of incorporating the mat agent is not specifically defined. For mixing a dispersion of the mat agent and a solution of additives, and for mixing them with a cellulose acylate solution, preferably used is an in-line mixer. In case where silicon dioxide fine particles are mixed with a solvent to form a dispersion, the concentration of silicon dioxide is preferably from 5 to 30% by mass, more preferably from 10 to 25% by mass, even more preferably from 15 to 20% by mass. The dispersion having a higher concentration is preferred as capable of reducing the haze of the film with it and capable bettering its aggregates. Concretely, when the same amount of a dispersion having a higher concentration is added to a film, then the film may have a lower haze. The amount of the mat agent in the final cellulose acylate dope is preferably from 0.001 to 1.0% by mass, more preferably from 0.005 to 0.5% by mass, even more preferably from 0.01 to 0.1% by mass.

(Saponification Treatment)

The polymer film for use for the first retardation layer and the second retardation layer may be saponified with alkali. The saponification may enhance the adhesiveness of the film to the material of a polarizing element such as polyvinyl alcohol, and the optical film is favorably used as a protective film of polarizing plate.

The alkali saponification is preferably according to a cycle of dipping the film surface in an alkali solution, then neutralizing it with an acid solution, rinsing it with water and drying it. The alkali solution includes a potassium hydroxide solution and a sodium hydroxide solution, in which the hydroxide ion concentration preferably falls within a range of from 0.1 to 5.0 mol/liter, more preferably from 0.5 to a 4.0 mol/liter. The alkali solution temperature is preferably from room temperature to 90° C., more preferably from 40 to 70° C.

[Polarizing Plate]

In the liquid-crystal display device of the invention, a polarizing plate may be used, which comprises the first retardation layer and/or the second retardation layer as the protective film of the polarizing element therein. More concretely, in the invention, usable is a polarizing plate which comprises a polarizing element and a protective film on both surfaces thereof and in which one protective film is a polymer film that satisfies the characteristics of the first retardation layer or the second retardation layer. The polarizing plate of this constitution may be used as the upper polarizing plate PL1 or the lower polarizing plate PL2 in FIG. 1. Also usable is a polarizing plate that comprises, as a protective film of one surface of the polarizing element, a laminate film of polymer films satisfying the characteristics required for the first retardation layer and the second retardation layer. The polarizing plate of this constitution may be sued as the upper polarizing plate PL1' in FIG. 2.

For the polarizing element, for example, usable is a polarizing film prepared by dyeing a polyvinyl alcohol film with iodine and stretching it.

The polarizing plate for use in the invention may comprise an antireflection film or a brightness enhancing film for improving the visibility of displays, and also a functional layer such as a hard coat layer, a front scattering layer, an antiglare layer, etc.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

[Example of Forming Cellulose Acylate Film for First Retardation Layer]

<Formation of First Retardation Film 1>

Ingredients for a cellulose acylate solution A mentioned below were put into a mixing tank, and stirred under heat to dissolve the ingredients to prepare a cellulose acylate solution A.

(Composition of Cellulose Acylate Solution A)

| | |
|---|---|
| Cellulose acetate having a degree of substitution of 2.86 | 100 mas. % |
| Triphenyl phosphate (plasticizer) | 7.8 mas. % |
| Biphenyldiphenyl phosphate (plasticizer) | 3.9 mas. % |
| Methylene chloride (first solvent) | 300 mas. % |
| Methanol (second solvent) | 54 mas. % |
| 1-Butanol | 11 mas. % |

Ingredients for an additive solution B-1 mentioned below were put into a different mixing tank, and stirred under heat to dissolve the ingredients to prepare an additive solution B-1.

(Composition of Additive Solution B-1)

| | |
|---|---|
| Methylene chloride | 68 mas. % |
| Methanol | 17 mas. % |
| Retardation enhancer A | 15 mas. % |

(Retardation Enhancer A)

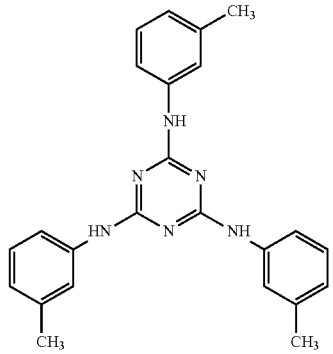

(Formation of First Retardation Film 1)

30% by mass of the additive solution B-1 was added to 477% by mass of the cellulose acylate solution A, and well stirred to prepare a dope. The dope was cast onto a drum cooled at 0° C., through a casting port. The formed film was peeled away from the drum when it had a solvent content of 70% by mass based on the dry amount thereof, then led to pass through two rolls running at a different speed in an atmosphere at 85° C., and thereby stretched in the machine direction, or that is, in the longitudinal direction by 9%. Next, this was conveyed between rolls in a heat treatment device and was thus further dried, thereby giving a first retardation film 1 having a thickness of 72 μm.

<Formation of First Retardation Films 2 to 7>

First retardation films 2 to 7 were formed in the same manner as in the first retardation film 1, for which, however, the degree of substitution of the cellulose acetate, the type and the amount of the retardation enhancer, the stretching temperature, the stretching direction and the draw ratio in stretching, and the film thickness were varied as in Table 1.

TABLE 1

| Sample No. | Degree of acetyl substitution of cellulose acylate | Retardation enhancer 1 Type | Retardation enhancer 1 Amount *1 | Retardation enhancer 2 Type | Retardation enhancer 2 Amount *1 | Stretching direction*2 | Stretching temperature | Stretching ratio | Thickness of film (μm) |
|---|---|---|---|---|---|---|---|---|---|
| First retardation film 1 | 2.86 | A | 4.5 | — | — | MD | 85° C. | 9% | 72 |
| First retardation film 2 | 2.87 | A | 4.5 | — | — | MD | 120° C. | 9% | 71 |
| First retardation film 3 | 2.95 | B | 5.0 | C | 2.0 | MD | 88° C. | 15% | 55 |
| First retardation film 4 | 2.95 | B | 5.0 | C | 2.0 | MD | 120° C. | 15% | 54 |
| First retardation film 5 | 2.86 | B | 5.0 | C | 3.0 | MD | 80° C. | 20% | 62 |
| First retardation film 6 | 2.84 | B | 2.3 | — | — | MD | 90° C. | 20% | 80 |
| First retardation film 7 | 2.77 | D | 2.1 | — | — | TD | 140° C. | 32% | 75 |

*1 mass % with respect to the total mass of cellulose acylate.
*2 MD means a mechanical direction (longitudinal direction); and TD means a transverse direction.

(Retardation Enhancer B)

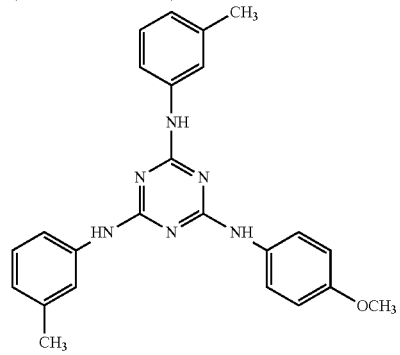

(Retardation Enhancer C)

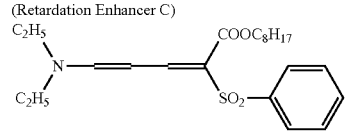

(Retardation Enhancer D)

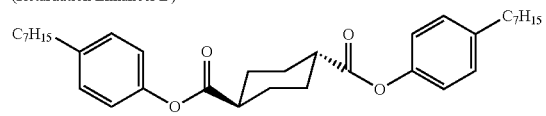

<Formation of First Retardation Film 8>

(Preparation of Cellulose Acylate Solution 08)

The following ingredients were put into a mixing tank and stirred to dissolve the ingredients, thereby preparing a cellulose acylate solution.

(Composition of Cellulose Acylate Solution 08)

| | |
|---|---|
| Cellulose acetate (degree of acetylation 2.80) | 100.0 mas. pts. |
| Triphenyl phosphate (plasticizer) | 5.0 mas. pts. |
| Biphenyl phosphate (plasticizer) | 3.0 mas. pts. |
| Methylene chloride (first solvent) | 402.0 mas. pts. |
| Methanol (second solvent) | 60.0 mas. pts. |

(Preparation of Mat Agent Solution 08)

The following ingredients were put into a disperser, and stirred to dissolve the ingredients to prepare a mat agent solution 08.

(Composition of Mat Agent Solution 08)

| | |
|---|---|
| Silica particles having a mean particle size of 20 nm (AEROSIL R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution 08 | 10.3 mas. pts. |

(Preparation of Retardation Developer Solution 08)

The following ingredients were put into a mixing tank, and stirred under heat to dissolve the ingredients to prepare a retardation enhancer solution 08.

(Composition of Retardation Enhancer Solution 08)

| | |
|---|---|
| Retardation enhancer (B-121) | 7.0 mas. pts. |
| Retardation enhancer (B-122) | 13.0 mas. pts. |
| Methylene chloride (first solvent) | 58.4 mas. pts. |
| Methanol (second solvent) | 8.7 mas. pts. |
| Cellulose acylate solution 08 | 12.8 mas. pts |

Retardation Enhancer (B-121)

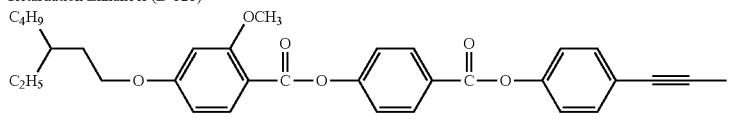

Retardation Enhancer (B-122)

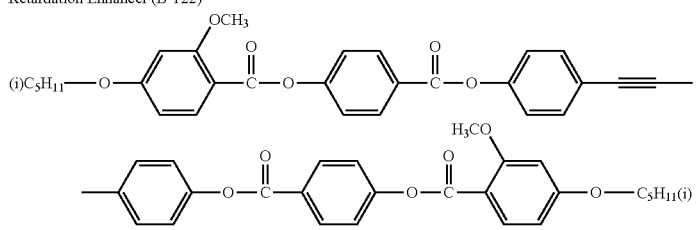

The cellulose acylate solution 08 (94.5 parts by mass), the mat agent solution 08 (1.3 parts by mass) and the retardation enhancer solution 08 (4.8 parts by mass) were mixed, each after filtered, and cast using a band caster. The film having a residual solvent content of 23% was peeled away from the band, and using a tenter, the film was stretched at 135° C. in the transverse direction at a draw ratio of 5%, and then, with the stretched width kept as such, the film was held at 135° C. for 30 seconds. Next, the clips were removed, and this was dried at 130° C. for 40 minutes thereby producing a cellulose acylate film for use in the invention. The film is referred to as a first retardation film 8. The residual solvent content of the produced film was 0.2%, and the thickness thereof was 81 μm.

[Formation of Cellulose Acylate Film for Second Retardation Layer]

<Formation of Second Retardation Film 1>

(Preparation of Cellulose Acylate Solution 01)

A ingredients for a cellulose acylate solution 01 mentioned below were put into a mixing tank, and stirred to dissolve the ingredients to prepare a cellulose acylate solution 01.

(Composition of Cellulose Acylate Solution 01)

| | |
|---|---|
| Cellulose acetate (degree of acetylation 2.91) | 100.0 mas. % |
| Plasticizer, triphenyl phosphate (TPP) | 3.0 mas. % |
| Plasticizer, biphenyl phosphate (BPP) | 2.0 mas. % |
| Methylene chloride (first solvent) | 347.0 mas. % |
| Methanol (second solvent) | 52.0 mas. % |

(Preparation of Mat Agent Solution 01)

The following ingredients for a mat agent solution 01 were put into a disperser, and stirred to dissolve the ingredients to prepare a mat agent solution 01.

(Composition of Mat Agent Solution 01)

| | |
|---|---|
| Silica particles having a mean particle size of 20 nm (AEROSIL R972, by Nippon Aerosil) | 2.0 mas. % |

-continued

| | |
|---|---|
| Methylene chloride (first solvent) | 75.0 mas. % |
| Methanol (second solvent) | 12.7 mas. % |
| Cellulose acylate solution 01 | 10.3 mas. % |

(Preparation of Additive Solution 01)

Ingredients for an additive solution 01 mentioned below were put into a mixing tank and stirred under heat to dissolve the ingredients to prepare an additive solution 01.

(Composition of Additive Solution 01)

| | |
|---|---|
| Compound capable of mending humidity dependence (A-1) | 10.9 mas. % |
| Retardation enhancer (E) | 9.1 mas. % |
| Methylene chloride (first solvent) | 58.3 mas. % |
| Methanol (second solvent) | 8.7 mas. % |
| Cellulose acylate solution 01 | 12.8 mas. % |

The cellulose acylate solution 01 (88.9% by mass), the mat agent solution 01 (1.3% by mass) and the additive solution 01 (9.8% by mass) were mixed, each after filtered, and cast using a band caster. The obtained web was peeled away from the band, and using a tenter at 140° C., this was stretched in the transverse direction at a draw ratio of 22%. Next, the clips were removed, and this was dried at 130° C. for 30 minutes thereby producing a stretched cellulose acylate film. The film is referred to as a second retardation film 1. The residual solvent content of the produced, stretched cellulose acylate film was 0.2% by mass, and the thickness thereof was 50 μm.

<Formation of Second Retardation Films 2 to 7>

Second retardation films 2 to 7 were formed in the same manner as in the second retardation film 1, for which, however, the degree of substitution of the cellulose acetate, the type and the amount of the retardation enhancer, the type and the amount of the compound capable of mending the humidity dependence, the stretching direction, the draw ratio and the film thickness were varied as in Table 2.

In Table 2, the notations are as follows;

TABLE 2

| Sample No. | Degree of acetyl substitution *1 | Amount of TPP | Amount of BDP | Humidity-dependence mending compound | | | Retardation enhancer 2 | | Ratio*3 | Stretching | | Thickness of film (μm) |
|---|---|---|---|---|---|---|---|---|---|---|---|---|
| | | | | Type | logP | Amount *2 | Type | Amount *2 | | Direction *4 | Ratio | |
| Second retardation film 1 | 2.91 | 3.0 | 2.0 | A-1 | 3.7 | 6.0 | 124 | 5.0 | 0.38 | TD | 22% | 50 |
| Second retardation film 2 | 2.87 | 4.0 | 3.0 | A-3 | 5.8 | 5.0 | 124 | 6.9 | 0.26 | TD | 24% | 45 |
| Second retardation film 3 | 2.87 | 8.0 | 4.0 | A-3 | 5.8 | 5.0 | 124 | 6.0 | 0.22 | TD | 27% | 87 |
| Second retardation film 4 | 2.86 | 7.0 | 5.0 | D | 11.0 | 1.0 | 124 | 7.0 | 0.05 | TD | 30% | 82 |
| Second retardation film 5 | 2.87 | 4.0 | 3.0 | F | 5.8 | 5.0 | 124 | 6.9 | 0.26 | TD | 24% | 46 |
| Second retardation film 6 | 2.90 | 0.0 | 0.0 | A-6 | 5.7 | 11.0 | 124 | 1.0 | 0.92 | TD | 30% | 40 |
| Second retardation film 7 | 2.91 | 3.0 | 2.0 | D | 11.0 | 6.0 | 124 | 5.0 | 0.38 | TD | 2% | 50 |

Compound D capable of mending humidity dependence

Compound F capable of mending humidity dependence

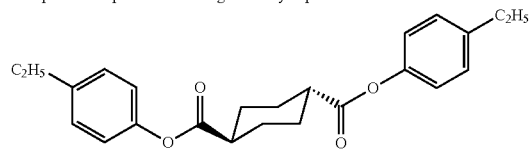

*1 Degree of acetyl substitution of cellulose acylate,
*2 Mass % with respect to the total mass of cellulose acylate,
*3 Ratio of the amount of the compound capable of mending the humidity dependence to the total amount of all additives,
*4 MD means a mechanical (carrier) direction (longitudinal direction); and TD means a transverse direction.

Thus produced in the manner as above, the first retardation films 1 to 8 and the second retardation films 1 to 6 were analyzed, using an automatic birefringence meter (KOBRA-WR by Oji Scientific Instruments), for Re and Rth at a wavelength of 548 nm, at 25° C. and at a relative humidity of 10%, 60% and 80%; and ΔRe (548) and ΔRth (548) of each sample were computed. The results are shown in Table 3 below. The second retardation film 7 had a surface condition trouble of bleeding out.

TABLE 3

| Sample No. | Direction of Slow axis*1 | Re(nm) | | Rth(nm) | | Sound Velocity 1/ Sound Velocity 2* | Polarizing Plate |
|---|---|---|---|---|---|---|---|
| | | Re(548) | ΔRe(548) | Rth(548) | ΔRth(548) | | |
| First retardation film 1 | MD | 26 | 20 | 98 | 27 | 1.18 | A |
| First retardation film 2 | MD | 12 | 8 | 120 | 41 | 1.08 | B |
| First retardation film 3 | MD | 33 | 24 | 81 | 16 | 1.21 | C |
| First retardation film 4 | MD | 14 | 9 | 105 | 30 | 1.11 | D |
| First retardation film 5 | MD | 42 | 36 | 102 | 35 | 1.24 | E |

TABLE 3-continued

| Sample No. | Direction of Slow axis*1 | Re(nm) Re(548) | Re(nm) ΔRe(548) | Rth(nm) Rth(548) | Rth(nm) ΔRth(548) | Sound Velocity 1/ Sound Velocity 2* | Polarizing Plate |
|---|---|---|---|---|---|---|---|
| First retardation film 6 | MD | 23 | 21 | 99 | 27 | 1.2 | F |
| First retardation film 7 | TD | 55 | 12 | 109 | 22 | 0.78 | G |
| First retardation film 8 | MD | 2 | 2 | 200 | 24 | 1.02 | H |
| Second retardation film 1 | TD | 122 | 4 | 133 | 21 | — | I |
| Second retardation film 2 | TD | 147 | 3 | 121 | 19 | — | J |
| Second retardation film 3 | TD | 145 | 13 | 110 | 32 | — | K |
| Second retardation film 4 | TD | 112 | 20 | 83 | 34 | — | L |
| Second retardation film 5 | TD | 64 | 16 | 72 | 31 | — | M |
| First retardation film 6 | TD | 80 | 1 | 148 | 13 | — | N |

*1MD means a mechanical direction (longitudinal direction); and TD means a transverse direction.
*2Sound velocity 1 is a sound velocity in the slow axis direction. Sound velocity 2 is a sound velocity in the direction perpendicular to the slow axis.

[Example of Producing Polarizing Plate]
<Formation of Polarizing plate A>
(Saponification of First Retardation Film 1)

The formed first retardation film 1 was dipped in an aqueous sodium hydroxide solution (2.3 mol/liter) at 55° C. for 3 minutes. This was washed in a water bath at room temperature, and then neutralized with sulfuric acid (0.05 mol/liter) at 30° C. Again this was washed in a water bath at room temperature, and dried with hot air at 100° C. In that manner, the surface of the first retardation film 1 was saponified.

(Saponification of First Retardation Films 2 to 8, Second Retardation Films 1 to 6)

The surface of the first retardation films 2 to 8 and the second retardation films 1 to 6 was saponified in the same manner as that for the first retardation film 1.

(Saponification of Polarizing Plate Protective Film)

A commercially available cellulose acylate film (TD80 by Fujitac) was dipped in an aqueous sodium hydroxide solution (1.5 mol/liter) at 55° C. for 1 minute. This was washed in a water bath at room temperature, and then neutralized with sulfuric acid (0.05 mol/liter) at 30° C. Again this was washed in a water bath at room temperature, and dried with hot air at 100° C.

(Formation of Polarizing Element)

A stretched polyvinyl alcohol film was made to adsorb iodine to prepare a polarizing element. Using a polyvinyl alcohol adhesive, the saponified surface of the above saponified first retardation film 1 and the saponified surface of the above saponified commercial product, cellulose acylate film (TD80 by Fujitac) were stuck to both sides of the polarizing element, thereby fabricating a polarizing plate (A). In the polarizing plate (A), the transmission axis of the polarizing element is perpendicular to the slow axis of the first retardation film 1.

<Formation of Polarizing Plates B to N>

Polarizing plates B to N were produced in the same manner as that for the polarizing plate A, for which, however, the first retardation films 2 to 8 and the second retardation films 1 to 6 were sued in place of the first retardation film 1 and the relationship between the transmission axis of the polarizing element and the slow axis of the retardation film was changed as in Table 4 below.

TABLE 4

| Polarizing plate No. | First retardation film | Relation between two axes*1 |
|---|---|---|
| Polarizing plate A | First retardation film 1 | Perpendicular |
| Polarizing plate B | First retardation film 2 | Perpendicular |
| Polarizing plate C | First retardation film 3 | Perpendicular |
| Polarizing plate D | First retardation film 4 | Perpendicular |
| Polarizing plate E | First retardation film 5 | Perpendicular |
| Polarizing plate F | First retardation film 6 | Parallel |
| Polarizing plate G | First retardation film 7 | Parallel |
| Polarizing plate H | First retardation film 8 | Perpendicular |

| Polarizing plate No. | Second retardation film | Relation between two axes*2 |
|---|---|---|
| Polarizing plate I | Second retardation film 1 | Parallel |
| Polarizing plate J | Second retardation film 2 | Parallel |

TABLE 4-continued

| | | |
|---|---|---|
| Polarizing plate K | Second retardation film 3 | Parallel |
| Polarizing plate L | Second retardation film 4 | Parallel |
| Polarizing plate M | Second retardation film 5 | Parallel |
| Polarizing plate N | Second retardation film 6 | Parallel |

*1 Relation between the transmission axis of Polarizing element and the slow axis of First retardation film
*2 Relation between the transmission axis of Polarizing element and the slow axis of Second retardation film Example 1

Construction of Liquid-Crystal Display Device

A VA-mode liquid-crystal display device having a constitution as in FIG. 1 was constructed. In FIG. 1, any one of the polarizing plates A to H was disposed as the upper polarizing plate PL1 in such a manner that the first retardation film could be on the side of the liquid-crystal cell LC, and any one of the polarizing plates I to N was disposed as the lower polarizing plate PL2 in such a manner that the second retardation film could be on the side of the liquid-crystal cell LC, and these were stuck one by one in that manner with an adhesive. In this, the upper polarizing plate PL1 is a polarizing plate on the side of the display panel, and the lower polarizing plate PL2 is a polarizing plate on the side of the backlight. These were disposed in a cross-Nicol configuration of such that the transmission axis of the polarizing plate on the viewers' side could run vertically and the transmission axis of the polarizing plate on the backlight side could run horizontally. In that manner, LCD Nos. 101 to 107, and LCD Nos. 201 to 205 were fabricated.

The combination of the upper polarizing plate PL1 and the lower polarizing plate PL2 in each liquid-crystal display device is shown in Table 5 below.

(Humidity-Dependent Contrast Change)

The liquid-crystal display devices 101 to 107 and 201 to 205 constructed in the above were analyzed in an environment at 25° C. and 10% RH and at 25° C. and 80% RH, for the contrast at a polar angle of 60° and an azimuth angle of 45°, using ELDIM's EZContrast, and thereby evaluated for the contrast change caused by the humidity change. The results are shown in Table 5 below.

TABLE 5

| LCD No. | First polarizing plate | Relation between two axes*1 | Second polarizing plate | Relation between two axes*2 | Value of (2)*3 | Contrast Change*4 | Note |
|---|---|---|---|---|---|---|---|
| | | | | | $\Delta Re_1(548) - \Delta Re_2(548)$ | | |
| LCD 101 | Polarizing plate A | Parallel | Polarizing plate I | Parallel | 16 | 3.0 | 3 | Invention |
| LCD 102 | Polarizing plate E | Parallel | Polarizing plate K | Parallel | 23 | 2.9 | 3 | Invention |
| LCD 103 | Polarizing plate C | Parallel | Polarizing plate K | Parallel | 12 | 4.0 | 5 | Invention |
| LCD 104 | Polarizing plate D | Parallel | Polarizing plate J | Parallel | 6 | 8.2 | 13 | Invention |
| LCD 105 | Polarizing plate E | Parallel | Polarizing plate J | Parallel | 33 | 1.6 | 7 | Invention |
| LCD 106 | Polarizing plate C | Parallel | Polarizing plate I | Parallel | 20 | 1.8 | 8 | Invention |
| LCD 107 | Polarizing plate B | Parallel | Polarizing plate N | Parallel | 7 | 7.7 | 13 | Invention |
| | | | | | $\Delta Re_1(548) - \Delta Re_2(548)$ | | |
| LCD 201 | Polarizing plate F | Perpendicular | Polarizing plate I | Parallel | 17 | 2.8 | 20 | Comparative Example |
| LCD 202 | Polarizing plate B | Parallel | Polarizing plate J | Parallel | 5 | 12.0 | 16 | Comparative Example |
| LCD 203 | Polarizing plate B | Parallel | Polarizing plate K | Parallel | −5 | 14.6 | 23 | Comparative Example |
| LCD 204 | Polarizing plate G | Perpendicular | Polarizing plate G | Parallel | 0 | ∞ | 18 | Comparative Example |
| LCD 205 | Polarizing plate H | Parallel | Polarizing plate L | Parallel | −18 | 3.2 | 17 | Comparative Example |

*1 Relation between the transmission axis of Polarizing element and the slow axis of First retardation film
*2 Relation between the transmission axis of Polarizing element and the slow axis of Second retardation film
*3 (2) $|\Delta Rth_1(548) + \Delta Rth_2(548)|/|\Delta Re_1(548) - \Delta Re_2(548)|$
*4 Difference between the contrast measured in the environment at 25° C. and 10% RH at a polar angle of 60° and an azimuth angle of 45°, and the contrast measured in the environment at 25° C. and 80% RH at the same polar angle and the same azimuth angle.

From the results in Table 5, it is understandable that the humidity-dependent contrast change in LCD Nos. 101 to 107 of Examples of the present invention is smaller than that in LCD Nos. 201 to 205 of Comparative Examples.

<Formation of Polarizing Plate O>

A first retardation film 7 was stuck, using an adhesive, to the second retardation film 1 of the polarizing plate I formed in the above, thereby producing a polarizing plate O. In the polarizing plate O, the transmission axis of the polarizing element was in parallel to the slow axis of the second retardation film 1, and the slow axis of the second retardation film 1 was perpendicular to the slow axis of the slow axis of the first retardation film 7.

<Formation of Polarizing Plate P>

A polarizing plate P was produced in the same manner as that for the polarizing plate O, in which, however, the slow axis of the second retardation film 1 was in parallel to the slow axis of the first retardation film 7.

<Formation of Polarizing Plate Q>

A stretched polyvinyl alcohol film was made to adsorb iodine to prepare a polarizing element. Using a polyvinyl alcohol adhesive, the cellulose acylate film (Fujitac's TD80) saponified in the same manner as mentioned above was stuck to both sides of the polarizing element to produce a polarizing plate Q. The absorption axis of the polarizing element was in parallel to the slow axis of the cellulose acylate film.

Example 2

Construction of Liquid-Crystal Display Device

A VA-mode liquid-crystal display device having a constitution as in FIG. 2 was constructed. In FIG. 2, any one of the polarizing plate O and the polarizing plate P was disposed as the upper polarizing plate PL1' in such a manner that the first retardation film 7 could be on the side of the liquid-crystal cell, and the polarizing plate Q was disposed as the lower polarizing plate PL2', and these were stuck one by one in that manner with an adhesive. In this, the upper polarizing plate PL1' is a polarizing plate on the side of the display panel, and the lower polarizing plate PL2' is a polarizing plate on the side of the backlight. These were disposed in a cross-Nicol configuration of such that the transmission axis of the polarizing plate on the viewers' side could run vertically and the transmission axis of the polarizing plate on the backlight side could run horizontally. In that manner, LCD Nos. 301 and 302 were fabricated.

(Humidity-Dependent Contrast Change)

LCD Nos. 301 and 302 constructed in the above were evaluated in the same manner as in Example 1. The results are shown in Table 6 below.

CROSS-REFERENCE TO RELATED APPLICATIONS

This application claims benefit of priority under 35 U.S.C. 119 to Japanese Patent Application No. 2007-166481 filed on Jun. 25, 2007; and the entire contents of the applications are incorporated herein by reference.

The invention claimed is:

1. A liquid-crystal display device comprising:
a liquid-crystal cell,
a first polarizing element and a second polarizing element disposed on either side of the liquid-crystal cell respectively,
a first retardation layer between the first polarizing element and the liquid-crystal cell, and
a second retardation layer between the second polarizing element and the liquid-crystal cell, wherein:
a transmission axis of the first polarizing element is perpendicular to a slow axis of the first retardation layer; and a transmission axis of the second polarizing element is parallel to a slow axis of the second retardation layer; and
the first retardation layer and the second retardation layer satisfy the following formula (1):

$$0 \text{ nm} < \Delta Re_1(548) - \Delta Re_2(548) \leq 50 \text{ nm} \quad (1)$$

wherein $\Delta Re_1(548)$ is a value obtained by subtracting in-plane retardation (Re) of the first retardation layer, measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.; and $\Delta Re_2(548)$ is a value obtained by subtracting Re of the second retardation layer, measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.

2. The liquid-crystal display device of claim 1, wherein the first retardation layer is a polymer film stretched at least on the longitudinal direction (machine direction).

3. The liquid-crystal display device of claim 1, wherein the second retardation layer is a polymer film stretched in the transverse direction.

4. The liquid-crystal display device of claim 3, wherein the polymer film comprises a polymer and an additive comprising at least one compound represented by formula (A) in an amount of from 1 to 30% by mass with respect of the amount

TABLE 6

| LCD No. | First polarizing plate | Relation between two axes*1 | ΔRe1(548) − ΔRe2(548) | Value of (2)*2 | Contrast Change*3 | Note |
|---|---|---|---|---|---|---|
| LCD 301 | Polarizing plate O | Perpendicular | 8 | 5.4 | 13 | Invention |
| LCD 302 | Polarizing plate P | Parallel | 8 | 5.4 | 22 | Comparative Example |

*1Relation between the slow axes of First retardation film and Second retardation film
*2(2) |ΔRth₁(548) + ΔRth₂(548)|/|ΔRe₁(548) − ΔRe₂(548)|
*3Difference between the contrast measured in the environment at 25° C. and 10% RH at a polar angle of 60° and an azimuth angle of 45°, and the contrast measured in the environment at 25° C. and 80% RH at the same polar angle and the same azimuth angle From the results in Table 6, it is understandable that the humidity-dependent contrast change in LCD No. 301 of Example of the present invention is smaller than that in LCD No. 302 of Comparative Example.

of the polymer, and the ratio of the amount of the compound represented by formula (A) to the total amount of the additive is from 30 to 100% by mass:

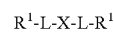

(A)

wherein X represents an aromatic or aliphatic cyclic group; L represents a linking group being capable of forming a hydrogen bond to water, and the two L's are positioned symmetrically each other with the cyclic group X between; and $R^1$ represents an aromatic or aliphatic substituent.

5. The liquid-crystal display device of claim 1, wherein the first retardation layer and the second retardation layer satisfy the following formula (2):

$$0.5 \leq |\Delta Rth_1(548) + \Delta Rth_2(548)|/|\Delta Re_1(548) - \Delta Re_2(548)| \leq 10 \quad (2)$$

wherein $\Delta Rth_1(548)$ is a value obtained by subtracting thickness-direction retardation (Rth) of the first retardation layer measured under the conditions that a wavelength is 548 nm, that a relative humidity is 80% and that a temperature is 25° C., from Rth thereof measured under the conditions that a wavelength is 548 nm, that a relative humidity is 10% and that a temperature is 25° C.; and $\Delta Rth_2(548)$ is a value obtained by subtracting Rth of the second retardation layer, measured under the conditions that a wavelength is 548 nm, that a relative humidity is 80% and that a temperature is 25° C., from Rth thereof measured under the conditions that a wavelength is 548 nm, that a relative humidity is 10% and that a temperature is 25° C.

6. The liquid-crystal display device of claim 1, wherein the first retardation layer and the second retardation layer satisfy the following formula (3):

$$Re_1(548) < Re_2(548) \quad (3)$$

wherein $Re_1(\lambda)$ and $Re_2(\lambda)$ are Re of the first retardation layer and Re of the second retardation layer, respectively, at a wavelength of λ nm measured in an environment at 25° C. and a relative humidity of 60%.

7. The liquid-crystal display device of claim 1, wherein the first retardation layer satisfies the following formulas (4) and (5):

$$5 \text{ nm} \leq Re_1(548) \leq 300 \text{ nm} \quad (4)$$

$$50 \text{ nm} \leq Rth_1(548) \leq 400 \text{ nm} \quad (5)$$

wherein $Re_1(\lambda)$ and $Rth_1(\lambda)$ are Re and Rth, respectively, of the first retardation layer at a wavelength of λ nm measured in an environment at 25° C. and a relative humidity of 60%.

8. The liquid-crystal display device of claim 1, wherein the second retardation layer satisfies the following formulas (6) and (7):

$$40 \text{ nm} \leq Re_2(548) \leq 300 \text{ nm} \quad (6)$$

$$60 \text{ nm} \leq Rth_2(548) \leq 400 \text{ nm} \quad (7)$$

wherein $Re_2(\lambda)$ and $Rth_2(\lambda)$ are Re and Rth, respectively, of the second retardation layer at a wavelength of λ nm measured in an environment at 25° C. and a relative humidity of 60%.

9. The liquid-crystal display device of claim 1, wherein the first retardation layer is a protective film of the first polarizing element, and/or the second retardation layer is a protective film of the first polarizing element or the second polarizing element.

10. The liquid-crystal display device of claim 1, wherein the first retardation layer satisfies the following formula (8):

$$1.12 \leq \text{sound velocity in the slow axis direction/sound velocity in the direction perpendicular to the slow axis} \leq 1.25 \quad (8).$$

11. The liquid-crystal display device of claim 1, wherein at least one of the first retardation layer and the second retardation layer is a cellulose acylate film.

12. The liquid-crystal display device of claim 1, wherein the first retardation layer is disposed between the first polarizing element and the liquid-crystal cell, the second retardation layer is disposed between the second polarizing element and the liquid-crystal cell, the transmission axis of the first polarizing element is perpendicular to the slow axis of the first retardation layer, and the transmission axis of the second polarizing element is in parallel to the slow axis of the second retardation layer.

13. The liquid-crystal display device of claim 1, wherein both of the first retardation layer and the second retardation layer are disposed between the first polarizing element and the liquid-crystal cell, and the slow axis of the first retardation layer is perpendicular to the slow axis of the second retardation layer.

14. The liquid-crystal display device of claim 1, wherein the liquid-crystal cell employs a VA-mode cell.

15. A liquid-crystal display device comprising:
a liquid-crystal cell,
a first polarizing element and a second polarizing element disposed on either side of the liquid-crystal cell respectively, and
a first retardation layer and a second retardation layer disposed at least between either of the first polarizing element or the second polarizing element and the liquid-crystal cell, wherein:
a transmission axis of the first polarizing element is perpendicular to the slow axis of the first retardation layer; and a slow axis of the first retardation layer is perpendicular to a slow axis of the second retardation layer; and
the first retardation layer and the second retardation layer satisfy the following formula (1):

$$0 \text{ nm} < \Delta Re_1(548) - \Delta Re_2(548) \leq 50 \text{ nm} \quad (1)$$

wherein $\Delta Re_1(548)$ is a value obtained by subtracting in-plane retardation (Re) of the first retardation layer, measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.; and $\Delta Re_2(548)$ is a value obtained by subtracting Re of the second retardation layer, measured under the conditions that a wavelength is 548 nm, that a relative humidity is 80% and that a temperature is 25° C., from Re thereof measured under the conditions that a wavelength is 548 nm, that a relative humidity is 10% and that a temperature is 25° C.

* * * * *